(12) United States Patent
Numai

(10) Patent No.: US 6,559,949 B1
(45) Date of Patent: May 6, 2003

(54) GYRO APPARATUS AND GYROSCOPE WITH MULTIPLE INTERFERING LASER BEAMS AFFECTING AN ELECTRICAL SIGNAL FLOWING THERETHROUGH

(75) Inventor: Takahiro Numai, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/489,478

(22) Filed: Jan. 21, 2000

(30) Foreign Application Priority Data

Jan. 22, 1999 (JP) .......................................... 11-014748
Jan. 25, 1999 (JP) .......................................... 11-015981
Jan. 19, 2000 (JP) ....................................... 2000-010565

(51) Int. Cl.[7] ............................................... G01C 19/64
(52) U.S. Cl. ...................................... 356/459; 356/461
(58) Field of Search .............................. 356/459, 460, 356/461; 385/12, 14; 372/94

(56) References Cited

U.S. PATENT DOCUMENTS

| 4,120,587 A | | 10/1978 | Vali et al. ............... 356/106 LR |
| 4,431,308 A | | 2/1984 | Mitsuhashi et al. .......... 356/350 |
| 4,521,110 A | | 6/1985 | Roberts et al. ............. 356/350 |
| 4,718,766 A | | 1/1988 | Greenstein .................. 356/350 |
| 4,874,244 A | * | 10/1989 | Kersey ...................... 356/460 |
| 4,913,548 A | | 4/1990 | Vick ......................... 356/350 |
| 5,022,761 A | * | 6/1991 | Kennedy ..................... 356/459 |
| 5,260,768 A | * | 11/1993 | Cordova et al. .............. 356/460 |
| 5,349,601 A | * | 9/1994 | Hohimer et al. ............... 372/94 |
| 5,764,681 A | | 6/1998 | Ballantyne et al. ............ 372/94 |

FOREIGN PATENT DOCUMENTS

| JP | 57-043846 | 3/1982 |
| JP | 59-041883 | 3/1984 |
| JP | 60-148185 | 8/1985 |
| JP | 02-126680 | 5/1990 |
| JP | 4-174317 | 6/1992 |
| JP | 5-288556 | 11/1993 |
| JP | 6-140364 | 5/1994 |
| JP | 7-131123 | 5/1995 |
| JP | 7-139954 | 6/1995 |
| JP | 7-146150 | 6/1995 |
| JP | 8-18166 | 1/1996 |
| JP | 8-125251 | 5/1996 |

OTHER PUBLICATIONS

Liang, et al., "Unidirectional Operation of Waveguide Diode Ring Lasers", Applied Physics Letters, vol. 70, No. 10, pp. 1192–1194 (Mar. 10, 1997).

* cited by examiner

*Primary Examiner*—Samuel A. Turner
(74) *Attorney, Agent, or Firm*—Fitzpatrick, Cella, Harper & Scinto

(57) ABSTRACT

A gyro comprises a first laser adapted to generate a first laser beam propagating in a single direction as a main mode of operation, and a second laser adapted to generate a second laser beam propagating in a single direction as a main mode of operation. The gyro may have a beat signal detection means and a photodetector for receiving the first and second laser beams. The first laser beam and the second laser beam have different respective oscillation frequencies and interfere with each other.

40 Claims, 42 Drawing Sheets

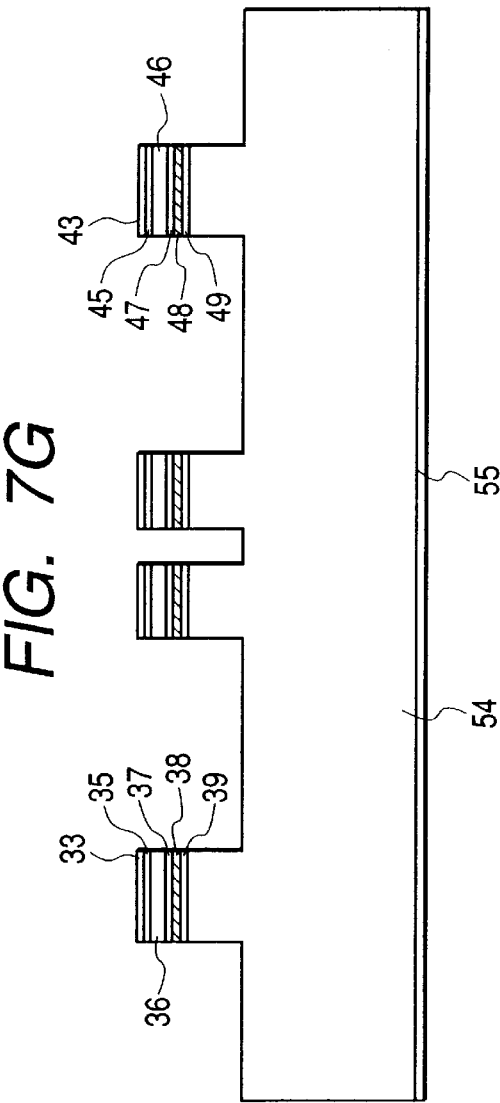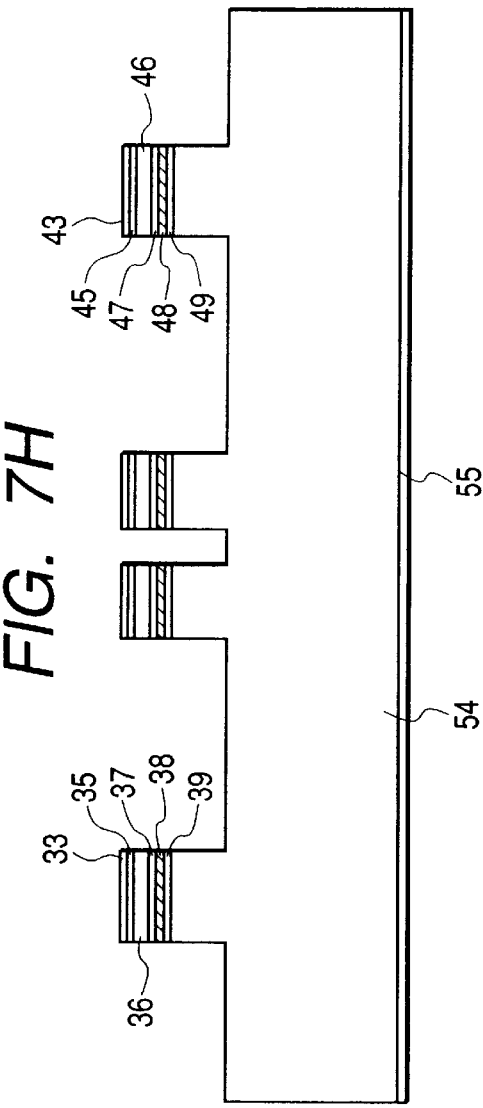

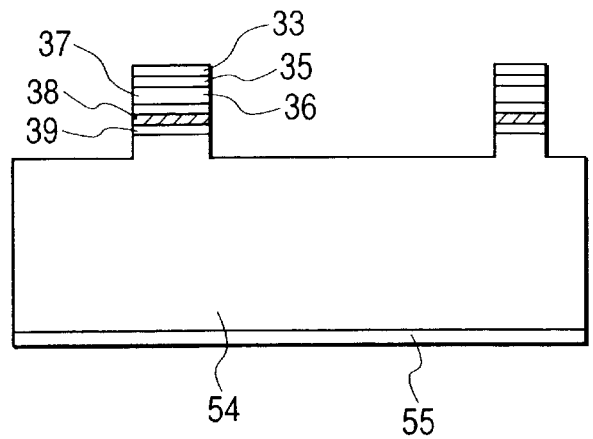
FIG. 33A
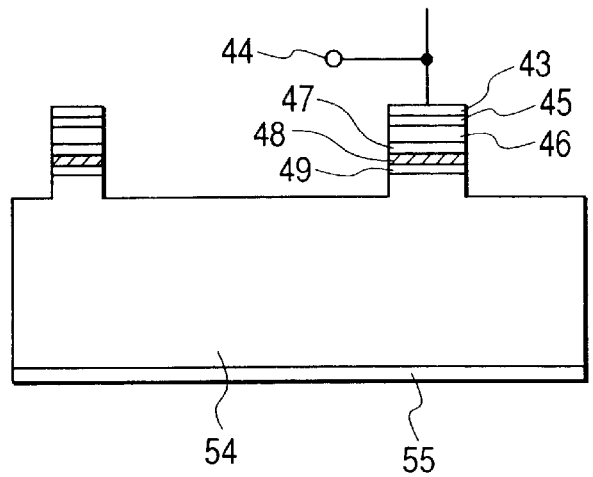
FIG. 33B
FIG. 34
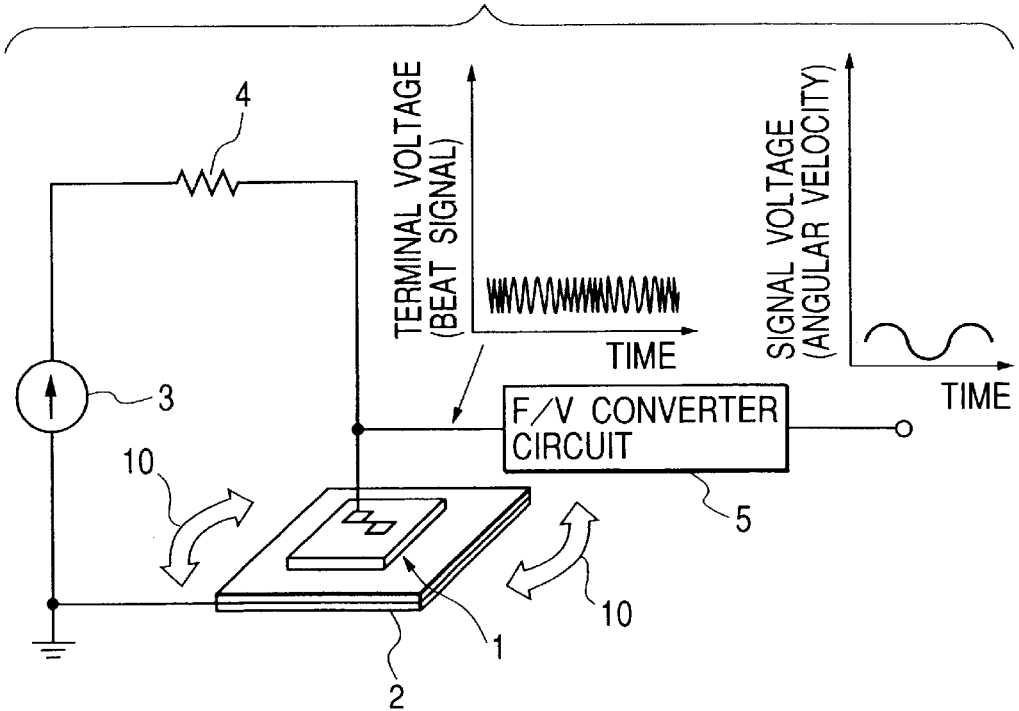

GYRO APPARATUS AND GYROSCOPE WITH MULTIPLE INTERFERING LASER BEAMS AFFECTING AN ELECTRICAL SIGNAL FLOWING THERETHROUGH

BACKGROUND OF THE INVENTION

1. Field of the Invention

This invention relates to a laser apparatus. The present invention also relates to a gyro utilizing a laser apparatus.

2. Related Background Art

Known gyros for detecting the angular velocity of a moving object include mechanical gyros comprising a rotor or an oscillator as well as optical gyros. Particularly, optical gyros are bringing forth technological innovations in the field of gyro technologies due to their remarkable advantages including that they can start to operate instantaneously and show a broad dynamic range. Various optical gyros are known to date including ring laser type gyros, optical fiber gyros and passive type gyros. Of these, the ring laser type gyro that utilizes a gas laser was the earliest to be developed and gyros of this type are popularly used in airplanes at present. In recent years, small and highly sophisticated ring laser type gyros that are formed on a semiconductor substrate have been proposed. See, inter alia, Japanese Patent Application Laid-Open No. 5-288556.

According to the above patent publication, a ring-shaped gain waveguide 5711 having a pn-junction is formed on a semiconductor substrate 5710 and carriers are injected into the gain waveguide 5711 from an electrode 5722, as shown in FIG. 55 of the accompanying drawings, in order to generate a laser oscillation. Then, the laser beams that are propagating through the gain waveguide 5711 clockwise and counterclockwise are partly taken out and caused to interfere with each other in an photo-absorption region 5717. Then, the interfering beams are taken out through another electrode 5723 as a photoelectric current to see the intensity of interference. In FIG. 55, reference numerals 5715 and 5716 respectively denote intensity of interference. In FIG. 55, reference numerals 5715 and 5716 respectively denotes beams propagating clockwise and counterclockwise and reference numerals 5718 and 5719 denote optical outputs, while reference numeral 5712 denotes a reflection plane and reference numerals 5713 and 5714 denote optical output surfaces.

Japanese Patent Application Laid-Open No. 57-43846 (U.S. Pat. No. 4,431,308) describes a gyro that comprises a semiconductor laser element and is adapted not to take the beams of the semiconductor laser element outside thereof, but to utilize the change in the terminal voltage of the element produced by the rotary motion thereof. Referring to FIG. 56 of the accompanying drawings, semiconductor laser element 5792 has upper and lower electrodes (5790 and 5791). In FIG. 56, reference numeral 5793 denotes a DC blocking capacitor and reference numeral 5794 denotes an output terminal, while reference numeral 5795 denotes a resistor. As seen from FIG. 56, the semiconductor laser element of the ring laser device is connected to a drive power source 5796 and the frequency difference (beat frequency) between the frequency of the beam propagating clockwise and that of the beam propagating counterclockwise that is produced when the device shows a certain angular velocity is detected as a change in the terminal voltage of the laser element.

Japanese Patent Application Laid-Open No. 4-174317 also describes a technology of detecting the change in the terminal voltage of a laser element produced as a result of a rotary motion thereof.

However, any of the technologies as described in the above patent documents cannot detect the sense of rotation of an object. This is because an equal beat frequency is detected regardless of the sense of rotation so long as the object is rotating at a same angular velocity.

Thus, known ring laser type gyros are not adapted to detect the sense of rotation of themselves and therefore the sense of rotation has to be determined by applying a dither (micro-oscillation) and determining the correlation of the dither and the obtained signal.

Additionally, in known ring laser type gyros, the oscillation frequencies are separated from each other as the gyro rotates. The difference of the oscillation frequencies is very small small when the rate of revolution is low and then there arises a locking-in phenomenon where the oscillation frequencies are locked to one of the modes of oscillation. This locking-in phenomenon observable in known ring laser type gyros can be avoided by applying a dither.

SUMMARY OF THE INVENTION

Thus, it is an object of the present invention to provide a gyro that can detect the sense of rotation of an object.

Another object of the present invention is to provide a ring resonator type gyro that can detect the sense of rotation without using a mechanical device such as a dither generator.

According to the invention, the above objects are achieved by providing a gyro comprising:

a first laser adapted to generate a first laser beam propagating in one direction as a main mode of operation; and a second laser adapted to generate a second laser beam propagating in one direction as a main mode of operation;

so as to take an electric signal out of at least one of the first laser and the second laser;

the first laser beam and the second laser beam having different respective oscillation frequencies and interfering with each other.

Preferably, in a gyro according to the invention as set forth above, the first laser has a first optical waveguide and the second laser has a second optical waveguide with at least a part of the first optical waveguide and at least a part of the second optical waveguide being arranged in proximity.

Preferably, in a gyro according to the invention as set forth above, the first laser has a first optical waveguide, the second laser has a second optical waveguide, and a third optical waveguide is provided and optically coupled to at least a part of the first and second optical waveguides.

Preferably, in a gyro according to the invention as set forth above, the first laser has a first optical waveguide and the second laser has a second optical waveguide, and the gyro further comprises a third optical waveguide connected to at least a part of the first and second optical waveguides.

Preferably, in a gyro according to the invention as set forth above, the first laser has a first optical waveguide and the second laser has a second optical waveguide with the first optical waveguide and the second optical waveguide being at least partly shared.

Preferably, in a gyro according to the invention as set forth above, the first laser beam and the second laser beam propagate in opposite directions.

Preferably, in a gyro according to the invention as set forth above, the first laser beam and the second laser beam propagate in the same direction.

Preferably, in a gyro according to the invention as set forth above, the first laser has a first optical waveguide and the second laser has a second optical waveguide with both the first optical waveguide and the second optical waveguide having an asymmetrically tapered region.

Preferably, in a gyro according to the invention as set forth above, the tapered region includes a first tapered section and a second tapered section and either the first tapered section or the second tapered section forms an angle of 90° with a portion of the optical waveguide having a constant width.

Preferably, in a gyro according to the invention as set forth above, the first laser has a first optical waveguide and the second laser has a second optical waveguide, the first and second optical waveguides having respective optical elements adapted to differentiate the transmission loss of the laser beam propagating in one direction from the transmission loss of the laser beam propagating in the opposite direction.

Preferably, in a gyro according to the invention as set forth above, the first laser is driven with a constant voltage while the second laser is driven with a constant current.

According to the invention, there is also provided a gyro comprising:

a first laser adapted to generate a first laser beam propagating in one direction as a main mode of operation; and a second laser adapted to generate a second laser beam propagating in one direction as a main mode of operation;

the first laser having a first optical waveguide, the second laser having a second optical waveguide, a third optical waveguide being provided and optically coupled to at least a part of the first and second optical waveguides.

According to the invention, there is also provided a gyro comprising:

a first laser adapted to generate a first laser beam propagating in one direction as a main mode of operation; and a second laser adapted to generate a second laser beam propagating in one direction as a main mode of operation;

the first laser having a first optical waveguide, the second laser having a second optical waveguide with a third optical waveguide being provided and connected to at least a part of the first and second optical waveguides.

According to the invention, there is also provided a gyro comprising:

a first laser adapted to generate a first laser beam propagating in one direction as a main mode of operation; and a second laser adapted to generate a second laser beam propagating in one direction as a main mode of operation;

the first laser having a first optical waveguide, the second laser having a second optical waveguide, and the first optical waveguide and the second optical waveguide are at least partly shared.

According to the invention, there is also provided a gyro comprising:

a first laser adapted to generate a first laser beam propagating in one direction as a main mode of operation;

a second laser adapted to generate a second laser beam propagating in one direction as a main mode of operation; and a beat signal detection means;

the first laser beam and the second laser beam having different respective oscillation frequencies and interfering with each other.

Preferably, in a gyro according to the invention as set forth above, the beat signal detection means detects the voltage signal being applied to the first or second laser, the current signal flowing through the first or second laser, or the impedance signal of the first or second laser.

Preferably, in a gyro according to the invention as set forth above, the first or second laser is provided with an electric terminal for taking out the beat signal.

Preferably, in a gyro according to the invention as set forth above, the beat signal detection means includes a photodetector arranged outside the first and second lasers.

According to the invention, there is also provided a gyro comprising:

a first laser adapted to generate a first laser beam propagating in one direction as a main mode of operation;

a second laser adapted to generate a second laser beam propagating in one direction as a main mode of operation; and a photodetector for receiving the first and second laser beams;

the first laser beam and the second laser beam having different respective oscillation frequencies and interfering with each other.

According to the invention, there is also provided a gyro comprising:

a first laser adapted to generate a first laser beam propagating in one direction as a main mode of operation; and a second laser adapted to generate a second laser beam propagating in one direction as a main mode of operation;

the first laser beam and the second laser beam having different respective oscillation frequencies and interfering with each other.

BRIEF DESCRIPTION OF THE DRAWINGS

FIGS. 7A, 7B, 7C, 7D, 7E, 7F, 7G and 7H are schematic views of a laser also illustrating the present invention.

FIGS. 33A and 33B are schematic cross-sectional views of still another embodiment of a ring-shaped laser according to the invention.

FIG. 34 is a schematic block diagram of a circuit for taking out an electric signal that can be used for the purpose of the invention.

Components denoted in all figures by the same numerals correspond to each other, barring special mention.

DETAILED DESCRIPTION OF THE PREFERRED EMBODIMENTS

Before describing preferred embodiments of the invention, the principle underlying the operation of a gyro according to the invention will be described mainly by referring to FIGS. 52 and 53 and using equations.

For the purpose of the invention, the expression "a laser adapted to generate a laser beam propagating in a direction as a main mode of operation" refers to either a laser adapted to generate only a laser beam propagating in a single direction or a laser adapted to generate a laser beam propagating in one direction far more intensely than any other laser beam generated by the laser and propagating in some other direction.

The SN ratio of the signal detected from a gyro according to the invention is influenced by the ratio of the intensity of the laser beam propagating in one direction as a main mode of operation and that of the counterpropagating laser beam as a sub-mode of operation. Therefore, for the purpose of the invention, a laser preferably generates a single laser beam as a main mode of operation, although it may generate some other laser beams as sub-modes of operation if the SN ratio of the signal detected by the gyro can be held to a satisfactory level.

Figure 52:
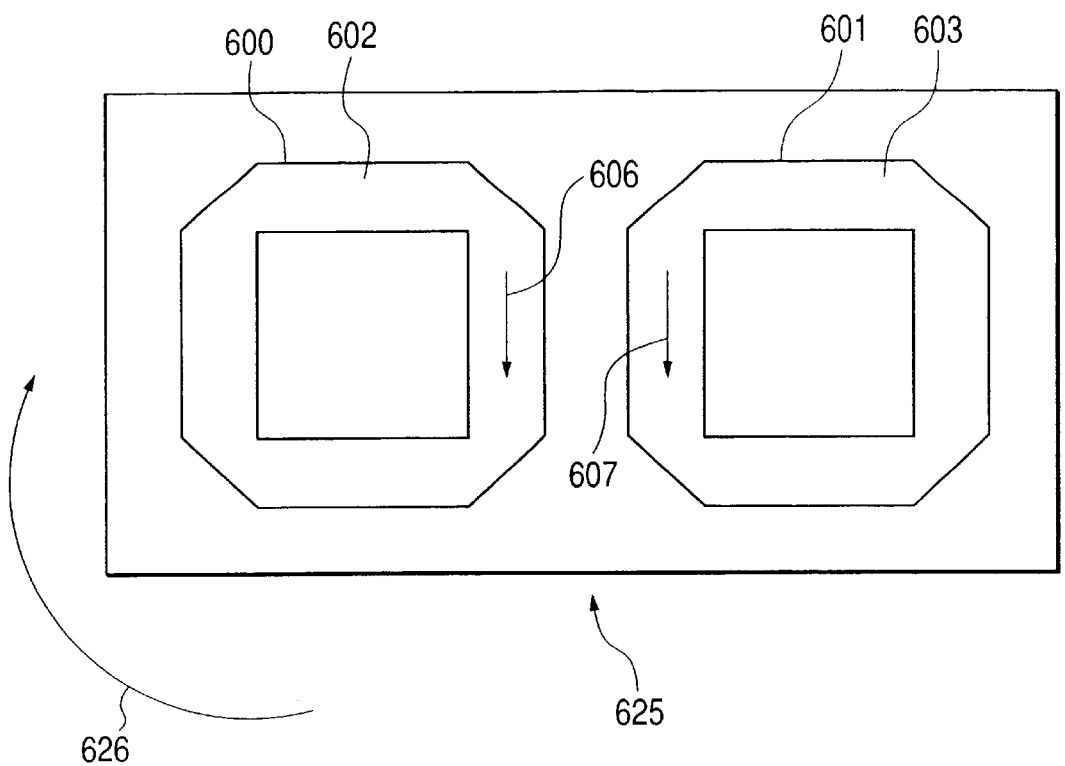
FIG. 52 is a schematic illustration of a gyro according to the invention.

Now, referring to FIG. 52, if the wavelength of the first laser beam 606 emitted from the first laser 600 and propagating clockwise (CW) as a main mode of operation is $\lambda_1$ and that of the second laser beam 607 emitted from the second laser 601 and propagating counterclockwise (CCW) as a main mode of operation is $\lambda_2$ ($<\lambda_1$) and the laser device 625 itself is driven to rotate clockwise as shown by arrow 626 in the figure, the oscillation frequency $f_1$ of the first laser beam that is propagating clockwise is made smaller than the frequency $f_{10}$ of the first laser beam 606 that is observed when the laser is not driven to rotate by a value expressed by equation (1) below:

$$\Delta f_1 = (2S_1/\lambda_1 L_1) \cdot \Omega \quad (1)$$

where $S_1$ is the closed area surrounded by the optical path of the first laser beam and $L_1$ is the length of the optical path of the first laser beam, whereas $\Omega$ is the angular velocity the rotary motion of the laser. Reference numerals 602 and 603 denote ring-shaped waveguides.

On the other hand, the oscillation frequency $f_2$ of the second laser beam 607 that is propagating counterclockwise is made greater than the frequency $f_{20}$ of the second laser beam that is observed when the laser is not driven to rotate by a value $\Delta f_2$ expressed by equation (2) below:

$$\Delta f_2 = (2S_2/\lambda_2 L_2) \cdot \Omega \quad (2)$$

where $S_2$ is the closed area surrounded by the optical path of the second laser beam and $L_2$ is the length of the optical path of the second laser beam, whereas $\Omega$ is the angular velocity caused by the rotary motion of the laser.

If the first laser 600 and the second laser 601 are arranged in close proximity, the first laser beam 606 propagating through the first laser 600 is coupled to the second laser beam 607. At the same time, the second laser beam 607 propagating through the second laser 601 is coupled to the first laser beam 606. Thus, both the first laser beam 606 and the second laser beam 607 coexist both in the first laser 600 and in the second laser 601 and interfere with each other to generate a beat signal that can be expressed in terms of the difference in the oscillation frequency of the first laser beam 606 and that of the second laser beam 607 according to equation (3) below:

$$f_2 - f_1 = f_{20} - f_{10} + (\Delta f_2 + \Delta f_1) = f_{20} - f_{10} + [(2S_2/\lambda_2 L_2) \cdot \Omega + (2S_1/\lambda_1 L_1) \cdot \Omega] \quad (3)$$

If, on the other hand, the laser device 625 itself is driven to rotate counterclockwise, there arises a beat signal that can be expressed in terms of the difference in the oscillation frequency of the first laser beam and that of the second laser beam according to equation (4) below:

$$f_2 - f_1 = f_{20} - f_{10} + (\Delta f_2 + \Delta f_1) = f_{20} - f_{10} - [(2S_2/\lambda_2 L_2) \cdot \Omega + (2S_1/\lambda_1 L_1) \cdot \Omega] \quad (4)$$

Meanwhile, when there exist two or more than two different oscillation modes in a laser, the population inversion varies with time as a function of the difference in the oscillation frequencies of the selected mode. This phenomenon is referred to as population pulsation. In a laser where an electric current is made to flow such as a gas laser or a semiconductor laser, the population inversion shows a one-to-one correspondence relatively to the impedance of the laser. When two laser beams interfere with each other within such a laser, the population inversion is made to vary by the interference to consequently change the impedance between the electrodes of the laser. The change can be observed as a change in the terminal current flowing through the laser device when a constant voltage source is used as surface drive power. On the other hand, the change can also be observed as a change in the voltage being applied to the laser device and taken out as a signal representing the interference of the two beams when a constant current source is used. Of course, it is also possible to directly observe the change in the impedance by means of an impedance meter.

Thus, by providing a terminal for detecting the change in the current, the voltage, or the impedance of the laser, it is possible to take out a beat signal representing the number of revolutions per unit time, or the rotary velocity of the laser. Additionally, according to the invention, the beat frequency increases or decreases according to the sense of rotation in a manner as expressed by equations (3) and (4).

Therefore, it is possible to detect the sense of rotation by observing the increase or the decrease, if any, in the beat frequency from the time when the laser is not rotating.

On the other hand, if the relationship as expressed by equation (5) below is satisfied, it is possible to detect both the sense of rotation and the precise angular velocity. More specifically, both the sense of rotation and the precise angular velocity can be detected if it is so arranged that the value of the beat frequency is constantly led by the same sign (which is positive in the description below, although it may be negative by the same token) and only the absolute value of the beat frequency changes as a function of the sense of rotation.

$$f_2 - f_1 \geq 0 \quad (5)$$

Figure 53:
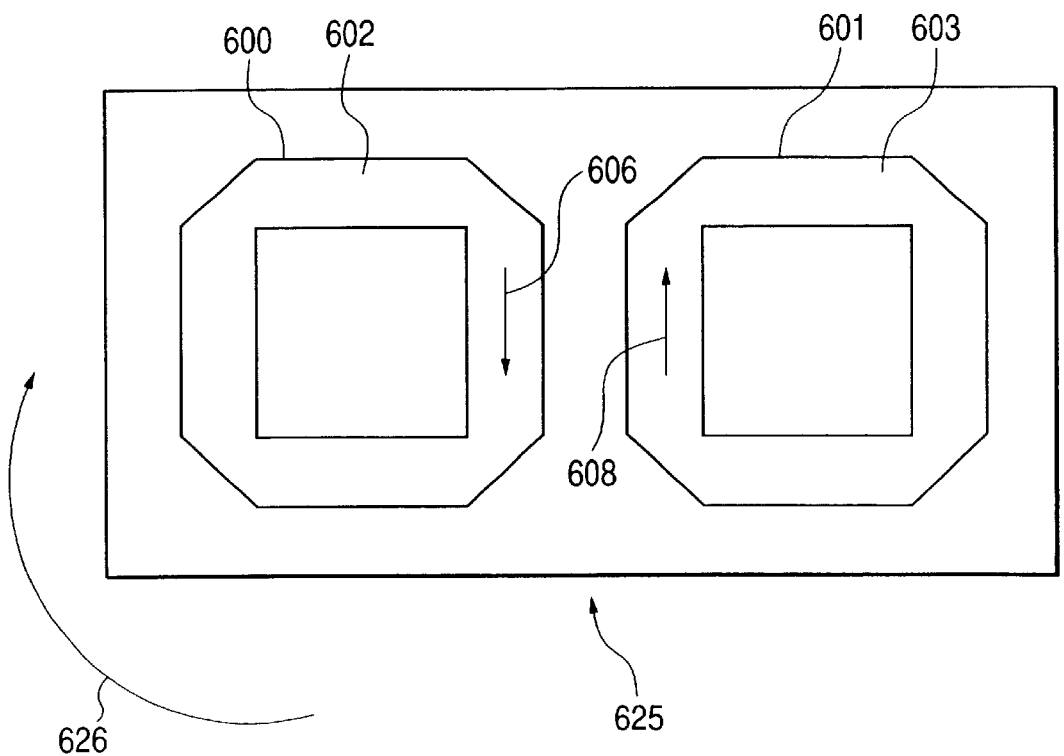
FIG. 53 is a schematic illustration of a gyro according to the invention.

Now, referring to FIG. 53, assume that the frequency of the first laser beam and the second laser beam are propagating in the same direction. Reference numerals 602 and 603 denote ring-shaped waveguides. If, for example, the wavelength of the first laser beam 606 emitted from the first laser 600 and propagating clockwise is $\lambda_1$ and that of the second laser beam 608 emitted from the second laser 601 and also propagating clockwise is $\lambda_2$ ($<\lambda_1$) and the laser device 625 itself is driven to rotate clockwise, the oscillation frequency $f_1$ of the first laser beam that is propagating clockwise is made smaller than the frequency $f_{10}$ of the first laser beam 606 that is observed when the laser device is not driven to rotate by a value expressed by equation (6) below:

$$\Delta f_1 = (2S_1/\lambda_1 L_1) \cdot \Omega \quad (6)$$

where $S_1$ is the closed area surrounded by the optical path of the first laser beam and $L_1$ is the length of the optical path of the first laser beam, whereas $\Omega$ is the angular velocity caused by the rotary motion of the laser.

Similarly, the oscillation frequency $f_2$ of the second laser beam 608 that is also propagating clockwise is made greater than the frequency $f_{20}$ of the second laser beam that is observed when the laser is not driven to rotate by a value expressed by equation (7) below:

$$\Delta f_2 = (2S_2/\lambda_2 L_2) \cdot \Omega \tag{7}$$

where $S_2$ is the closed area surrounded by the optical path of the second laser beam and $L_2$ is the length of the optical path of the second laser beam, whereas $\Omega$ is the angular velocity caused by the rotary motion of the laser.

If the first laser 600 and the second laser 601 are arranged in close proximity, the first laser beam 606 propagating through the first laser 600 is coupled with the second laser beam 608. At the same time, the second laser beam 607 propagating through the second laser 601 is coupled to the first laser beam 606. Thus, both the first laser beam 606 and the second laser beam 608 coexist both in the first laser 600 and in the second laser 601 and interfere with each other to generate a beat signal that can be expressed in terms of the difference in the oscillation frequency of the first laser beam 606 and that of the second laser beam 608 according to equation (8) below:

$$f_2 - f_1 = f_{20} - f_{10} - (\Delta f_2 - \Delta f_1) = f_{20} - f_{10} - [(2S_2/\lambda_2 L_2) \cdot \Omega - (2S_1/\lambda_1 L_1) \cdot \Omega] \tag{8}$$

If, on the other hand, the laser device 625 itself is driven to rotate counterclockwise as shown by arrow 626 in the figure, there arises a beat signal that can be expressed in terms of the difference in the oscillation frequency of the first laser beam and that of the second laser beam according to equation (9) below:

$$f_2 - f_1 = f_{20} - f_{10} + (\Delta f_2 - \Delta f_1) = f_{20} - f_{10} + [(2S_2/\lambda_2 L_2) \cdot \Omega - (2S_1/\lambda_1 L_1) \cdot \Omega] \tag{9}$$

Thus, again, the population inversion varies with time as a function of the difference in the oscillation frequencies of the selected mode to consequently change the impedance between the electrodes of the laser.

Additionally, according to the invention, the beat frequency increases or decreases according to the sense of rotation in a manner as expressed by equations (8) and (9). Therefore, it is possible to detect the sense of rotation by observing the increase or the decrease, if any, in the beat frequency from the time when the laser is not rotating.

On the other hand, the relationship as expressed by equation (10) below is maintained when the oscillation wavelength of the first laser beam and that of the second laser beam are equal to each other.

$$f_{20} - f_{10} = 0 \tag{10}$$

Then, the beat frequency $f_2 - f_1$ may be either a positive value or a negative value. However, a common and identical signal will be obtained from the terminal so long as the absolute value of the beat frequency remains the same. In that case, it is not possible to detect the sense of rotation of the laser. To the contrary, according to the invention, it is possible to detect the sense of rotation by observing the change in the absolute value of $f_2 - f_1$. Particularly, both the sense of rotation and the precise angular velocity of the laser device can be detected when the requirement of formula (5) is satisfied.

Alternatively, it is possible to detect the beat signal by means of an externally arranged photodetector instead of detecting the beat signal by observing the change in the voltage being applied to, the electric current flowing through, or the change in the impedance of the lasers.

More specifically, the first laser beam and the second laser beam are taken to the outside of the lasers. Then, as the laser beams are detected simultaneously by the photodetector, they interfere with each other and generate a beat signal within the photodetector as a function of the difference of the oscillation frequencies.

As a result, the beat signal can be detected at the electric terminal of the photodetector.

Only the laser beam propagating circuitally in one direction can be made to exist in the laser device as a main mode of operation by causing the laser beam propagating in the direction opposite to the first direction to have an optical loss.

For instance, when the optical waveguide is partly tapered, the conditions of total reflection become modified relatively to the light entering the tapered region to give rise to a mirror loss to that light. Then, it is possible to suppress the laser oscillation of one of the two opposite directions by causing a large mirror loss to be produced. More specifically, the angle of incidence of light varies depending on the sense of circuital propagation and the light propagating in one of two directions may show a loss greater than the light propagating in the opposite direction or vice versa. In this way, a single laser beam propagating circuitally in one direction can be made to exist in the laser device as a main mode of operation.

For the purpose of the invention, the tapered region may be formed in such a way that the optical waveguide gradually increases its width along the direction of propagation of a laser beam. The tapered region shows a saw-toothed profile in a plane parallel to the plane containing the transmission path of the circuitally propagating laser beam.

An optical device such as an optical isolator may be inserted into the optical path in place of or in addition to forming a tapered region in part of the optical waveguide. An optical isolator allows a beam with a fixed sense of polarization to pass only in one direction. Thus, a ring laser device that is adapted to allow a beam propagating in only one direction to exist as a main mode of operation can be prepared by inserting an optical isolator that allows a laser beam to pass in only one direction provided that the two beams propagating in opposite directions are equally polarized. It may be needless to say that the optical isolator may be replaced with an optical circulator or some other optical device so long as the latter allows a beam to pass in only one direction.

Additionally, in a gyro according to the invention, the value of the electric current injected into the first laser may be different from that of the electric current injected into the second laser. Alternatively, the oscillation frequency or the oscillation wavelength of the first laser and the oscillation frequency or the oscillation wavelength, whichever is appropriate, of the second laser may be different from each other.

If the length of the optical path of the first laser and that of the optical path of the second laser are $L_1$ and $L_2$, respectively, they show respective relationships as defined by equations (11) with the oscillation wavelength of the first laser and that of the second laser:

$$L_1 = 2\pi m_1 \lambda_1, \ L_2 = 2\pi m_2 \lambda_2 \tag{11}$$

where $m_1$ and $m_2$ are integers. The oscillation wavelengths of the two lasers can be differentiated from each other if the integers m1 and $m_2$ are equal to each other and the lengths of the optical paths of the two lasers are different from each other. Then, the oscillation frequencies of the two laser beams can be differentiated because the oscillation frequency is inversely proportional to the oscillation wavelength. The length of an optical path is defined as the product of the effective refractive index and the distance of propagation and hence the length of the first laser and that of the second laser can be differentiated from each other by changing the effective refractive indexes or the lengths of the two optical waveguides.

The refractive indexes of the optical waveguides can be changed by modulating the value of the electric currents injected into the two lasers. In a semiconductor laser, the refractive index is reduced due to the free carrier plasma effect by the injected electric current within a range where the heating of the laser is negligible, whereas the refractive index is raised within a range where the heating effect is dominant. In any case, the refractive index can be modified by controlling the injected electric current to modify the effective refractive index of the optical waveguide. Thus, the lengths of the optical paths of the two laser beams can be differentiated from each other.

Meanwhile, it is known that the oscillation frequency fi and the photon number density $S_i$ (i=1, 2) show a relationship as expressed by equations (12) and (13) below when two different modes coexist:

$$2\pi f_1 + \Phi_1 = \Omega_1 + \sigma_1 - \rho_1 S_1 - \tau_{12} S_2 \qquad (12)$$

and $$2\pi f_2 + \Phi_2 = \Omega_2 + \sigma_2 - \rho_2 S_2 - \tau_{21} S_1 \qquad (13)$$

where $\Phi_i$ represents the phase, $\Omega_i$ represents the resonance angular frequency, $\sigma_i$ represents the mode-pulling coefficient, $\rho_i$ represents the safe-mode-pushing coefficient and $\tau_{ij}$ represents the cross-mode-pushing coefficient. Note that i=1, 2; j=1, 2; i≠j.

Once the profile of the optical waveguide is determined, $\Omega_i$, $\sigma_i$, $\rho_i$ and $\tau_{ij}$ of equations (12) and (13) become constants.

Additionally, we have 0 if no mode jumping occurs at the time of laser oscillation.

Thus, from equations (12) and (13), it is concluded that $f_1 \neq f_2$ when $S_1 \neq S_2$.

Since the photon density $S_i$ (i=1, 2) varies depending on the electric current injected into a laser, the oscillation frequencies of the two lasers can be differentiated according to equation (12) by changing the electric currents injected into each of the two lasers. Note that this phenomenon is applicable not only to semiconductor lasers but also to gas lasers.

The effective refractive indexes of the two optical waveguides can be altered by differentiating the widths of the optical waveguides, the sizes of the medium that significantly affect the effective refractive indexes, the materials of the medium or the compositions of the medium of the two lasers.

Furthermore, the oscillation wavelengths of the two lasers can be differentiated by modifying the materials or the compositions of the medium because then the peak wavelengths of the gain of the two lasers are varied. This is because a multiple of resonance modes exist in an optical resonator and the wavelength that is closest to the gain peak is amplified to give rise to a laser oscillation.

According to the invention, an electric signal that is oscillating with a beat frequency corresponding to the angular velocity of the laser device can be observed by means of the photodetector arranged inside or outside the laser device for taking out the electric signal.

Now, how the electric signal of the gyro comprising the first and second lasers is obtained when the gyro, previously held stationary is driven to rotate clockwise or counterclockwise will be briefly discussed below (see FIGS. 1A through 1C).

In the following description, the wavelength of the laser beam generated as a main mode of operation of the first laser of the gyro and propagating clockwise (hereinafter referred to as "CW beam") is expressed by $\lambda_1$ and that of the laser beam generated as a main mode of operation of the second laser of the gyro and propagating counterclockwise (hereinafter referred to as "CCW beam") is expressed by $\lambda_2$ ($<\lambda_1$)

Figure 1A:
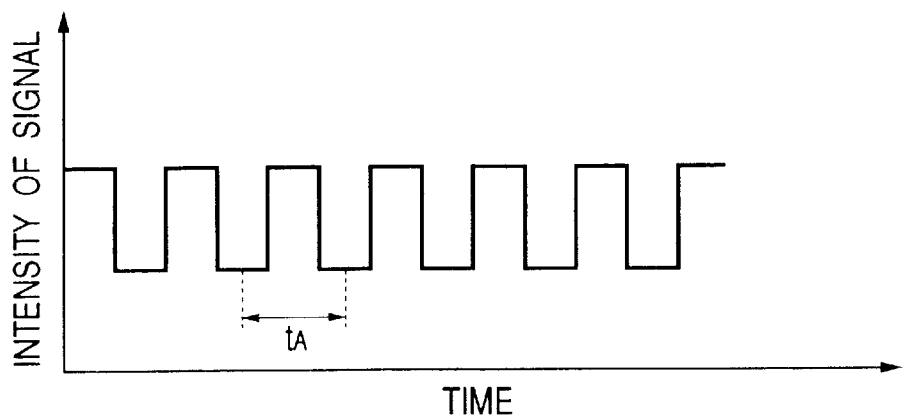
FIGS. 1A, 1B and 1C are graphs showing a change that can be observed in a beat signal caused by revolutions of a gyro.

FIG. 1A shows the electric signal that can be obtained when the gyro is held stationary. Assume here that the electric signal obtained when the gyro is held stationary shows a signal period of $t_A$.

The period $t_A$ corresponds to the inverse of the difference in the oscillation frequencies of the first and second laser beams when the gyro is held stationary, or $(f_{20} - f_{10})^{-1}$.

Figure 1B:
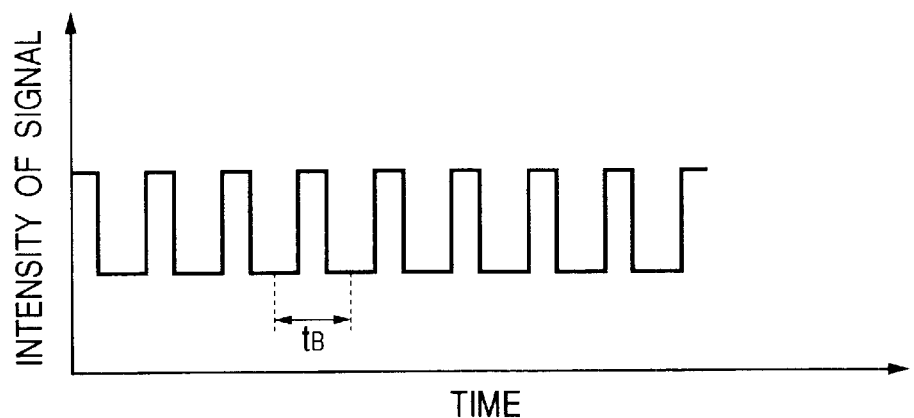

As the gyro is driven to rotate clockwise, the beat frequency, or $f_2 - f_1$, increases in a manner as evidenced by equation (3) to reduce the signal period to $t_B$ as shown in FIG. 1B.

Figure 1C:
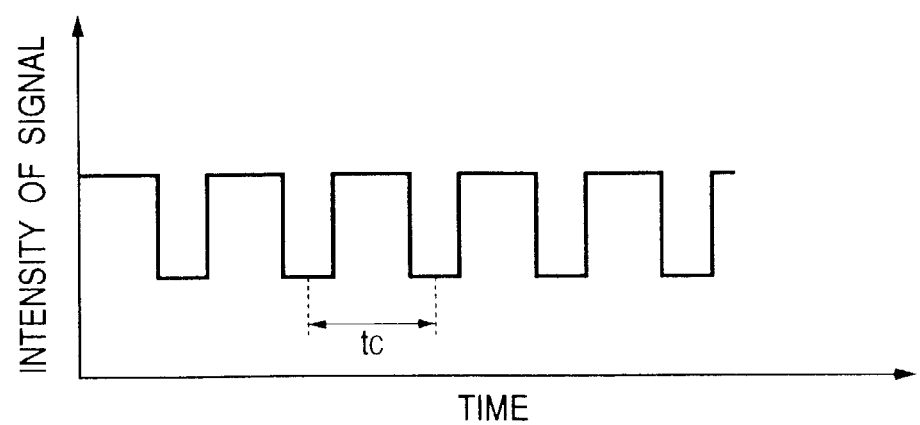

On the other hand, as the gyro is driven to rotate counterclockwise, the beat frequency decreases in a manner as evidenced by equation (4) to raise the signal period to $t_C$ as shown in FIG. 1C.

Then, the sense of rotation of the gyro can be detected by comparing the beat frequency when the gyro is held stationary with the beat frequency when the gyro is driven to rotate.

On the other hand, the angular velocity of the gyro can be determined from the difference in the beat frequency when the gyro is held stationary and the beat frequency when the gyro is driven to rotate.

The beat frequency is proportional to the angular velocity of rotation. Therefore, the angular velocity of the gyro can be obtained from the voltage being applied to its laser devices by converting its beat frequency into a voltage by means of a frequency/voltage converter circuit and knowing in advance the relationship between the rotary speed of the gyro and the voltage.

A gyro according to the invention operates on the principle as described above.

Now, preferred embodiments of the invention will be described by referring to the accompanying drawings.

Embodiment 1

The first embodiment of the gyro according to the invention comprises a first laser adapted to generate a first laser beam propagating in one direction as a main mode of operation and a second laser adapted to generate a second laser beam propagating in a direction as a main mode of operation so as to take an electric signal out of at least one of the first laser or the second laser wherein the first laser beam and the second laser beam have different respective oscillation frequencies and interfere with each other.

This embodiment is designed to make the first and second lasers respectively have first and second optical waveguides that are configured in a specific way as described below in order to cause the first laser beam and the second laser beam having respective oscillation frequencies that are different from each other to interfere with each other.

In a preferable configuration, at least a part of the first optical waveguide and at least a part of the second optical waveguide are arranged in proximity.

In another preferable configuration, a third optical waveguide is provided and optically coupled to at least a part of the first and second optical waveguides.

In an alternative configuration, a third optical waveguide is provided and connected to at least a part of the first and the second optical waveguides.

In still another preferable configuration, the first optical waveguide and the second optical waveguide are at least partly shared.

Now, how the laser beam of the first laser generated as a main mode of operation and the laser beam of the second laser generated also as a main mode of operation are made to interfere with each other will be discussed below.

(1) When the first and second lasers are arranged in proximity (see FIGS. 2A through 2D).

Figure 2A:
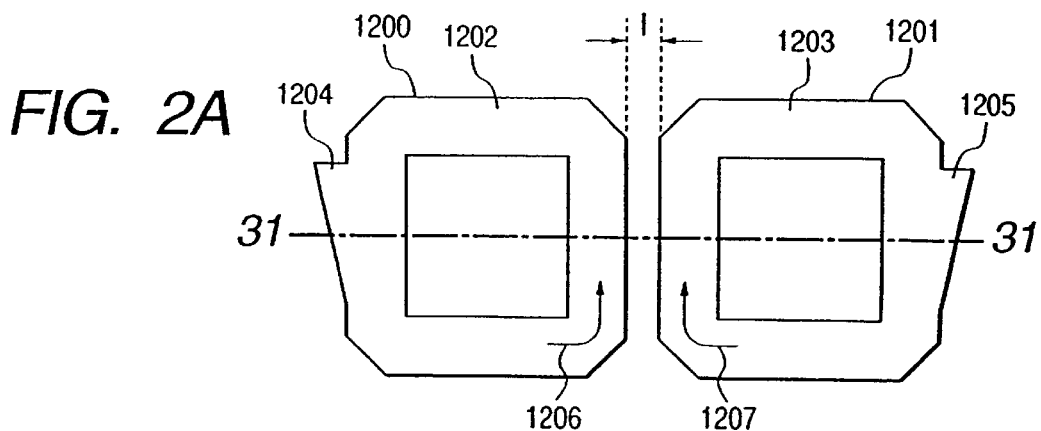
FIGS. 2A, 2B, 2C, 2D and 2E are schematic views of a laser illustrating the present invention.

As shown in FIG. 2A, the first optical waveguide 1202 of the first laser 1200 and the second optical waveguide 1203 of the second laser 1201 are arranged in proximity. In FIG. 2A, reference numerals 1204 and 1205 denote respective tapered regions for generating main mode beams to be propagating in a direction and reference numeral 1206 denotes a CCW beam and reference numeral 1207 denotes a CW beam.

As the optical waveguide of the first laser and that of the second laser are arranged at least partly in proximity, the main mode beam 1206 propagating through the first laser 1200 is optically coupled to the second waveguide 1203 so that it also propagates through the second laser 1201, while the main mode beam 1207 propagating through the second laser 1201 is optically coupled to the first waveguide 1202 so that it also propagates through the first laser 1200. Thus, if the oscillation frequencies of the two principal mode beams differ from each other, laser beams having different oscillation frequencies coexist within a laser.

For the purpose of the invention, a pair of waveguides arranged in proximity refers to those arranged with a small value for distance 1 in FIG. 2A.

More specifically, in order to cause the CCW beam 1206 of the first laser 1200 and the CW beam 1207 of the second laser 1201 to interfere with each other, the optical waveguide of one of the lasers is at least partly located within the penetrating depth of the laser beam of the other laser. It may be needless to say that the optical waveguide of each of the lasers may be at least partly located within the penetrating depth of the laser beam of the other laser.

For the purpose of the invention, the penetrating depth of a laser beam refers to a length which an evanescent wave can reach.

While the optical waveguides of the lasers that are arranged in proximity do not necessarily have to be arranged parallel with each other, they are preferably arranged parallel with each other in order to efficiently make the second laser beam 1207 become optically coupled to the optical waveguide 1202 of the first laser 1200.

Figure 2B:
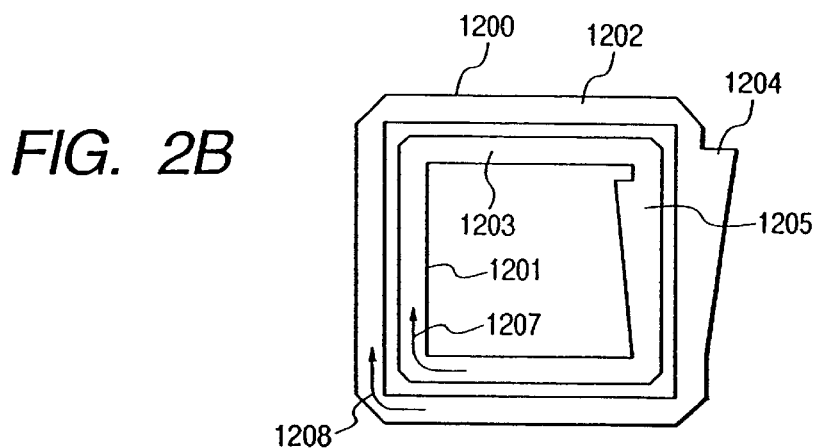

The two optical waveguides may be arranged in proximity in various different ways and, therefore, the arrangement is not limited to the one illustrated in FIG. 2A. For example, the second optical waveguide 1203 may be arranged inside the first optical waveguide 1202 as shown in FIG. 2B. With this arrangement, the first and second laser beams propagating through the first and second optical waveguides respectively are made to proceed in the same direction.

Figure 2C:
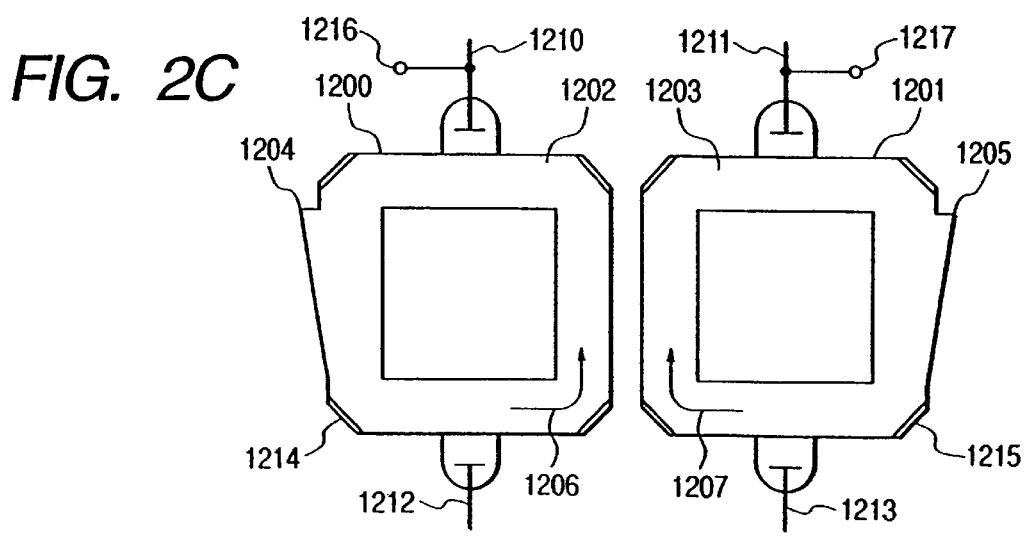
Figure 2D:
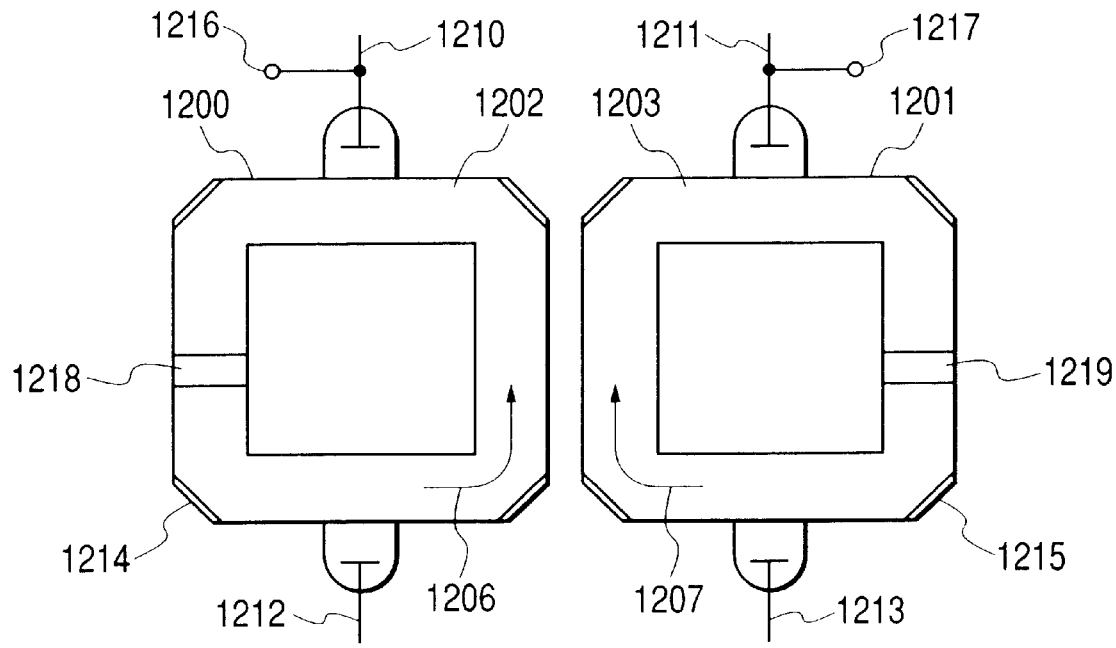

FIGS. 2C and 2D show two possible arrangements of optical waveguides for gas lasers. Referring to FIGS. 2C and 2D, the first and second lasers 1200 and 1201 are arranged in proximity. In FIGS. 2C and 2D, reference numerals 1214 and 1215 denote mirrors (reflection planes) and reference numerals 1210 and 1211 denote anodes, while reference numerals 1216 and 1217 denote electric terminals for taking out respective electric signals generated as a result of rotation and reference numerals 1212 and 1213 denote cathodes. Reference numerals 1218 and 1219 denote optical elements that may be optical isolators. While the paired lasers are provided with respective electric terminals for taking out electric signals in the drawings, only one of the lasers may alternatively be provided with an electric terminal.

Figure 2E:
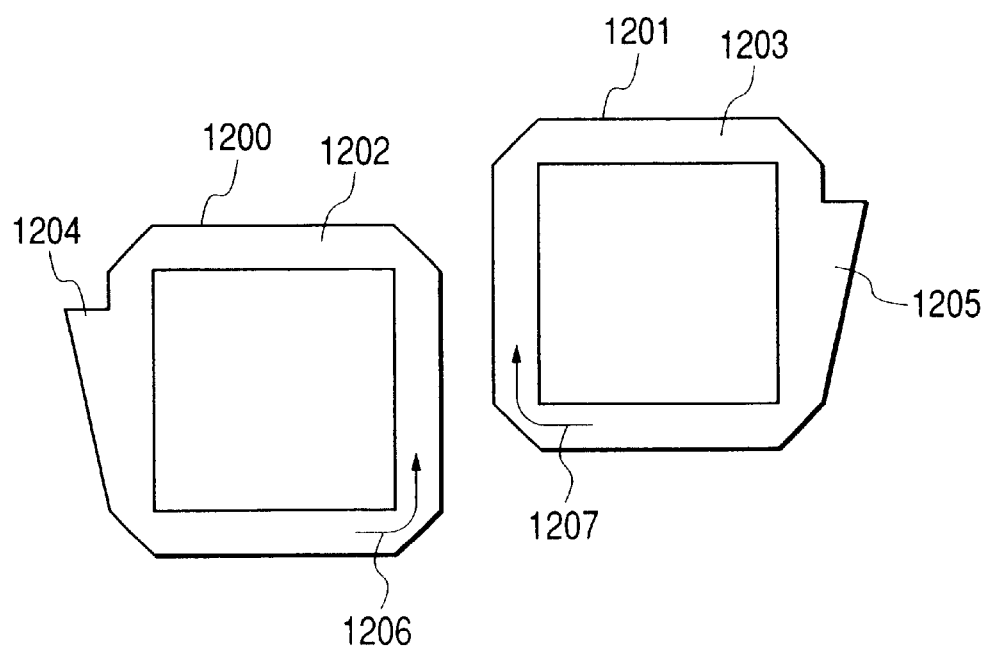

FIG. 2E shows another possible arrangement of optical waveguides, where the first and second lasers are located diagonally relative to each other.

Preferably, each of the optical waveguides of the lasers is provided with a total reflection plane. More preferably, each of the ring lasers is formed by total reflection planes from the viewpoint of reducing the oscillation threshold.

(2) When a third optical waveguide is provided to be optically coupled to at least a part of the first and second optical waveguides (see FIGS. 3A through 3D).

Figure 3A:
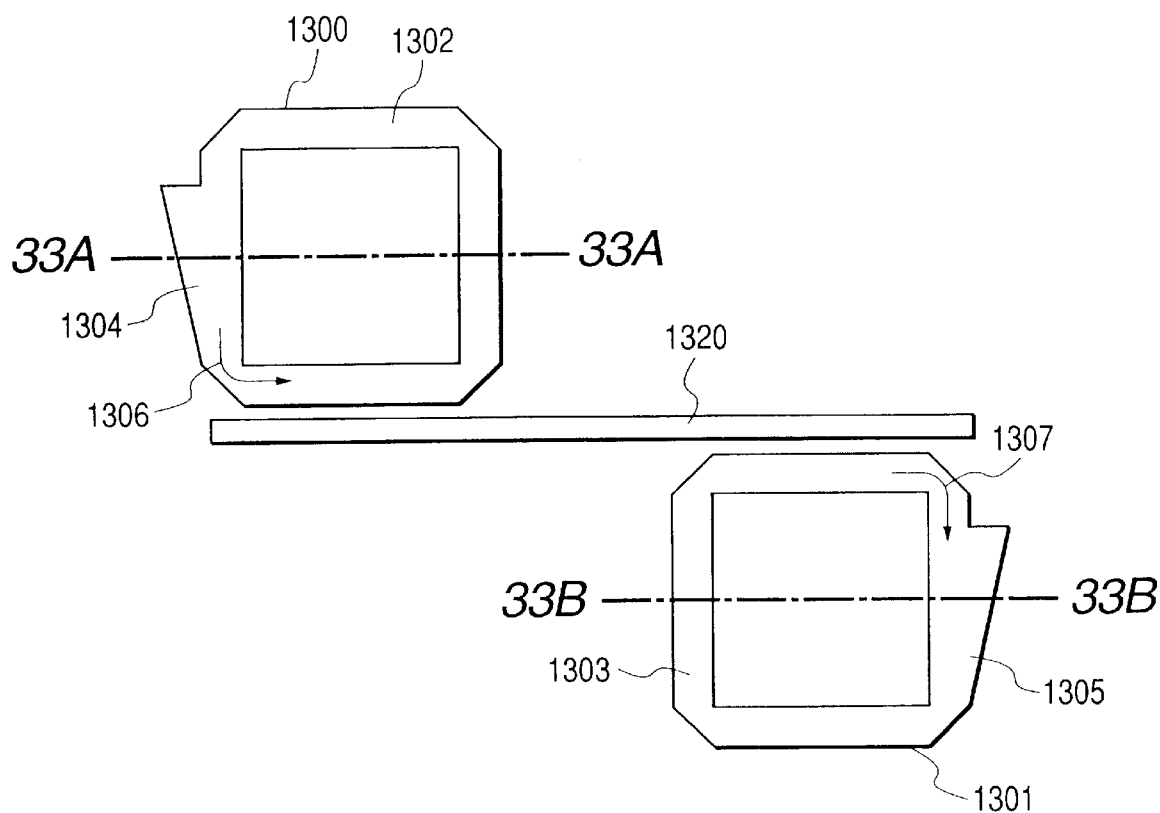
FIGS. 3A, 3B, 3C, and 3D are schematic views of a laser also illustrating the present invention.

Referring to FIG. 3A, a third optical waveguide 1320 is arranged close to and optically connected to part of the first optical waveguide 1302 of the first laser 1300 and part of the second optical waveguide 1303 of the second laser 1301. In FIG. 3A, reference numeral 1306 denotes a CCW beam generated as a main mode of operation, whereas reference numeral 1307 denotes a CW beam generated as a main mode of operation. Thus, the CCW beam 1306 of the first laser 1300 is optically coupled to the second laser 1301 by way of the third optical waveguide 1320. Then, the change in the electric signal due to the rotation of the gyro is detected from the second laser in order to detect the sense of rotation.

Figure 3B:
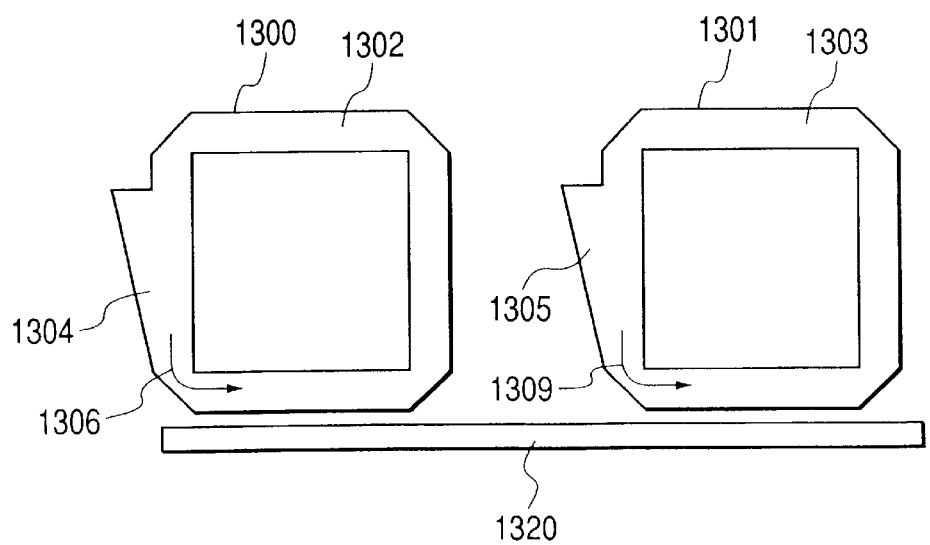

FIG. 3B shows another possible arrangement when using a third optical waveguide.

Referring to FIG. 3B, reference numeral 1302 denotes the first optical waveguide and reference numeral 1303 denotes the second optical waveguide, while reference numeral 1320 denotes the third optical waveguide. With this arrangement, it should be noted that the main mode beams have to be made to propagate in a same direction.

Figure 3C:
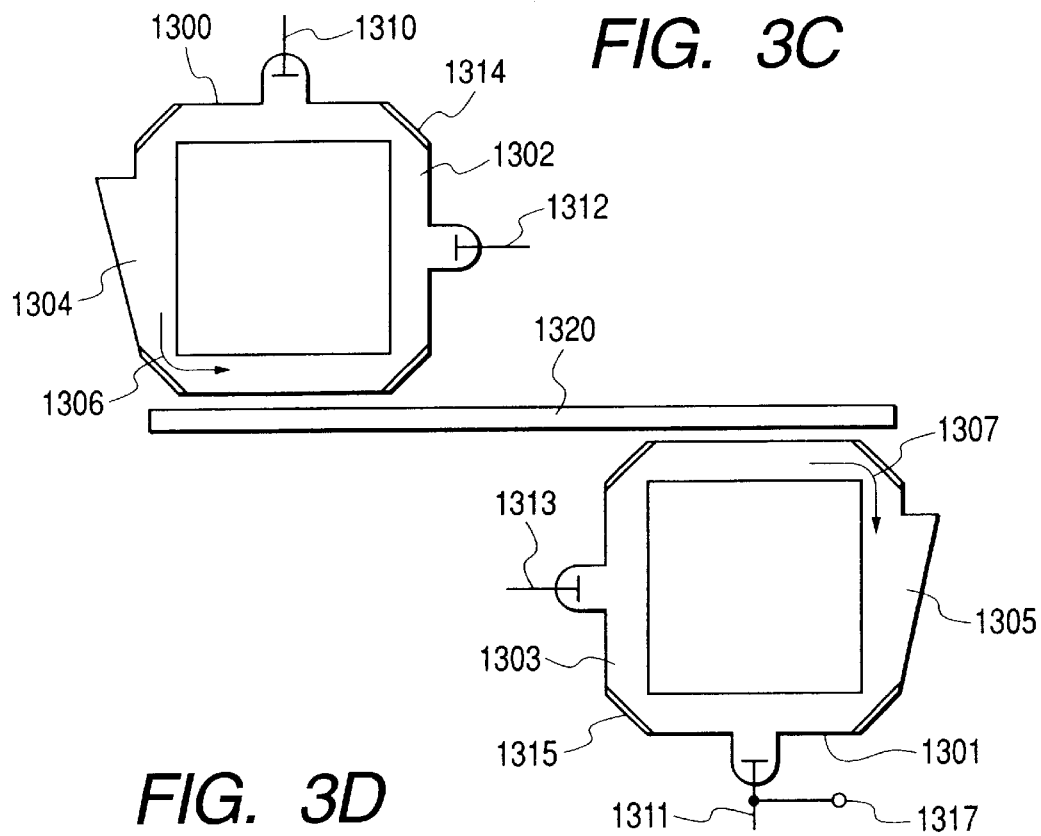
Figure 3D:
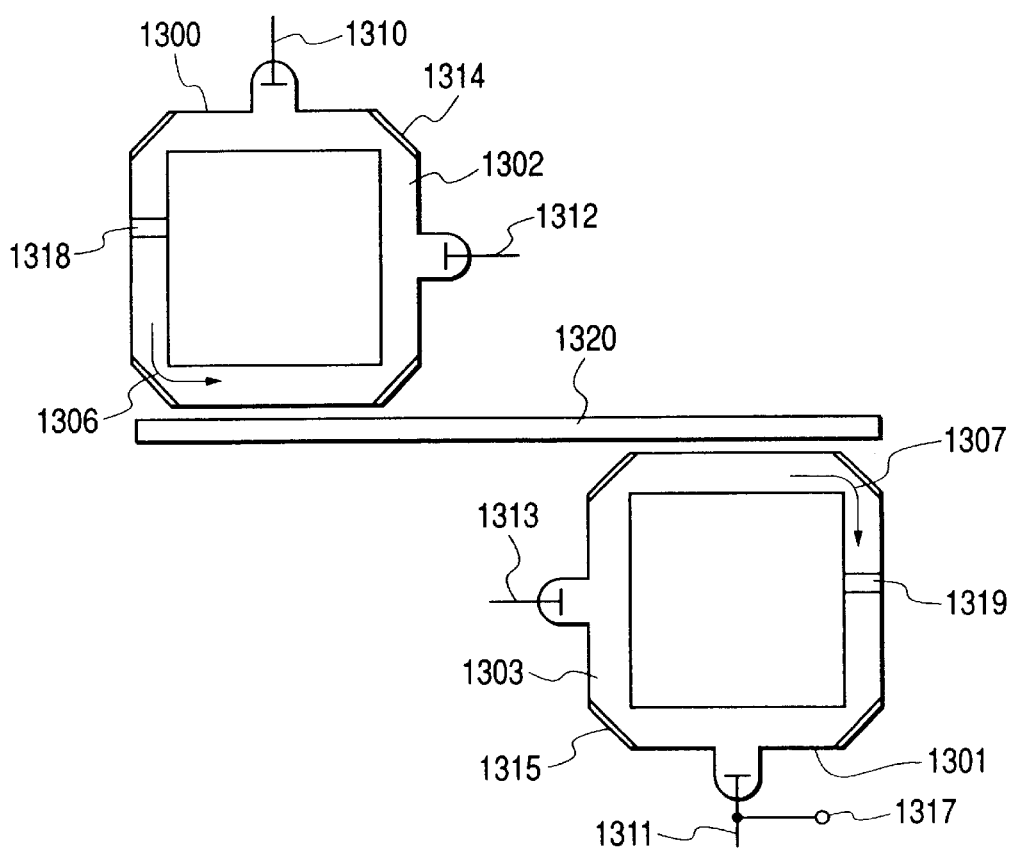

FIGS. 3C and 3D show two possible arrangements of optical waveguides for gas lasers. In FIGS. 3C and 3D, reference numerals 1310, 1312, 1313 and 1311 denote cathodes and anodes, while reference numeral 1317 denotes an electric terminal for taking out an electric signal generated as a result of rotation and reference numerals 1318 and 1319 denote optical elements such as optical isolators.

For the first and second lasers to generate respective main mode beams, they may be provided with respective tapered regions (1304, 1305) or with respective optical elements (1318, 1319). Alternatively, one of the lasers may be provided with a tapered region, while the other may be provided with an optical element.

The third optical waveguide 1320 as shown in each of FIGS. 3A through 3D can be prepared by using quartz or by means of a photolithography technique that is popularly used in semiconductor processes.

(3) When a third optical waveguide is provided to connect at least a part of the first and second optical waveguides (see FIGS. 4A through 4D).

Figure 4A:
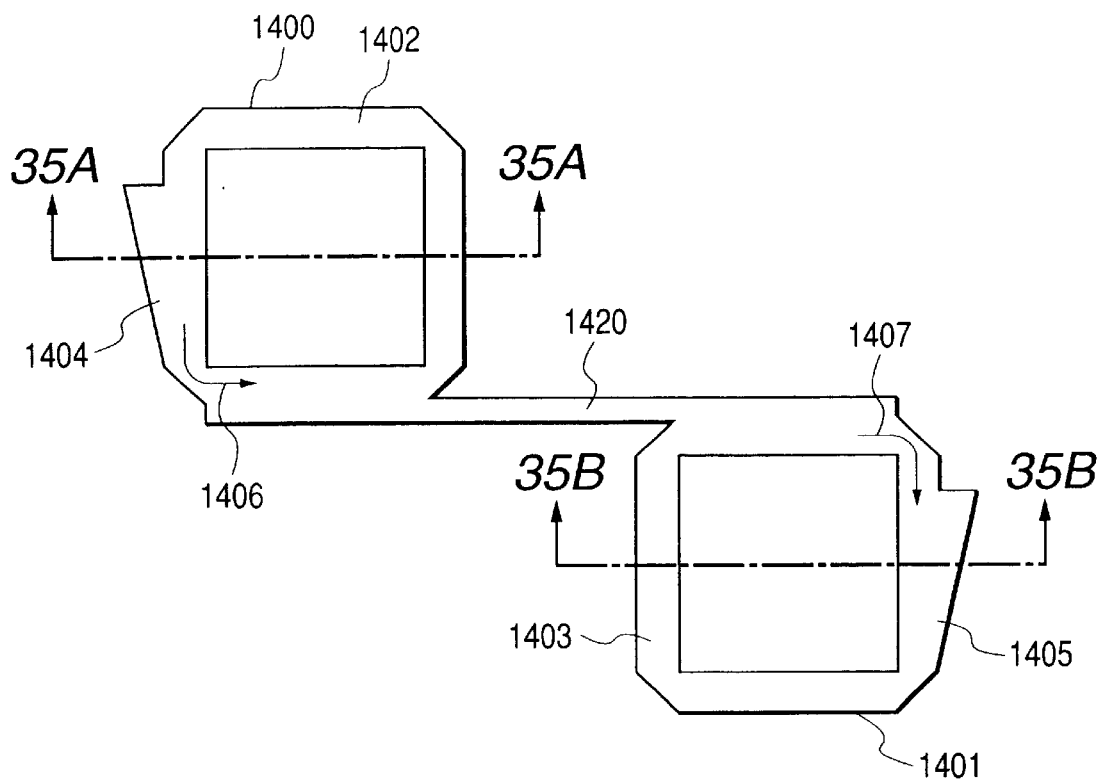
FIGS. 4A, 4B, 4C and 4D are schematic views of a laser also illustrating the present invention.

In FIG. 4A, reference numeral 1400 denotes the first laser having the first optical waveguide 1402 including a tapered region 1404 and adapted to generate a CCW beam 1406 as a main mode of operation, whereas reference numeral 1401 denotes the second laser having the second optical waveguide 1403 including a tapered region 1405 and adapted to generate a CW beam 1407 as a main mode of operation. Reference numeral 1420 denotes a third optional waveguide for the connection.

Thus, with this arrangement, the CCW beam 1406 of the first laser 1400 coexists with the CW beam 1407 in the second laser 1401. Therefore, the change in the electric signal due to the rotation of the gyro is detected from the second laser 1401 in order to detect the sense of rotation.

Figure 4B:
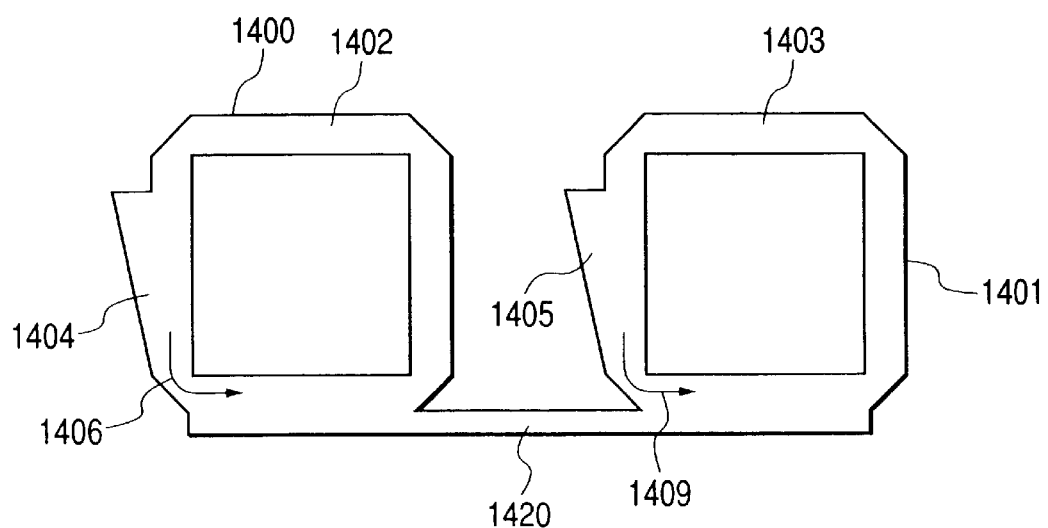

FIG. 4B shows another possible arrangement.

Figure 4C:
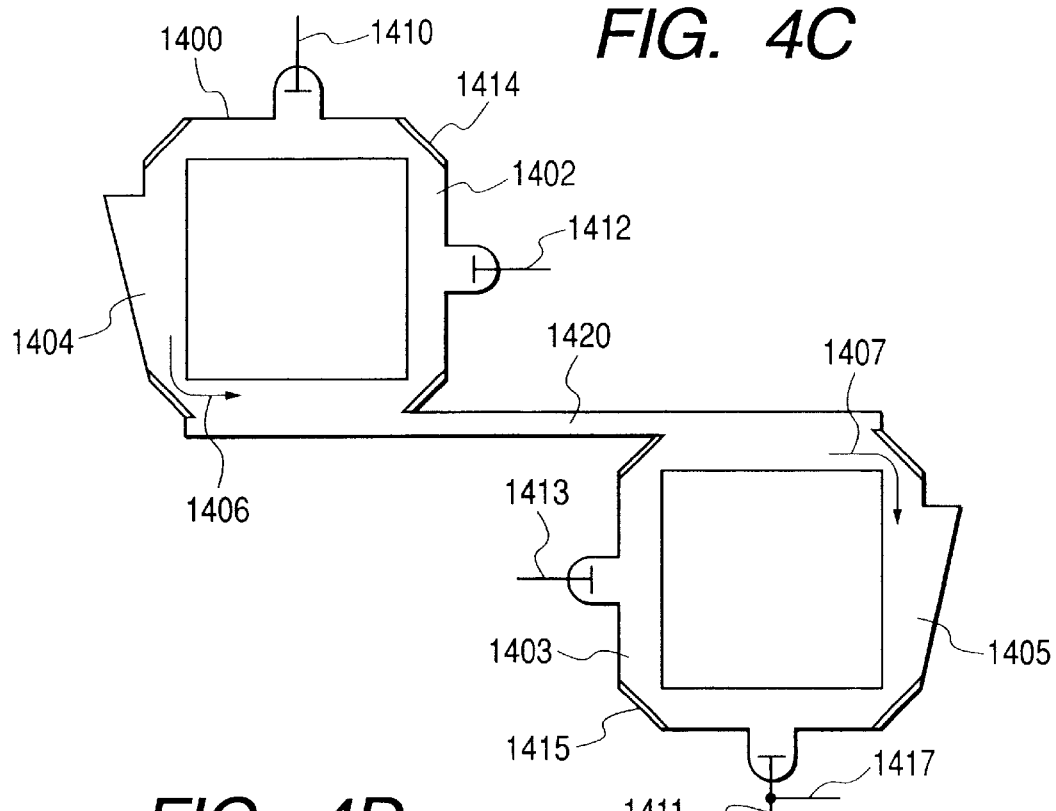
Figure 4D:
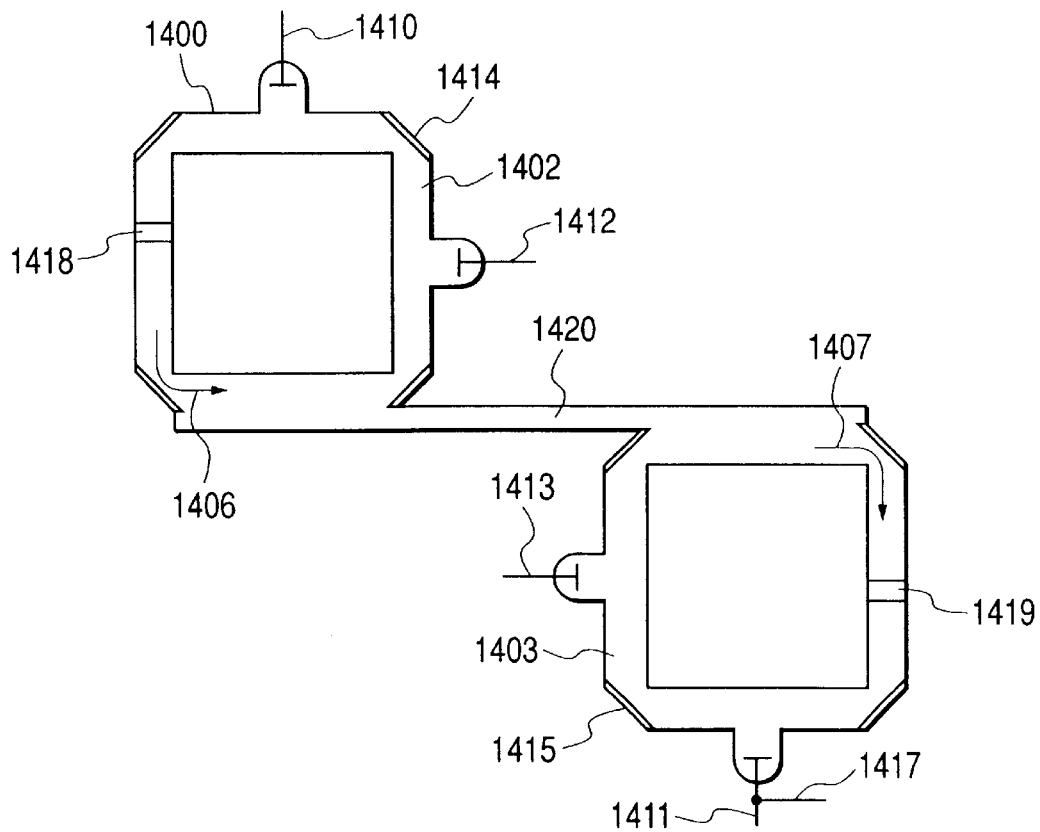

FIGS. 4C and 4D show two possible arrangements of optical waveguides for gas lasers. In FIGS. 4C and 4D, reference numerals 1410, 1412, 1411 and 1413 denote cathodes and anodes, while reference numerals 1414 and 1415 denote mirrors and reference numeral 1417 denotes an electric terminal for taking out an electric signal.

(4) When the first optical waveguide and the second optical waveguide are at least partly shared (see FIGS. 5A through 5D).

Figure 5A:
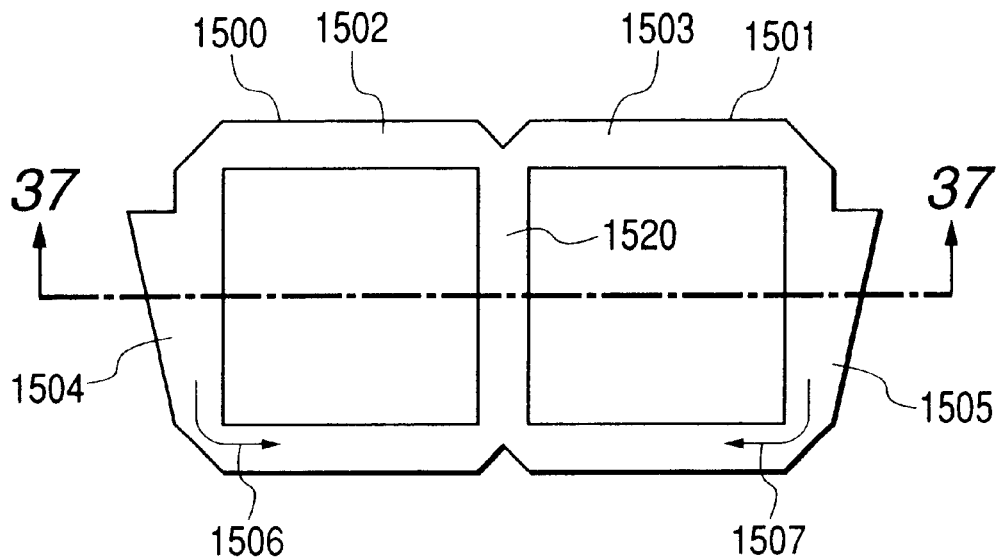
FIGS. 5A, 5B, 5C and 5D are schematic views of a laser also illustrating the present invention.

Referring to FIG. 5A, reference numeral 1500 denotes the first laser and reference numeral 1501 denotes the second laser having respective tapered regions 1504, 1505, while reference numeral 1520 denotes the parts of the optical waveguides thereof that are shared by them.

The main mode beam 1506 of the first laser 1500 propagates through the shared part 1520 and is coupled to the second laser. On the other hand, the main mode beam 1507 of the second laser 1501 also propagates through the shared part 1520 and is coupled to the first laser. Thus, two laser beams having different oscillation frequencies coexist in both the first and second lasers.

Thus, a beat frequency is produced even when the gyro is held stationary so that, once the gyro is driven to rotate, both the sense of rotation and the angular velocity of the gyro can be detected by detecting the change in the electric signal caused by the rotary motion of the gyro.

It may be understood that only one of the electric signals of the first and second lasers may be detected for the purpose of the invention, although the accuracy of detection of the rotary motion can be improved by using the two electric signals.

Figure 5B:
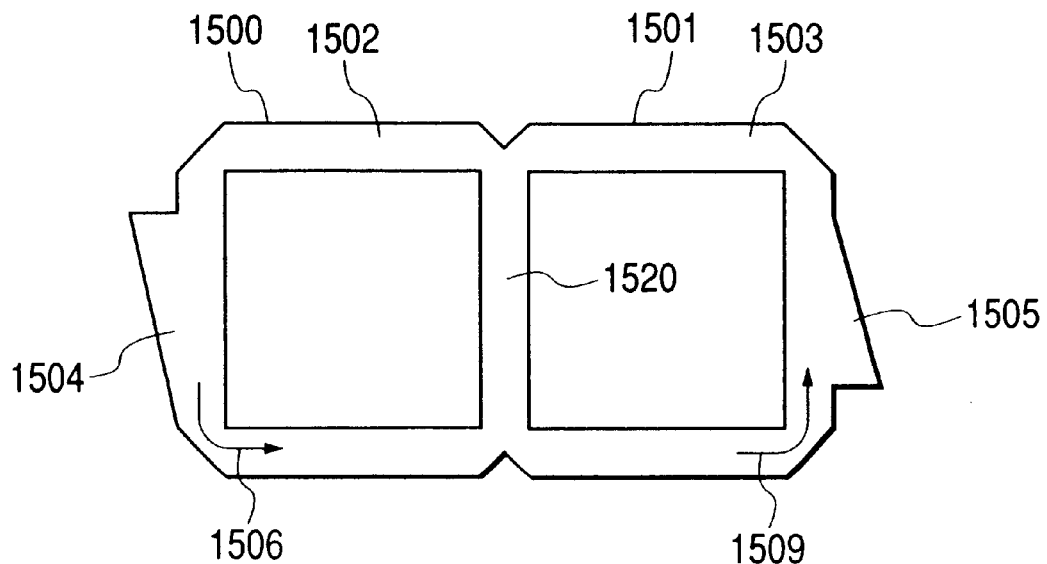

The main mode beams of the first and second lasers may be made to propagate in the same direction as shown in FIG. 5B. In this case, the first laser beam 1506 and the second laser beam 1509 coexists in the shared part 1520.

Figure 5C:
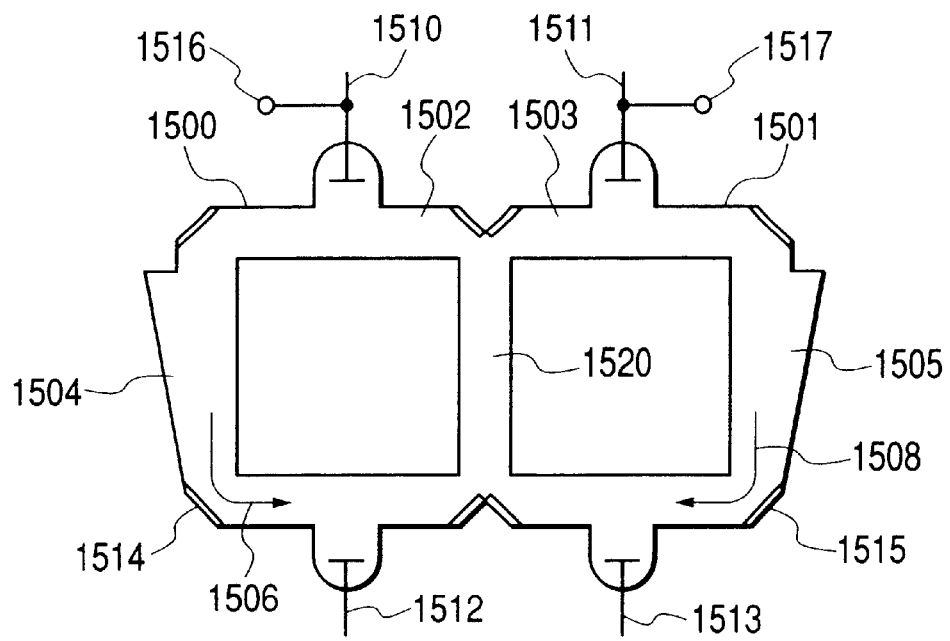
Figure 5D:
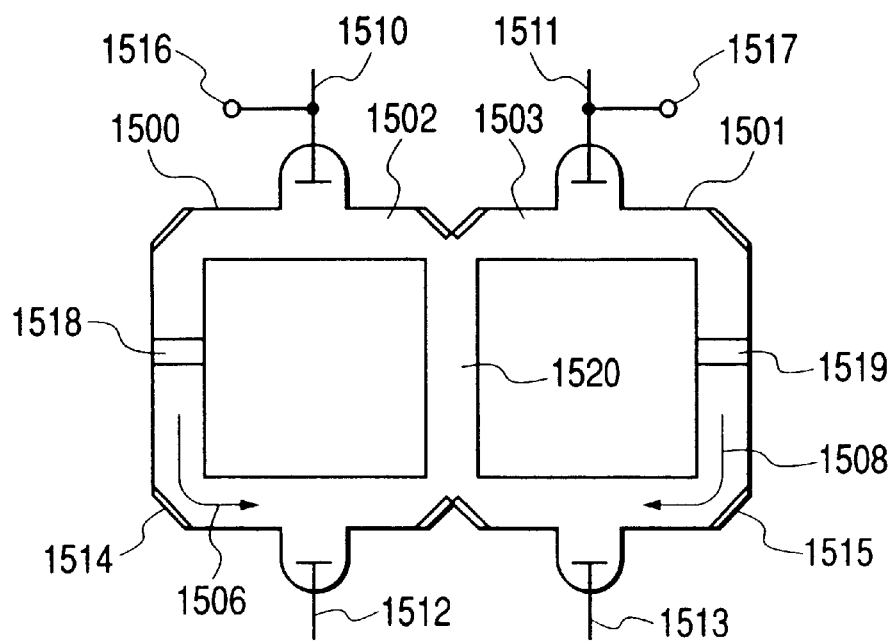

FIGS. 5C and 5D show two possible arrangements of optical waveguides sharing a part thereof for gas lasers, where two laser beams have respective oscillation frequencies that are different from each other coexist in the shared part.

While the lasers of (1) through (4) above have a rectangular profile, their profiles are not necessarily limited to a rectangular shape but may alternatively be triangular, circular or polygonal.

Figure 54:
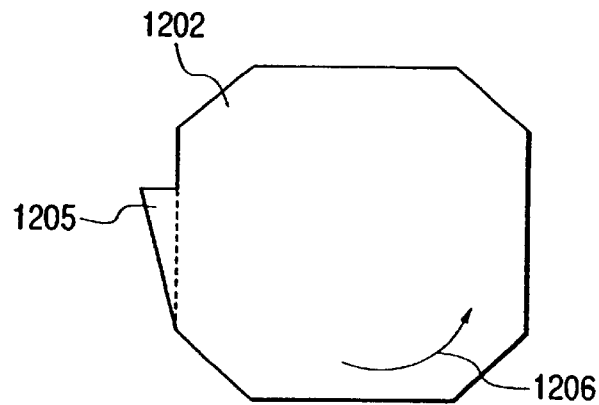
FIG. 54 is a schematic illustration of a laser device according to the invention.
Figure 55:
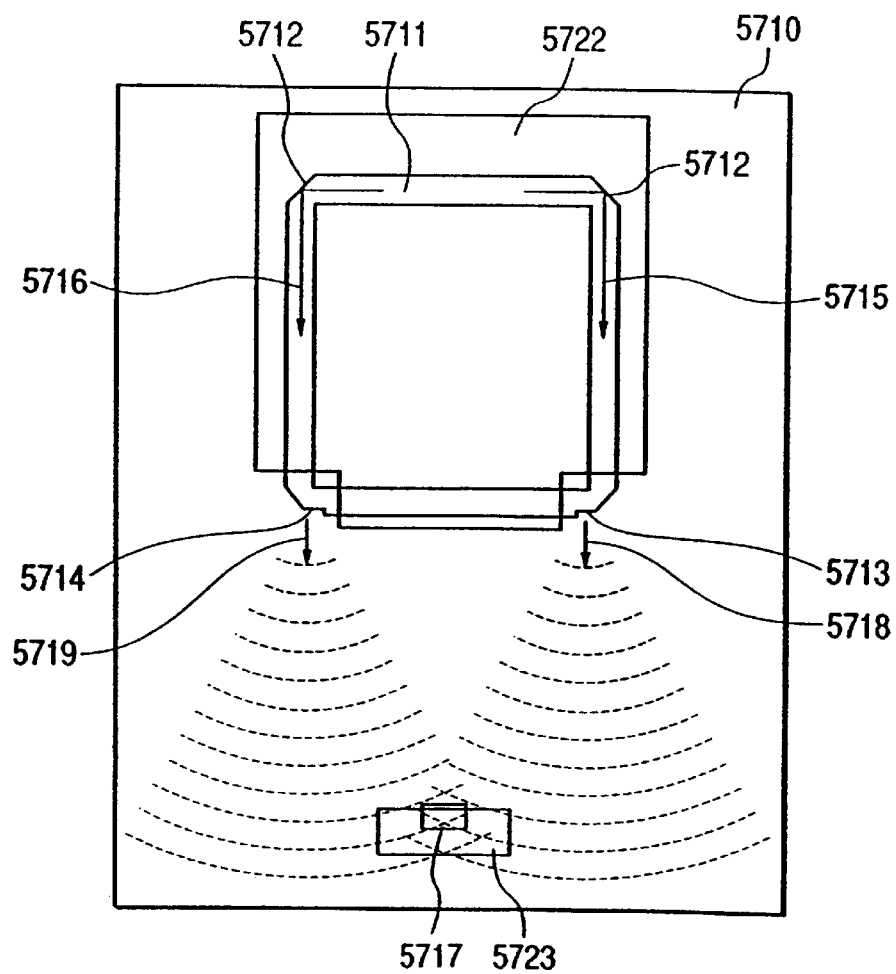
FIG. 55 is a schematic illustration of a known gyro.
Figure 56:
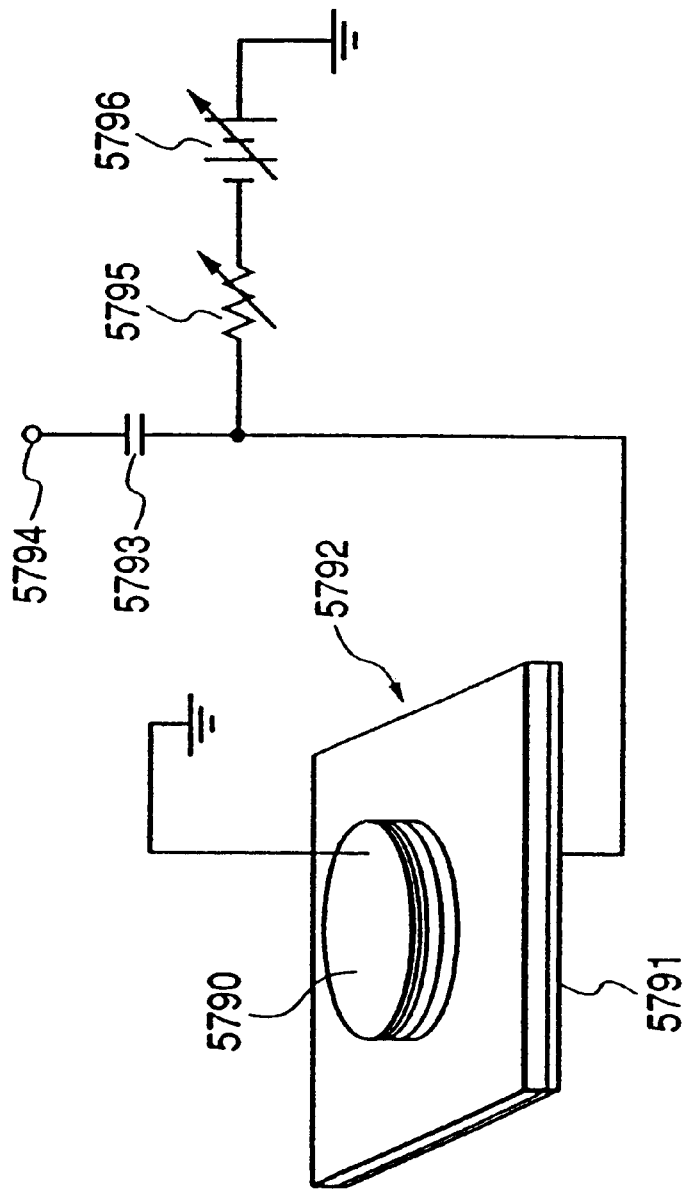
FIG. 56 is a schematic illustration of another known gyro.

Similarly, while the lasers of (1) through (4) above have a ring-shaped optical waveguide, they may alternatively have an optical waveguide having a configuration as a portion denoted by numeral 1202 shown in FIG. 54 so long as they can generate a principal mode beam propagating in one direction. In FIG. 54, reference numeral 1205 denotes a tapered region and reference numeral 1206 denotes a main mode beam.

Now, the configuration of the tapered region provided for generating a laser beam to be propagated in a direction as one main mode of operation will be discussed in detail by referring to FIG. 6.

Figure 6:
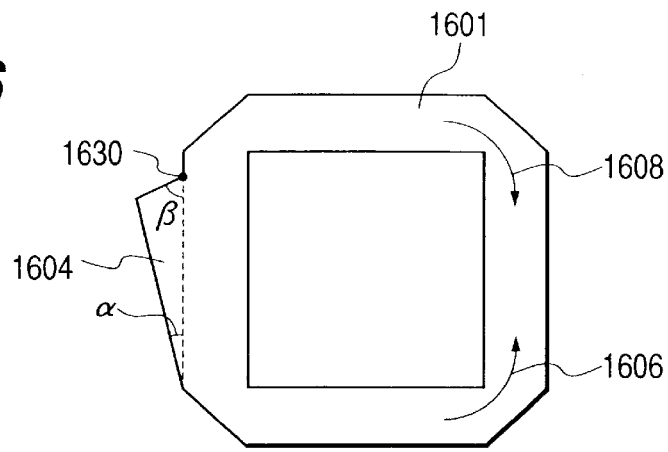
FIG. 6 is a schematic view of a laser also illustrating the present invention.

In FIG. 6, reference numeral 1601 denotes an optical waveguide and reference numeral 1604 denotes a tapered region.

If the tapered region 1604 were not there, both a CW beam 1608 and a CCW beam 1606 would be generated there. However, as a result of the provision of the asymmetrically arranged tapered region, the CW beam and the CCW beam show a difference of optical loss. Then, as one of the angles, or angle β, of the tapered region is raised to become close to 90°, the intensity of the CW beam is reduced to make the CCW beam to be the main mode beam. As a matter of fact, the closer the angle to 90°, the smaller the intensity of the CCW beam. It will be appreciated that the CW beam will be the main mode beam when the other angle, or angle α, is equal to 90°.

For substantially generating only a single laser beam that is propagating in a single direction, one of the angles of the tapered region is defined by 80°≦β (or α)≦100°, preferably by 83°≦β (or α)≦97°, more preferably 87°≦β (or α)≦93°. Optimally, the angle is defined by β (or α)=90°.

Particularly when β (or α)=90°, the oscillation mode is shifted stepwise at the originating point (as denoted by 1630 in FIG. 6) of the tapered region to reduce the efficiency of coupling to the waveguide mode of the optical waveguide having a constant width. Then, the main mode beam will be generated easily.

When α<β, and β is found within the above range, then α will be defined by 2°≦α≦10°, preferably by 3°≦α≦6°.

From the viewpoint of avoiding a locking-in phenomenon, the difference between the oscillation frequency of the main mode beam of the first laser and that of the main mode beam of the second laser should be greater than 100 Hz, preferably greater than 1 kHz, more preferably greater than 10 kHz.

The oscillation frequencies of the two principal mode beams can be differentiated by selecting different materials for the lasers, by differentiating the intensity of the electric current injected into the first laser from that of the electric current injected into the second laser, by differentiating the voltage applied to the first laser from the voltage applied to the second laser or by differentiating the width or the length of the first optical waveguide from that of the second optical waveguide.

When two laser beams having different oscillation frequencies coexist in the laser device, the two laser beams interfere with each other so that a beat frequency can be detected as an electric signal.

The electric signal taken out from the laser device will be a voltage signal when the device is driven with a constant current, whereas the electric signal taken out from the laser device will be a current signal when the device is driven with a constant voltage. Alternatively, an impedance signal may be taken out from the laser device.

Since the frequency of the taken out voltage signal, the current signal or the impedance signal corresponds to the above beat frequency, it is possible to detect the angular velocity and the sense of rotation of the laser device by detecting the change in the beat frequency.

Now, the means for taking out the electric signal from the laser device will be discussed. Note that the following description is applicable to the arrangement of detecting the sense of rotation and/or the angular velocity from the signal produced by the photodetector of the second embodiment which will be described hereinafter.

The means for detecting the signal representing the change in the voltage of the laser device will be described below. Note that two laser beams having different oscillation frequencies coexist in the laser device as in the case of 1201 in FIG. 2A.

Figure 11:
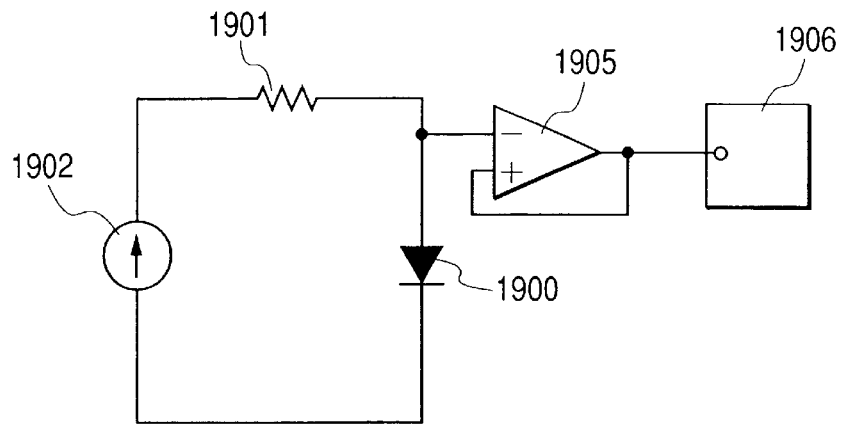
FIG. 11 is a schematic circuit diagram of a circuit for taking out an electric signal that can be used for the purpose of the invention.

Referring to FIG. 11, a constant current source 1902 is connected to a semiconductor laser 1900 by way of a resistor 1901. Then, the electric signal of the semiconductor laser 1900 (which is a voltage signal) is detected by means of a voltage detection circuit 1906.

Whenever necessary, it is desirable to arrange a voltage follower circuit 1905 as a protection circuit.

While FIG. 11 shows a semiconductor laser, the above description can be applied also to a gas laser.

Figure 12:
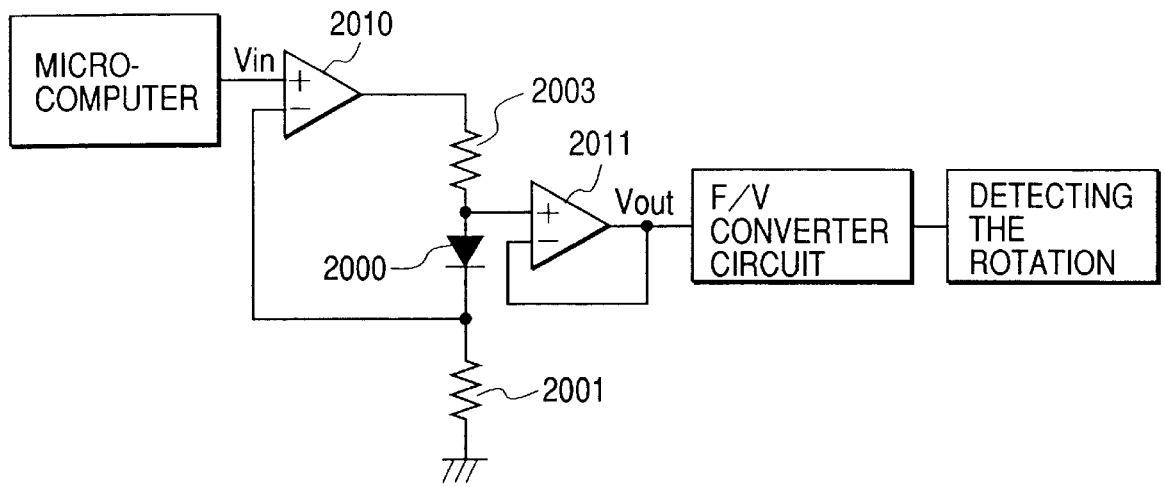
FIG. 12 is a schematic circuit diagram of another circuit for taking out an electric signal that can be used for the purpose of the invention.

FIG. 12 also shows a schematic circuit diagram of another circuit arrangement that can also be used when a semiconductor laser 2000 is driven with a constant current and the change in the anode potential thereof is read out to detect the rotary motion, if any, of the laser. Reference numeral 2001 denotes a resistor.

Referring to FIG. 12, the anode of the semiconductor laser 2000 is connected to the output terminal of an operational amplifier 2010 by way of a protective resistor 2003 and the cathode of the semiconductor laser 2000 is connected to the inverting input terminal of the operational amplifier 2010.

Operational amplifier 2011 outputs signal Vout that corresponds to input potential Vin. Since the signal Vout has a beat frequency that is proportional to the angular velocity, the rotation of the laser device can be detected by converting the signal into a voltage by means of a known frequency/voltage converter circuit (F/V converter circuit).

Figure 13:
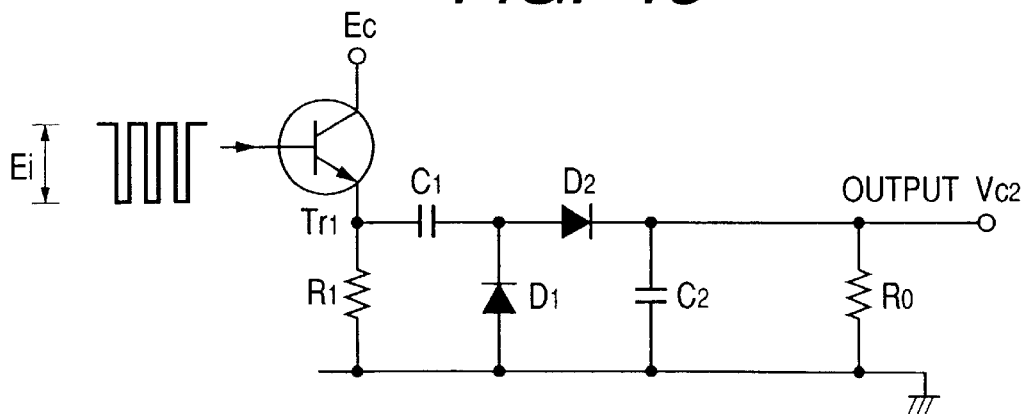
FIG. 13 is a schematic circuit diagram of still another circuit for taking out an electric signal that can be used for the purpose of the invention.

FIG. 13 is a schematic circuit diagram of an F/V converter circuit. The circuit comprises a transistor, diodes, capacitors and resistors and the output voltage $V_{C2}$ thereof is expressed by formula (14) below:

$$V_{C2}=E_i C_i R_0 f/[1+1/\{1-\exp(-1/R_0 C_2 f)\}] \quad (14)$$

where $E_i$ represents the peak-to-peak value of the input voltage and f represents the beat frequency. By selecting values that realize $C_2 >> C_i$ and $R_0 C_2 f < 1$ for the circuit parameters, the relationship as expressed by equation (15) below can be established to obtain a voltage output that is proportional to the beat frequency.

$$V_{C2}=E_i C_i R_0 f/2 \quad (15)$$

Now, the arrangement for detecting the rotation of the laser device through the change in the electric current will be discussed below.

Figure 15:
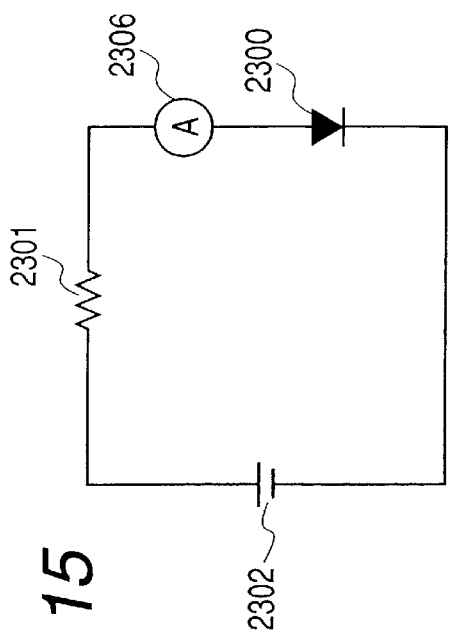
FIG. 15 is a schematic circuit diagram of still another circuit for taking out an electric signal that can be used for the purpose of the invention.
Figure 14:
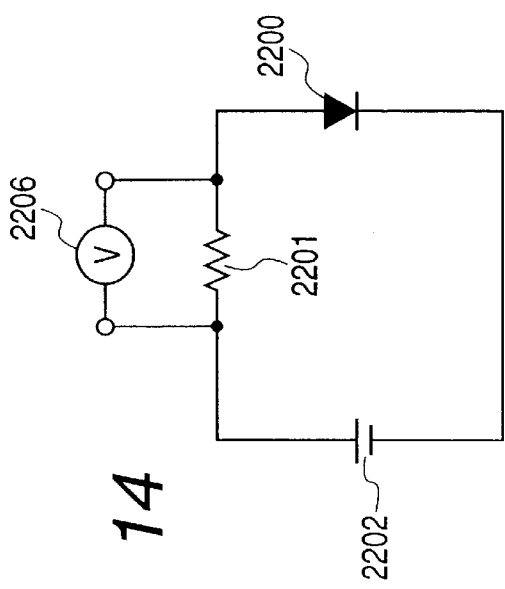
FIG. 14 is a schematic circuit diagram of still another circuit for taking out an electric signal that can be used for the purpose of the invention.

The angular velocity of the rotating laser device can be determined by detecting the change in the electric current flowing through the semiconductor laser by using a constant voltage source as power source. A compact and lightweight drive system can be obtained for the laser device by using a battery for the constant voltage source as shown in FIGS. 14 and 15. In the circuit of FIG. 14, the semiconductor laser 2200 is connected to a resistor 2201 in series so that the change in the electric current flowing through the semiconductor laser can be determined as the change in the voltage between the opposite ends of the electric resistor. In FIG. 14, reference numeral 2202 denotes a battery and reference numeral 2206 denotes a voltmeter. In the circuit of FIG. 15, on the other hand, the semiconductor laser 2300 is connected to an ammeter 2306 in series to directly observe the electric current flowing through the semiconductor laser. In FIG. 15, reference numeral 2301 denotes an electric resistor, and reference numeral 2302 is a battery.

Now, another circuit configuration that can be used for detecting a beat signal for the purpose of the invention will be discussed below.

Figure 16:
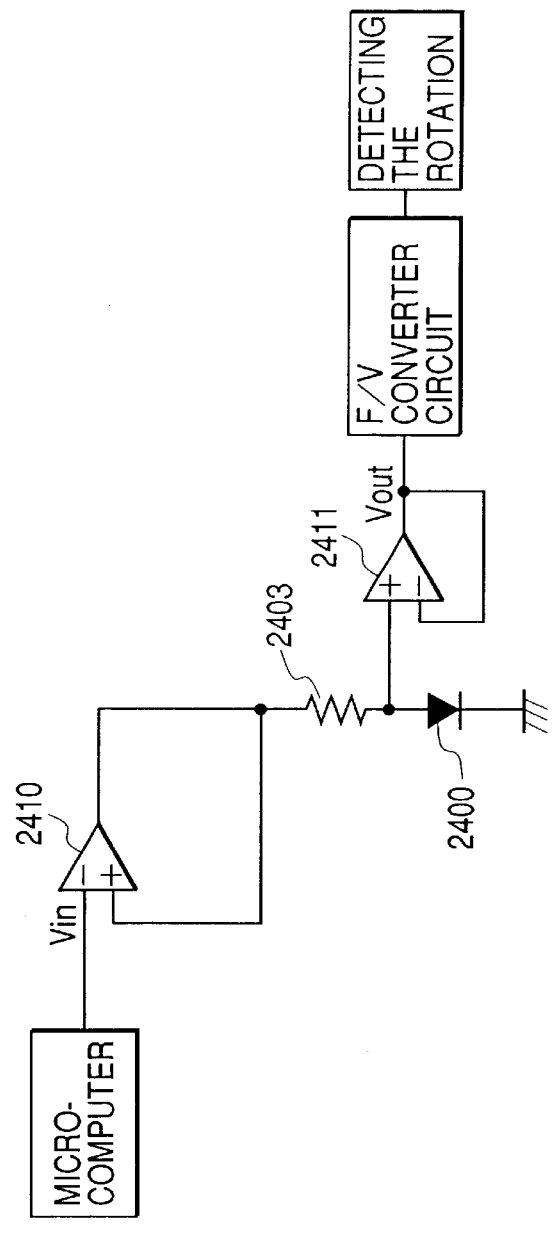
FIG. 16 is a schematic circuit diagram of still another circuit for taking out an electric signal that can be used for the purpose of the invention.

FIG. 16 is a circuit diagram of a circuit for detecting the rotation of a semiconductor laser 2400 by applying a constant voltage thereto in order to drive it and read the change in the anode potential of the semiconductor laser 2400.

The anode of the laser 2400 is connected to the output terminal of an operational amplifier 2410 by way of a resistor 2403 and the cathode of the laser 2400 is grounded to show a reference potential.

A constant voltage drive arrangement can be obtained by applying a constant potential (Vin) to the inverting input terminal of the operational amplifier 2410 by means of, for instance, a microcomputer, so that the potential may constantly be applied to the resistor 2403 and the laser 2400.

The electric resistor 2403 is connected to another operational amplifier 2411 that operates as a buffer.

The operational amplifier 2411 outputs signal Vout, which has a beat frequency that is proportional to the angular velocity so that the rotation of the laser device can be detected by transforming the frequency into a voltage by means of a known F/V converter circuit. It may be needless to say that it is also possible to detect the rotation of the laser device by applying the signal obtained at a point equipotential with the electric resistor 2403 directly to the F/V converter circuit, not passing through operational amplifier 2411. A frequency counter circuit may be used as a beat signal detection circuit.

Figure 17:
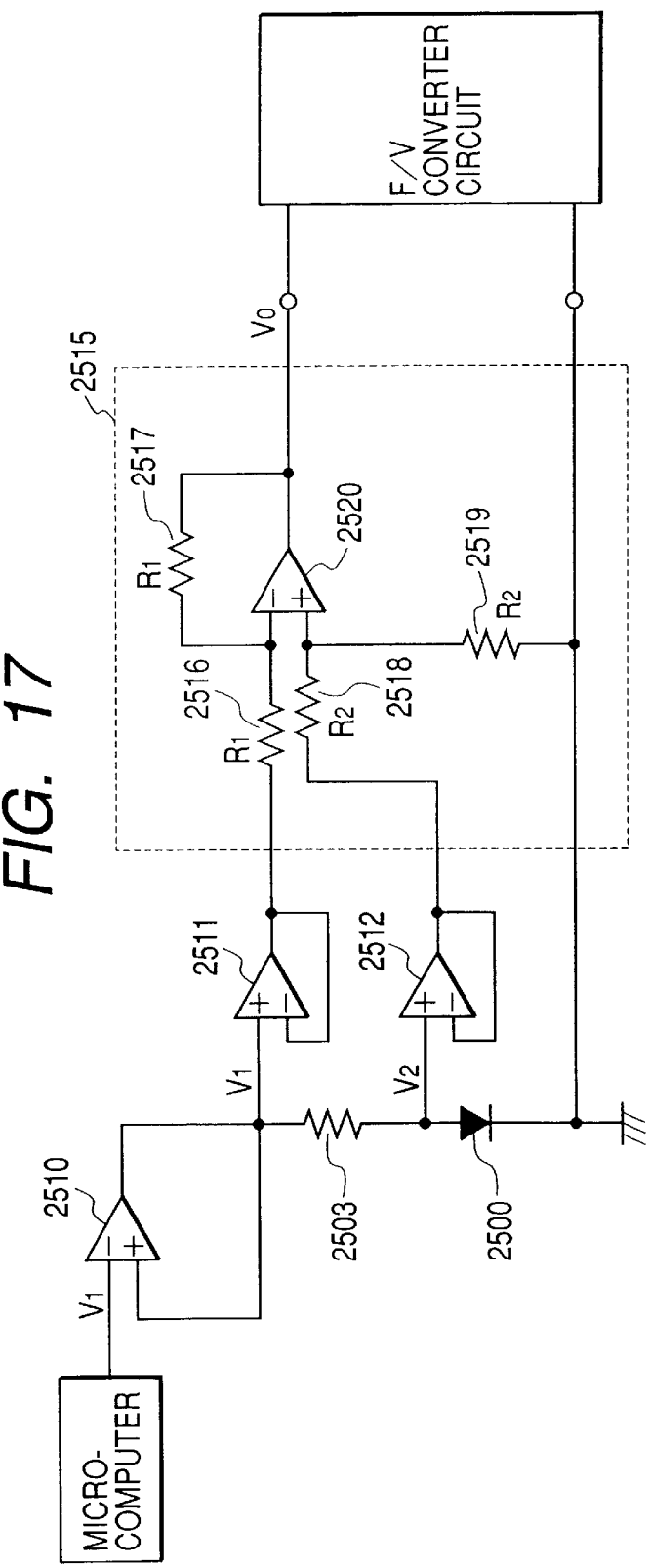
FIG. 17 is a schematic circuit diagram of still another circuit for taking out an electric signal that can be used for the purpose of the invention.

FIG. 17 shows a circuit diagram of a circuit adapted to use the ground potential as reference potential for the signal by using a subtraction circuit 2515 in addition to the constant voltage drive arrangement as described above by referring to FIG. 16.

Referring to FIG. 17, a constant voltage $V_1$ is applied to the inverting input terminal of operational amplifier 2510 by means of, for instance, a microcomputer. In FIG. 17, reference numeral 2500 denotes a laser device and reference numerals 2511 and 2512 denote respective voltage followers, while reference numerals 2503 and 2516 through 2519 respectively denote electric resistors. The resistors 2516 and 2517 have a common electric resistance, whereas resistors 2518 and 2519 have a common electric resistance.

The potentials $V_1$ and $V_2$ at the opposite ends of the electric resistor 2503 are applied respectively to the inverting input terminal and the non-inverting input terminal of the operational amplifier 2520 by way of the voltage followers 2511, 2512 and the resistors 2516 and 2518. With this arrangement, the change in the voltage $V_2-V_1$ (=$V_0$) being applied to the resistor 2503 can be detected to detect the change in the electric current flowing through the laser device 2500 by using the ground potential as reference potential.

Then, the rotation of the laser device can be detected from the obtained signal after making it pass through an F/V converter circuit.

Figure 18:
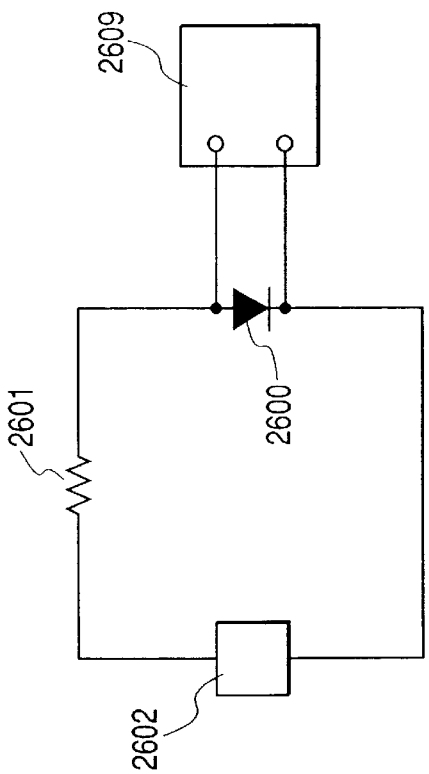
FIG. 18 is a schematic circuit diagram of still another circuit for taking out an electric signal that can be used for the purpose of the invention.

It is also possible to observe the change in the impedance of the semiconductor laser 2600 directly by means of an impedance meter 2609 as shown in FIG. 18 regardless of the type of the power source. In FIG. 18, reference numeral 2602 denotes a power source, and reference numeral 2601 is a resistor. With this arrangement, the influence of the noise of the drive power source can be reduced unlike the case where the terminal voltage applied to or the electric current flowing through the laser device is observed.

While various arrangements for detecting the rotation of a laser device are described above in terms of a semiconductor laser, it will be appreciated that the above description equally applies to a gas laser.

Embodiment 2

While the first embodiment is arranged in such a way that an electric signal is taken out from the laser device as the change in the beat frequency that represents the change in the voltage applied to the laser device or the electric current flowing through the laser device, the second embodiment is arranged in such a way that the two laser beams generated by the laser device with different oscillation frequencies are received by a photodetector located outside the laser device and the signal obtained from the photodetector is used to detect the change in the beat frequency as representing an angular velocity or the sense of rotation.

(1) FIGS. 7A Through 7F

In FIGS. 7A through 7F, the components that are the same as those of FIGS. 2A through 2E are denoted respectively by the same reference numerals.

Figure 7A:
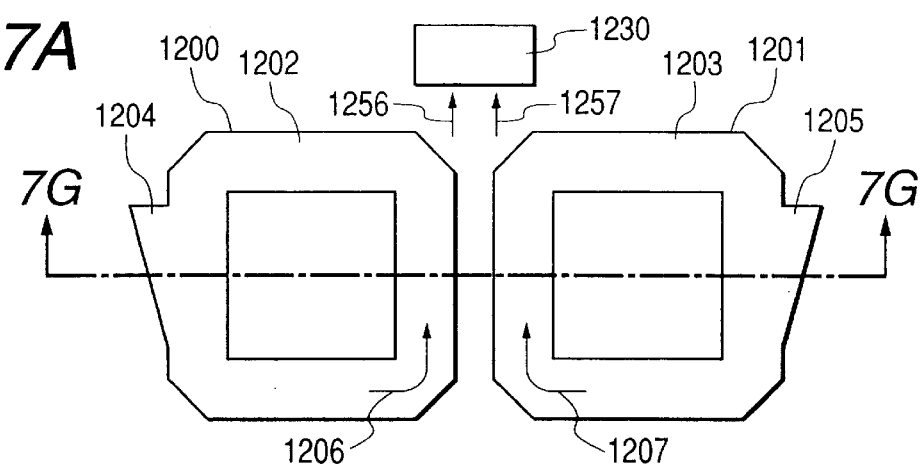
Figure 7B:
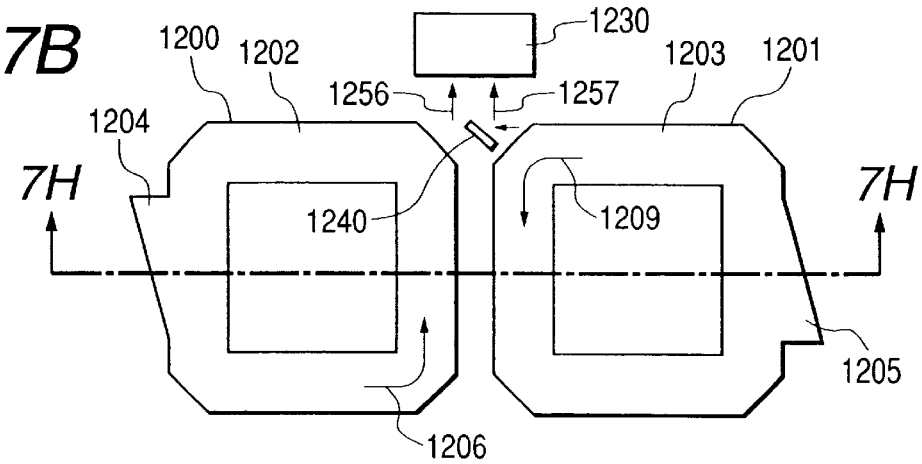
Figure 7C:
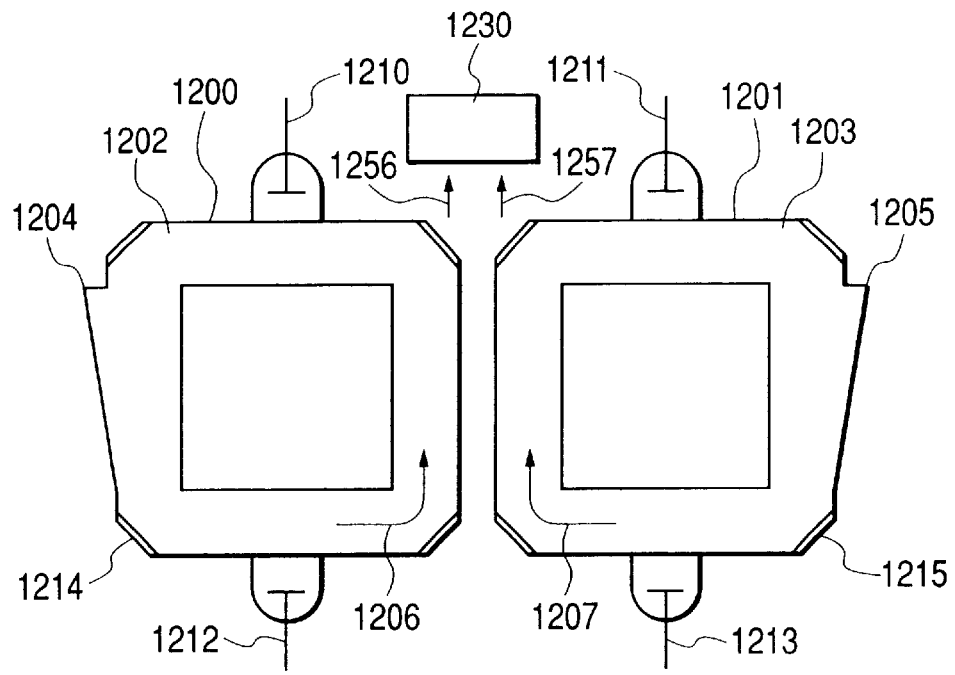

Referring firstly to FIGS. 7A and 7C, reference numeral 1256 denotes the output beam of the main mode beam 1206 of the first laser 1200 and reference numeral 1257 denotes the output beam of the main mode beam 1207 of the second laser 1201, while reference numeral 1230 denotes a photodetector for detecting the signal representing the difference in the oscillation frequencies of the two beams generated as a result of the interference of the two output beams 1256 and 1257.

Figure 7D:
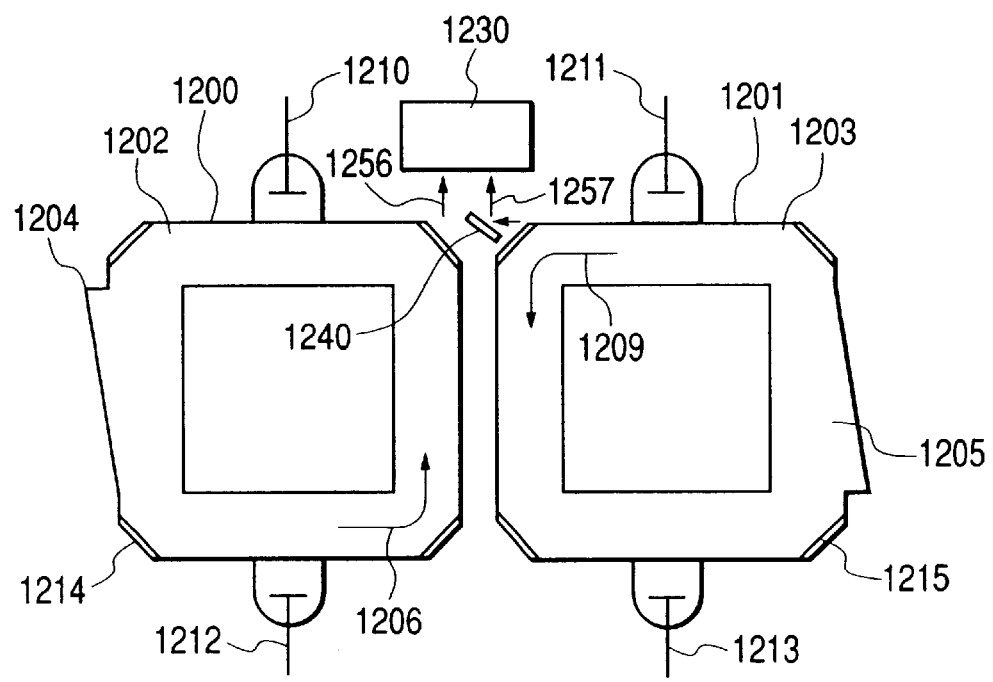

In FIGS. 7B and 7D showing possible alternative configurations of the second embodiment, reference numeral 1240 denotes a mirror.

Figure 7E:
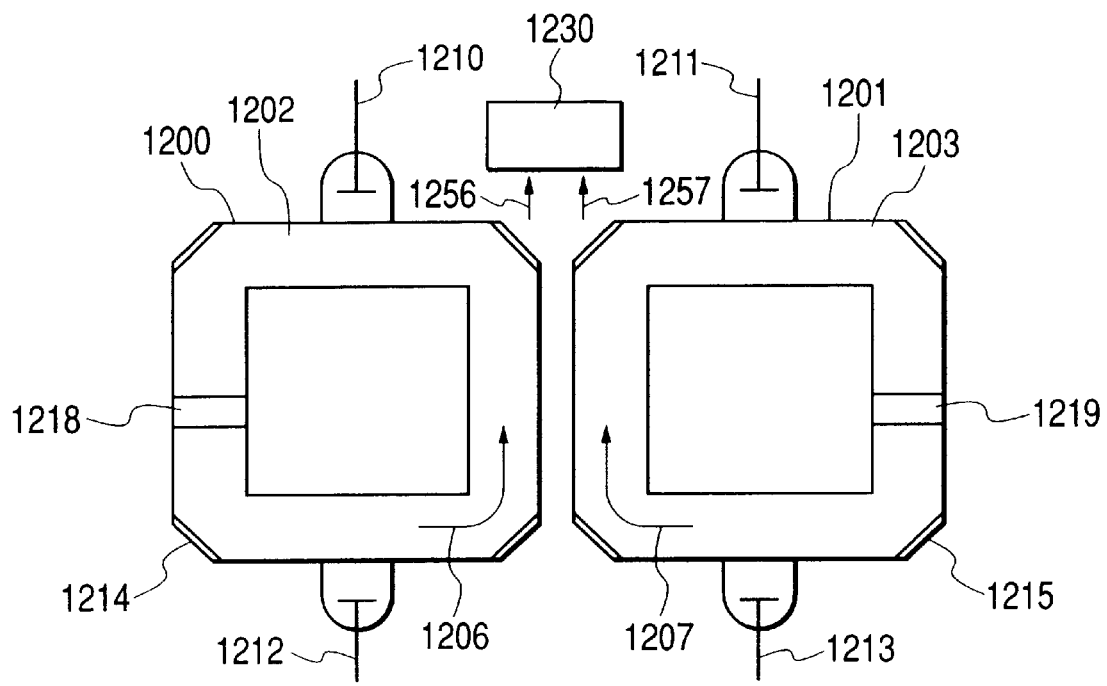
Figure 7F:
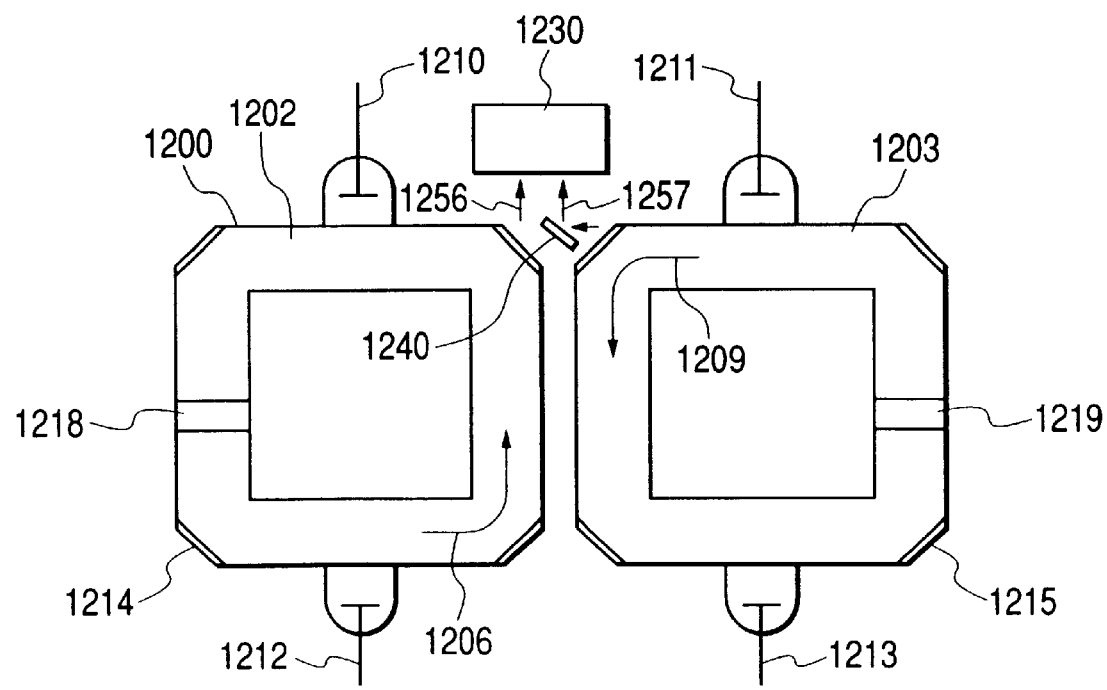

FIGS. 7E and 7F shows configurations where the tapered regions 1204, 1205 in FIGS. 7C and 7D are replaced by optical isolators. Note that FIGS. 7A and 7B show semiconductor lasers, whereas FIGS. 7C through 7F show gas lasers.

Also note that the first and second lasers (1200, 1201) do not have to be located in proximity relative to each other nor does one laser have to be located within the penetrating depth of the laser beam of the other when the output beams 1256, 1257 having different oscillation frequencies are received by the photodetector 1230 as shown in any of FIGS. 7A through 7H.

(2) FIGS. 8A Through 8D

In FIGS. 8A through 8D, the components that are the same as those of FIGS. 3A through 3D are denoted respectively by the same reference numerals.

In FIGS. 8A through 8D, reference numerals 1356 and 1357 respectively denote the output beams from first and second lasers, while reference numeral 1330 denotes a photodetector.

The two output beams from a third optical waveguide 1320 optically coupling the main mode beams 1306, 1307 of the first and second lasers are received by the photodetector 1330. The rotation of the laser device is detected by the signal from the photodetector.

Figure 8A:
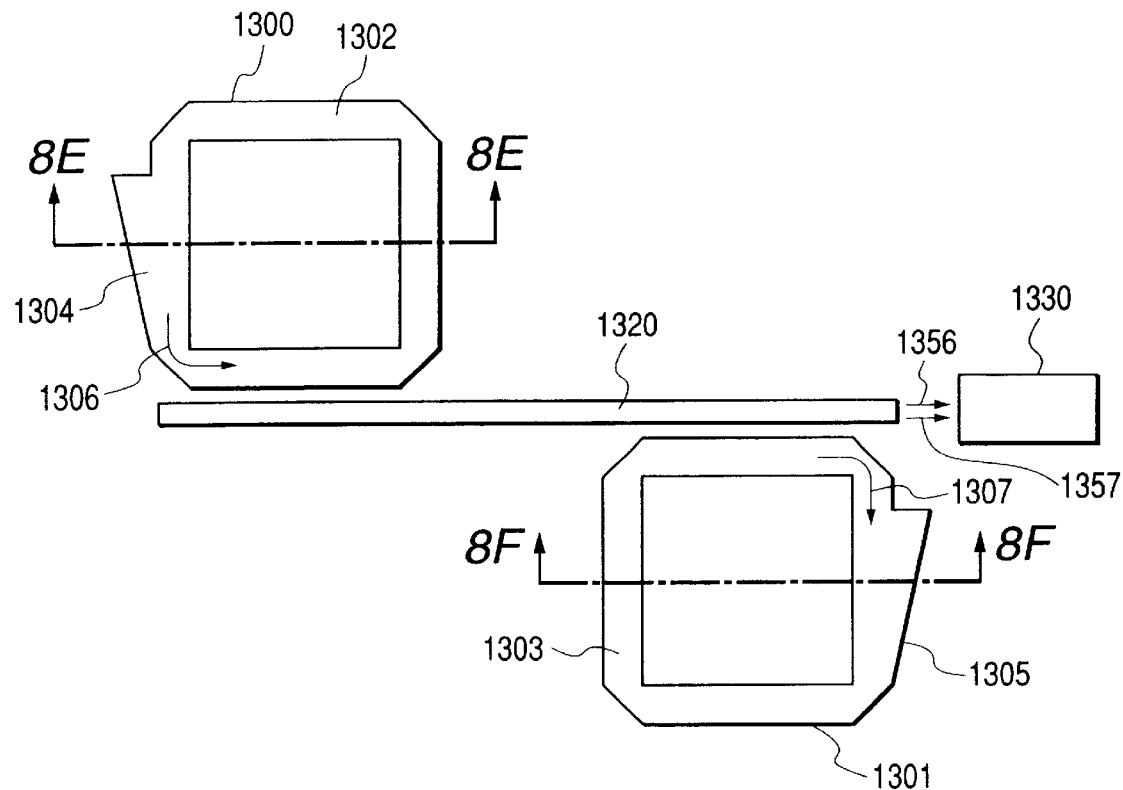
FIGS. 8A, 8B, 8C, 8D, 8E, and 8F are schematic views of a laser also illustrating the present invention.
Figure 8B:
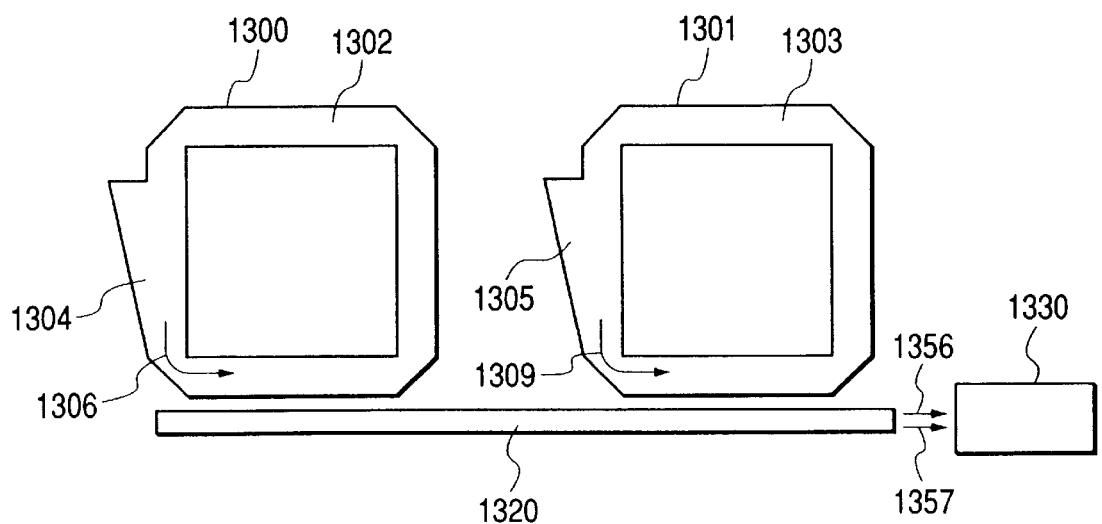
Figure 8C:
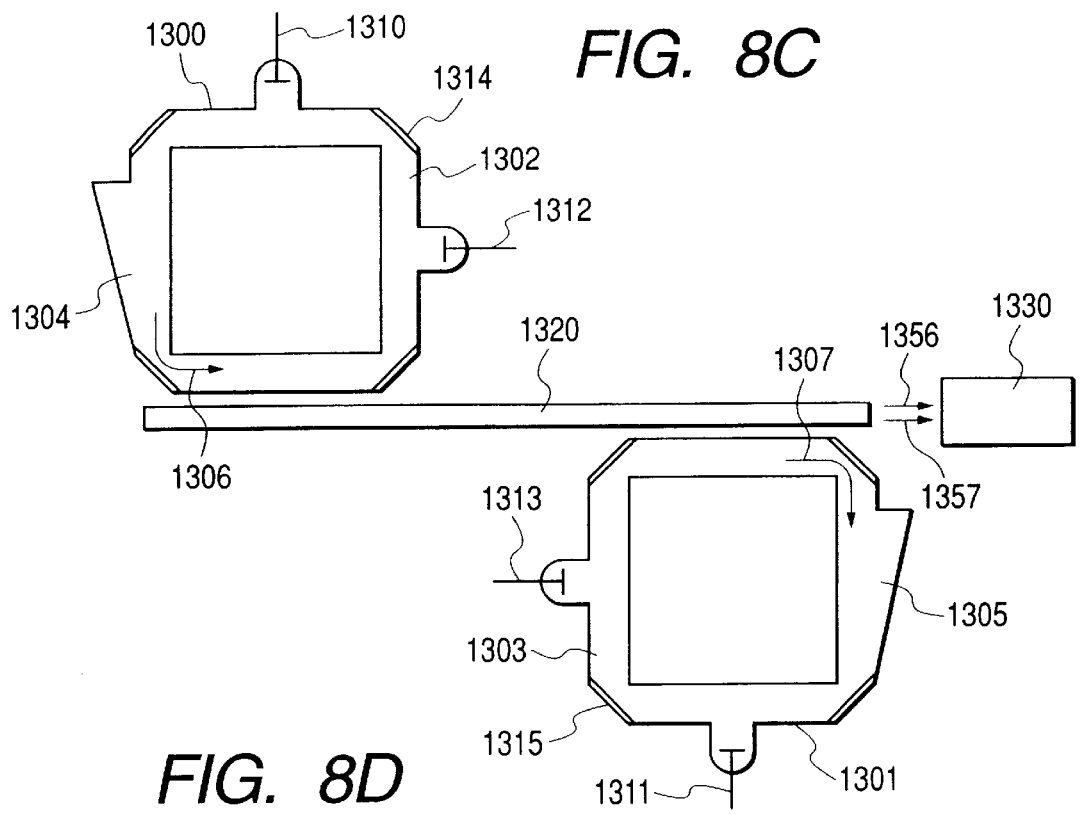
Figure 8D:
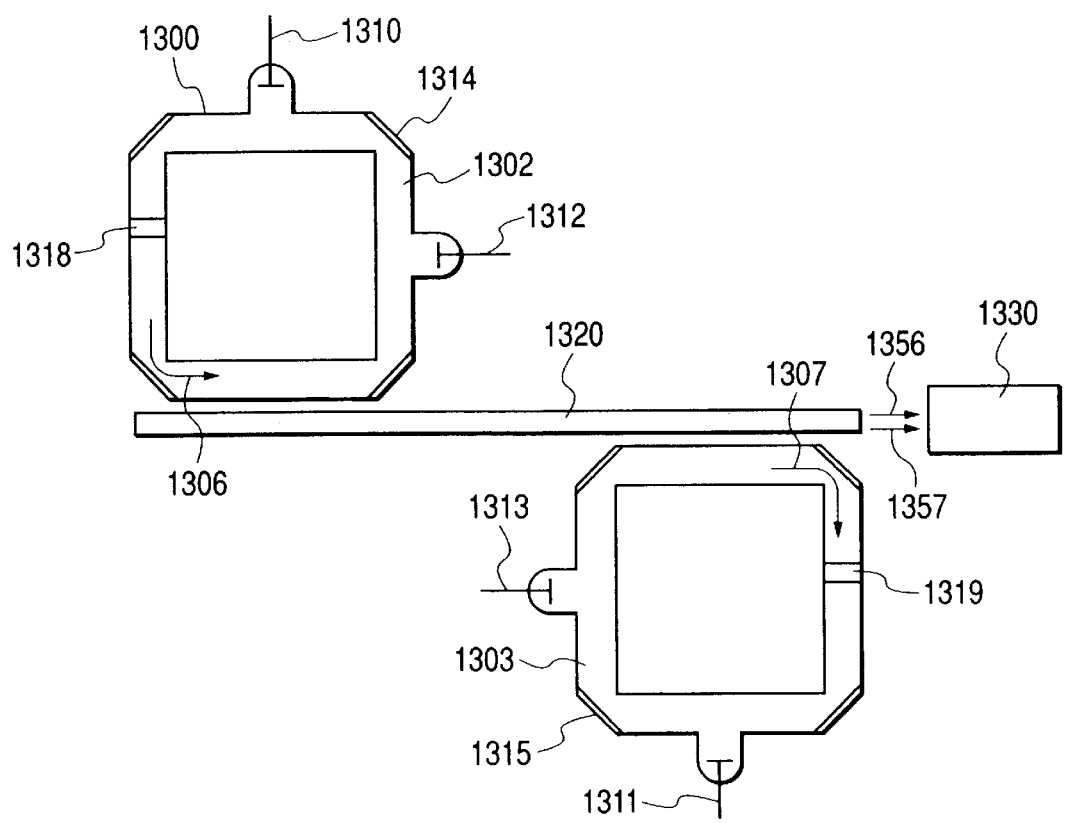

Note that FIGS. 8A and 8B show semiconductor lasers, whereas FIGS. 8C and 8D show gas lasers.

(3) FIGS. 9A Through 9D

A third optical waveguide is provided to connect the optical waveguides 1402, 1403 of the first and second lasers. In FIGS. 9A through 9D, the components that are the same as those of FIGS. 4A through 4D are denoted respectively by the same reference numerals.

In FIGS. 9A through 9D, reference numeral 1430 denotes a photodetector and reference numerals 1456, 1457 respectively denote output beams of the main mode beams of the first and second lasers.

Figure 9A:
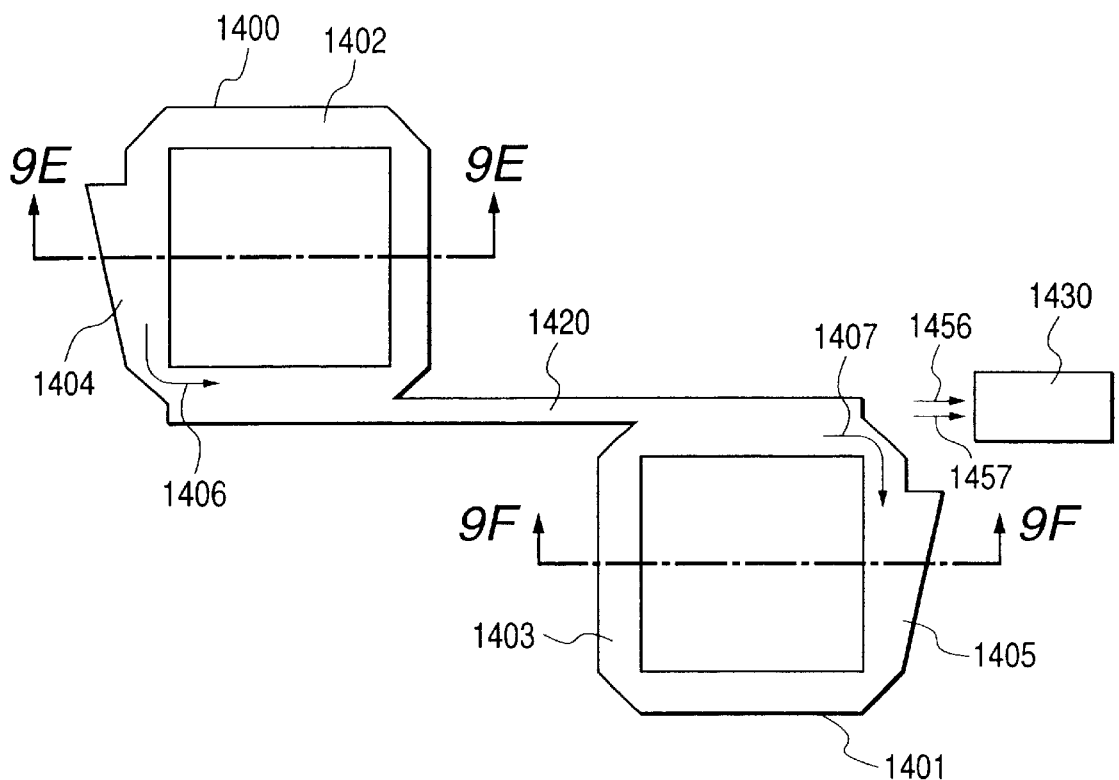
FIGS. 9A, 9B, 9C, 9D, 9E, and 9F are schematic views of a laser also illustrating the present invention.
Figure 9B:
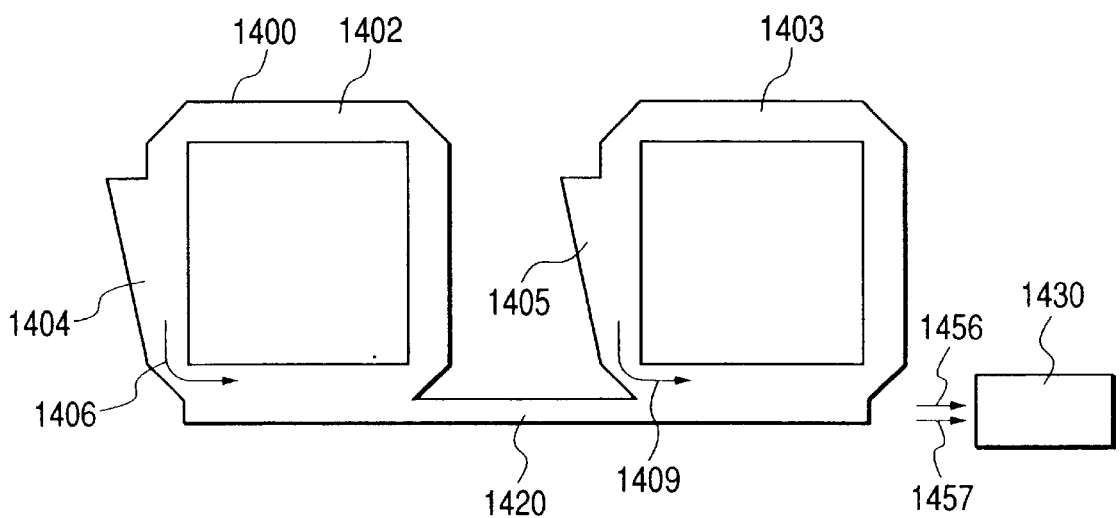
Figure 9C:
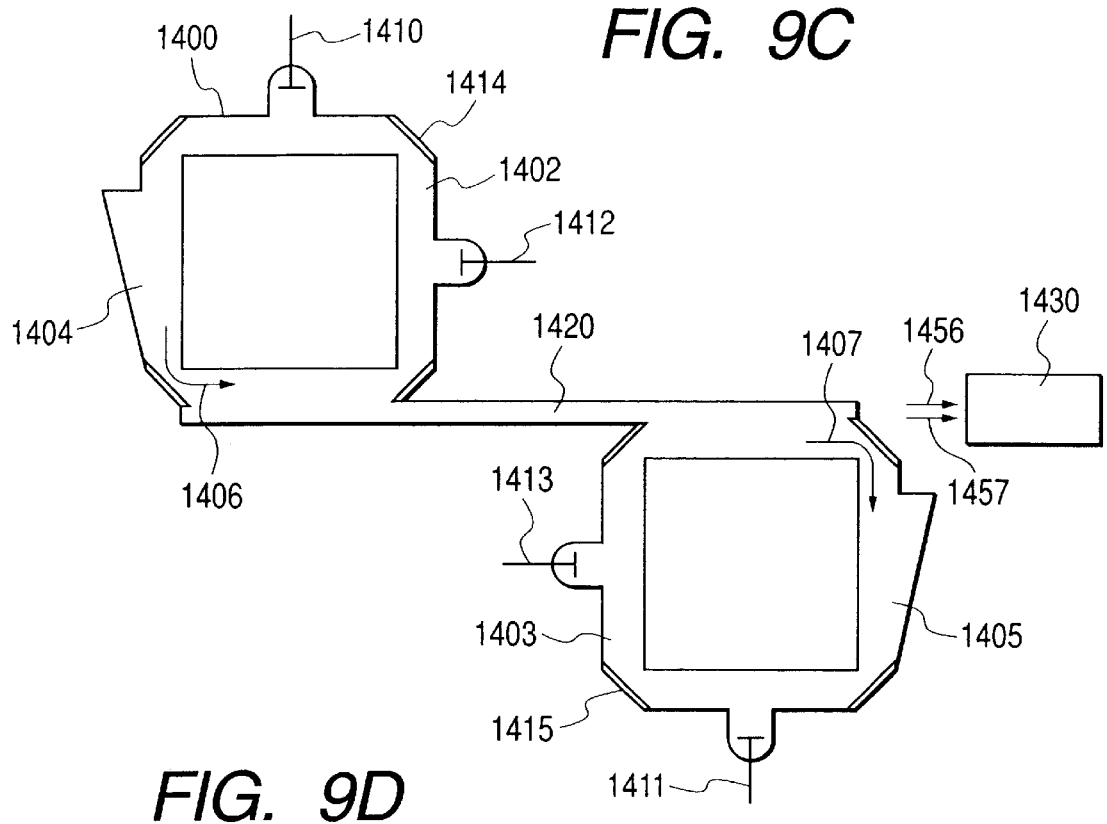
Figure 9D:
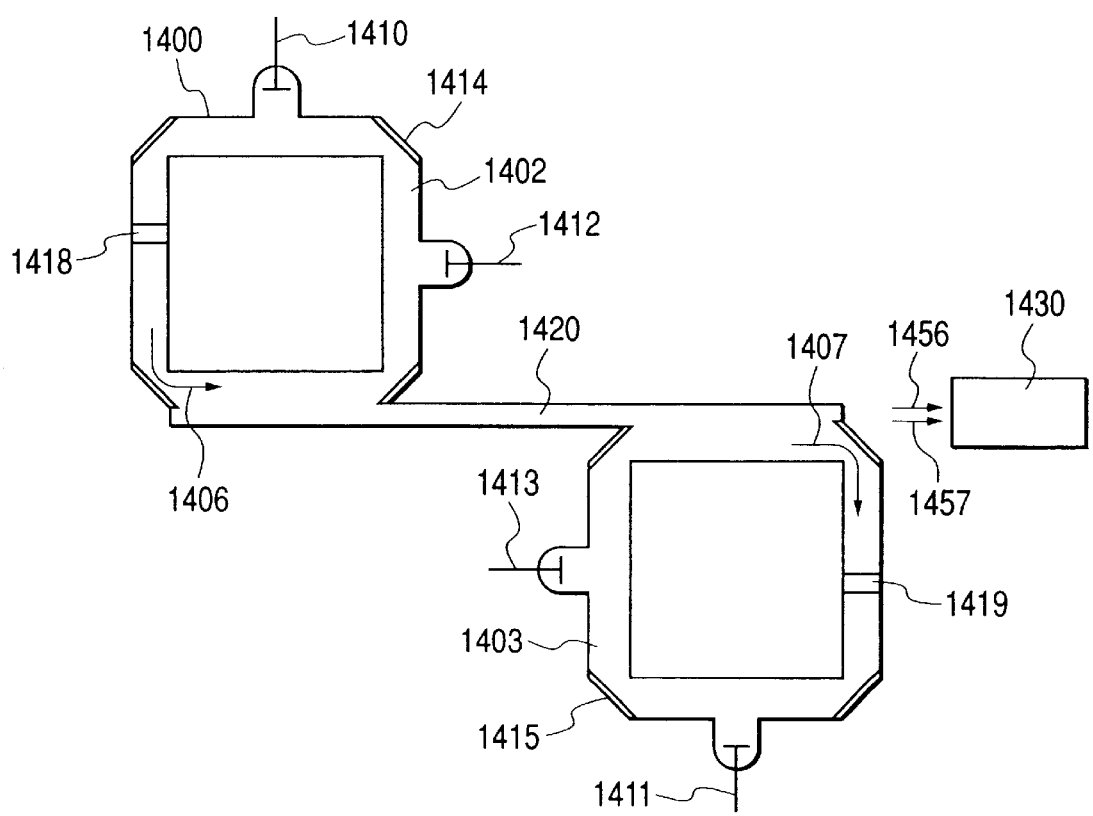

Note that FIGS. 9A and 9B show semiconductor lasers, whereas FIGS. 9C and 9D show gas lasers.

(4) FIGS. 10A Through 10D

In each of FIGS. 10A through 10D, the first laser and the second laser share part of their optical waveguides. In FIGS. 10A through 10D, the components that are the same as those of FIGS. 5A through 5D are denoted respectively by the same reference numerals.

In FIGS. 10A through 10D, reference numeral 1530 denotes a photodetector and reference numerals 1556, 1557 respectively denote output beams of the main mode beams of the first and second lasers.

Figure 10A:
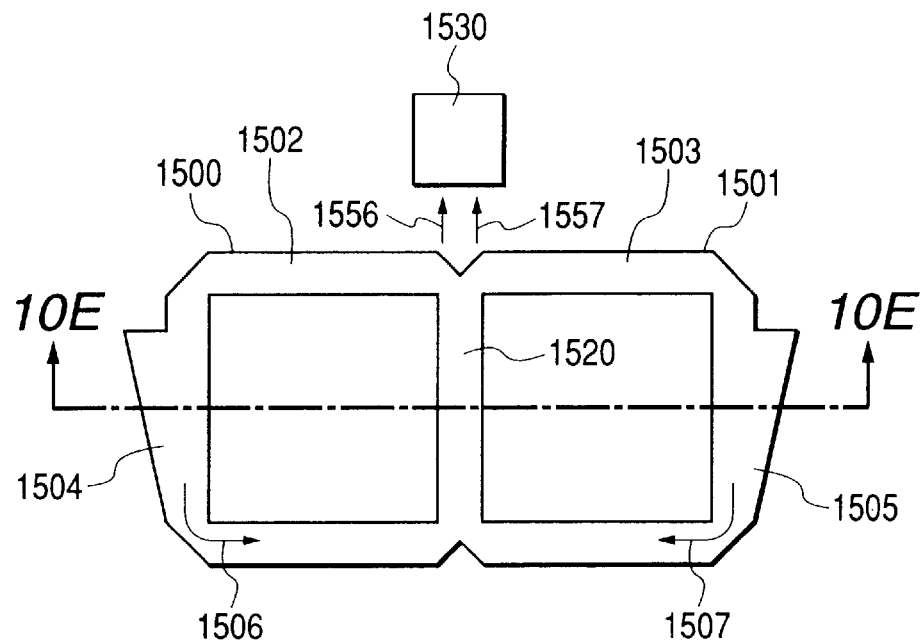
FIGS. 10A, 10B, 10C, 10D, and 10E are schematic views of a laser also illustrating the present invention.
Figure 10B:
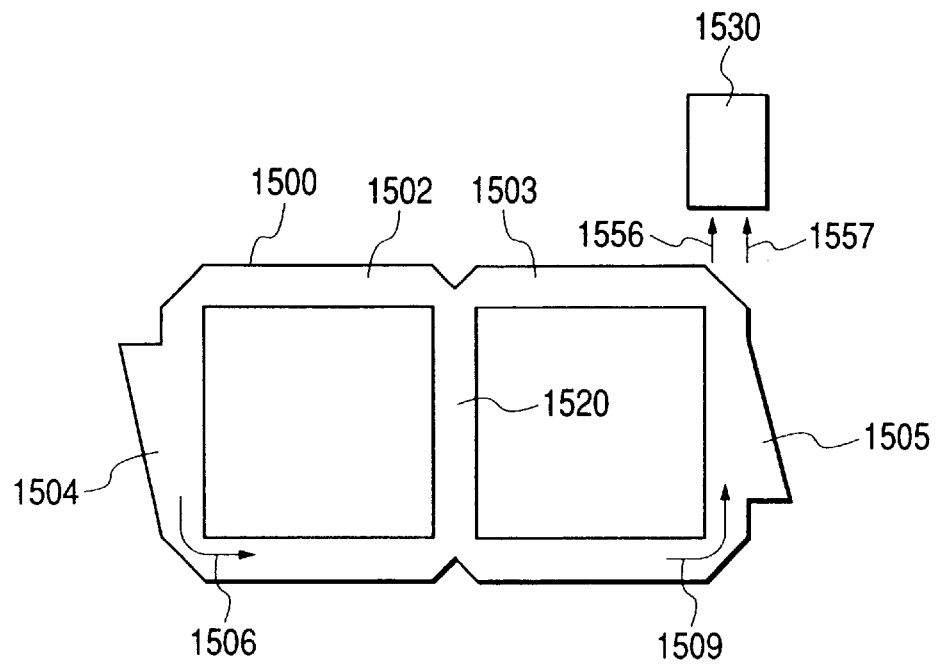
Figure 10C:
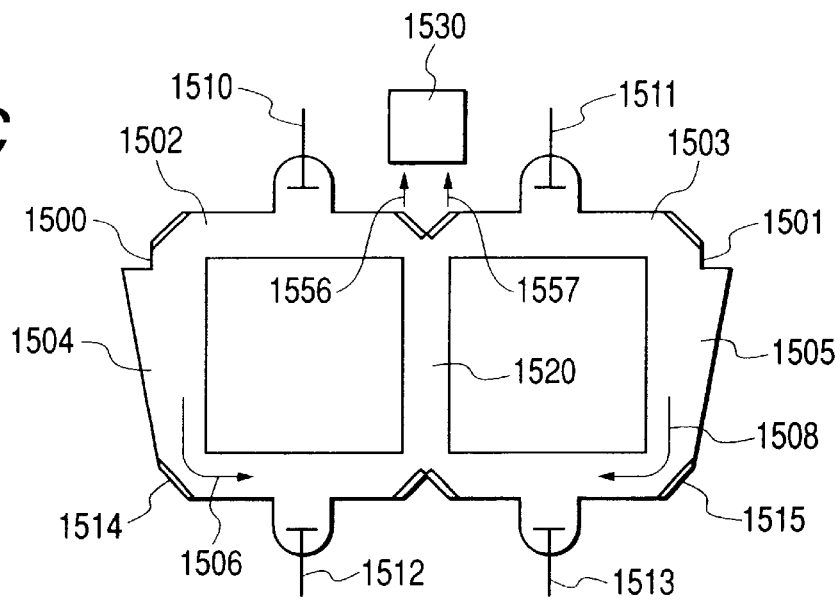
Figure 10D:
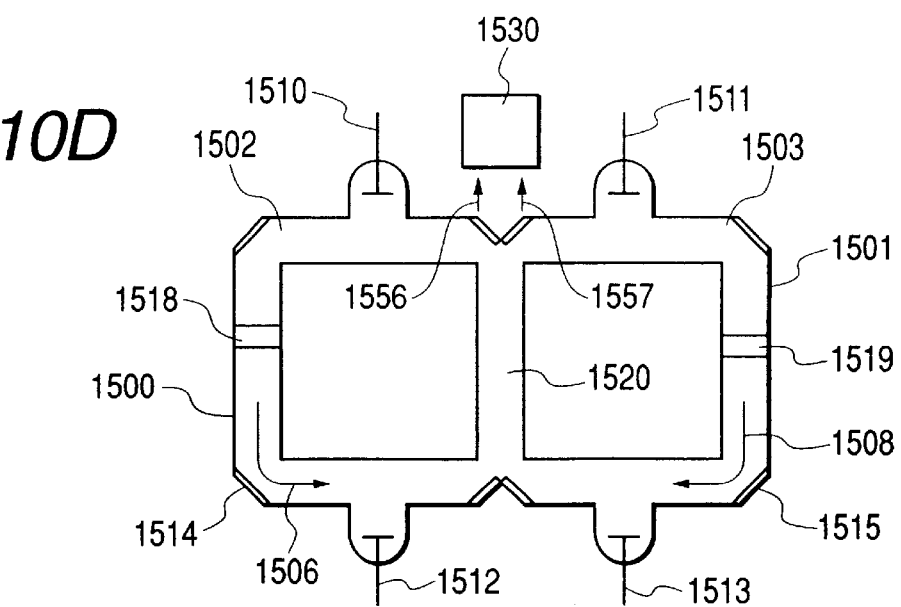

Note that FIGS. 10A and 10B show semiconductor lasers, whereas FIGS. 10C and 10D show gas lasers.

For the purpose of the invention, a photodetector is a device adapted both to transform light into an electric signal and to detect its intensity, which may be a photoelectric tube utilizing emission of photoeletrons (an external photoelectric effect) or a photomultiplier tube. Alternatively, it may be a device selected from various devices utilizing an internal photoelectric effect such as a photoconductive cell making use of a photoconductive effect, a photodiode, a phototransistor, an avalanche photodiode or a photovoltaic cell making use of a photovoltaic effect. Still alternatively, it may be a thermocouple detector which is a heat detector making use of absorption of light, a bolometer, a Golay cell or a pyroelectric photodetector making use of a pyroelectric effect.

Figure 19:
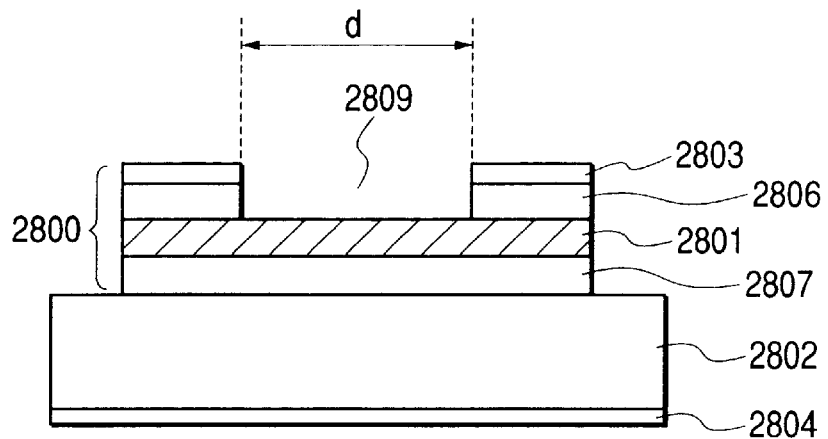
FIG. 19 is a schematic cross-sectional view of an embodiment of a ring-shaped laser according to the invention.

FIG. 19 is a schematic cross-sectional view of the semiconductor laser of FIG. 5 taken along line XX' in FIG. 6. In FIG. 19, reference numeral 2800 denotes the semiconductor laser and reference numerals 2801, 2802 and 2803 respectively denote an active layer, a substrate and an anode, while reference numerals 2804, 2806 and 2807 respectively denote a cathode, an upper cladding layer and a lower cladding layer.

With this arrangement of removing a central portion 2809 of the upper cladding layer 2806 (to produce a ring-shaped profile), an electric current can hardly flow through the central portion of the semiconductor laser. Therefore, principally, beams that propagate circuitally can obtain a gain to suppress any inutile electric currents. Then, the beat frequency will be highly stabilized particularly when a single transversal mode is realized.

Figure 20:
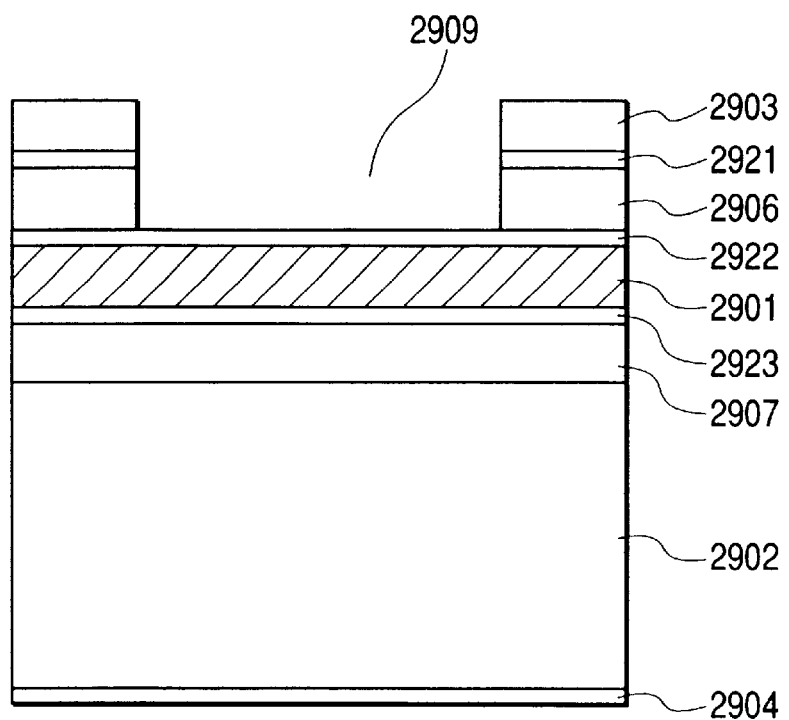
FIG. 20 is a schematic cross-sectional view of another embodiment of a ring-shaped laser according to the invention.

While no optical guiding layer nor cap layer are specifically shown in FIG. 19, such layers may be arranged if a central portion of the upper cladding layer 2806 is removed. FIG. 20 shows an arrangement using such layers. More specifically, in FIG. 20, reference numeral 2921 denotes a cap layer and reference numerals 2922 and 2923 denote so many optical guiding layers. Otherwise, there are also shown an active layer 2901 and a cathode 2904.

It is also possible to provide a ring-shaped electrode 2903 without modifying the upper cladding layer 2906 and the cap layer 2921. While the anode 2903 is arranged on the entire surface of the laser device in FIG. 20, it is by no means necessary to arrange the anode on the entire surface of the laser device.

Figure 21:
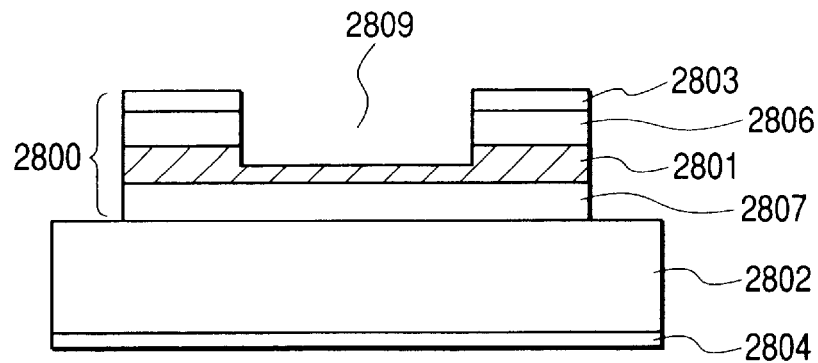
FIG. 21 is a schematic cross-sectional view of still another embodiment of a ring-shaped laser according to the invention.
Figure 22:
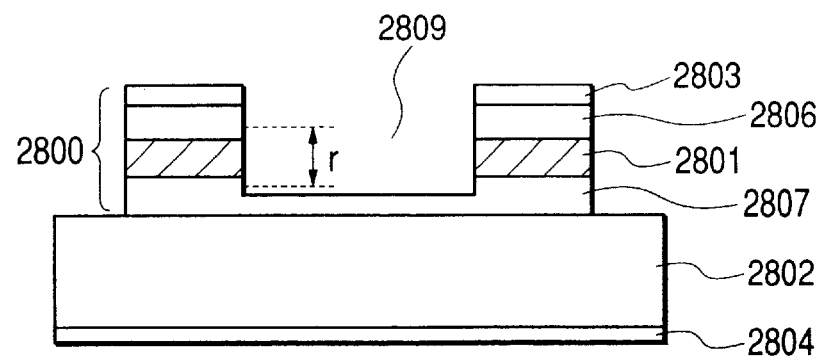
FIG. 22 is a schematic cross-sectional view of still another embodiment of a ring-shaped laser according to the invention.

Additionally, the active layer 2801 may be partly or entirely ring-shaped as seen in FIG. 21 and the lower cladding layer 2807 may also be partly ring-shaped as shown in FIG. 22. It will be appreciated that the threshold current can be reduced efficiently when the active layer is partly ring-shaped because the volume of the active layer is significantly reduced.

For the purpose of the invention, the ring-shape should advantageously prevail within the region where laser beams are distributed (as indicated by r in FIG. 22). Thus, it is advantageous that the active layer is ring-shaped.

If the active layer has a thickness of 0.1 $\mu$m, r in FIG. 22 is preferably about 1 $\mu$m.

Particularly, the optical confinement coefficient of the laser device with regard to the active layer will be large enough to allow a low drive current and stabilize the oscillation frequency when the laser device is ring-shaped within the reach of evanescent light in a direction perpendicular to the surface of the active layer. Of course, the entire semiconductor laser 2800 may have a ring-shape.

While the reach r of evanescent light is found within the cladding layers 2806, 2807 in FIG. 22, light may reach beyond the cladding layers depending on parameters including the refractive index and the thickness of each of the cladding layers. If such is the case, the part of the laser device corresponding to the reach r of the evanescent light is preferably of a cylindrical shape. Additionally, if light seeps out into the optical guiding layer located between the active layer and the cladding layers and also into the substrate 2802, the part of the optical guiding layer and the substrate corresponding to the reach of the evanescent light is preferably of a cylindrical shape.

It is desirable that the loss of light in the low refractive index layers 2806, 2807 is minimized particularly when the loss of light should be reduced and the laser device should be driven with a low electric current or a low voltage.

Figure 23:
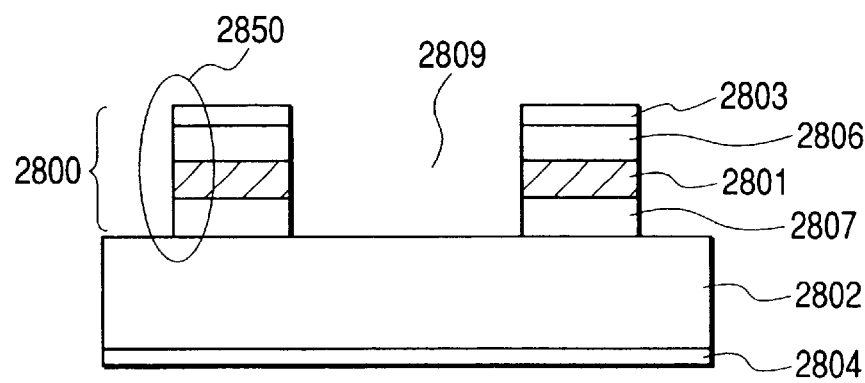
FIG. 23 is a schematic cross-sectional view of still another embodiment of a ring-shaped laser according to the invention.
Figure 24:
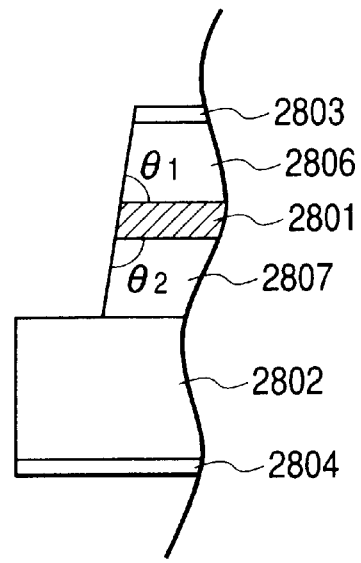
FIG. 24 is a schematic cross-sectional view of still another embodiment of a ring-shaped laser according to the invention.

FIG. 24 is an enlarged schematic cross-sectional view of a region 2850 of the laser device of FIG. 23. When the device is to be driven with low electric power, the laser device should be prepared in such a way that the angles $\theta_1$ and $\theta_2$ between the respective lateral surfaces of the low refractive index layers and that of the active layer (FIG. 24) are defined respectively by $75° \leq \theta_1$ and $\theta_2 \leq 105°$, preferably by $80° \leq \theta_1$ and $\theta_2 \leq 100°$, most preferably by $85° \leq \theta_1$ and $\theta_2 \leq 95°$.

When the above requirements are satisfied, any loss of light seeping into the low refractive index layers 2806, 2807 (evanescent light) can effectively be avoided to make it possible to drive the semiconductor laser with a low electric current (or a low voltage).

Additionally and desirably, the lateral surfaces of the semiconductor laser are total reflection surfaces and the angles between the respective areas that are more than 90% of the total reflection surfaces and that of the active layer are defined by the above formulas.

It is also desirable that the lateral surfaces of the refractive index layers satisfy the above requirements with the corresponding lateral surface of the active layer for all the periphery thereof. Particularly, it is highly desirable that the inner lateral surfaces of the laser device also satisfy the above requirements for angles $\theta_1$ and $\theta_2$.

The surface precision (surface coarseness) of the lateral surfaces of the low refractive index layers sandwiching the active layer 2801 is preferably less than half, more preferably less than a third, of the wavelength of light transmitting through the transmission medium of the active layer (=wavelength of light in vacuum/effective refractive index of the medium). For instance, if the active layer is an InGaAsP type layer (with a wavelength of 1.55 μm and an effective refractive index of 3.6 in the medium), the surface precision is preferably less than about 0.22 μm, more preferably less than 0.14 μm.

If the active layer is a GaAs type layer (with a wavelength of 0.85 μm and an effective refractive index of 3.6), the surface precision is preferably less than about 0.12 μm, more preferably less than 0.08 μm.

It may be needless to say that not only the lateral surfaces of the low refractive index layers but also that of the active layer may show the above identified value for the surface precision.

The ring-shaped part of the laser device may preferably be filled with an insulating material (dielectric thin film), although no such insulating material may be needed nor does the hollow section of the device have to be filled when the laser device shows required characteristics without such a filling material.

Figure 25:
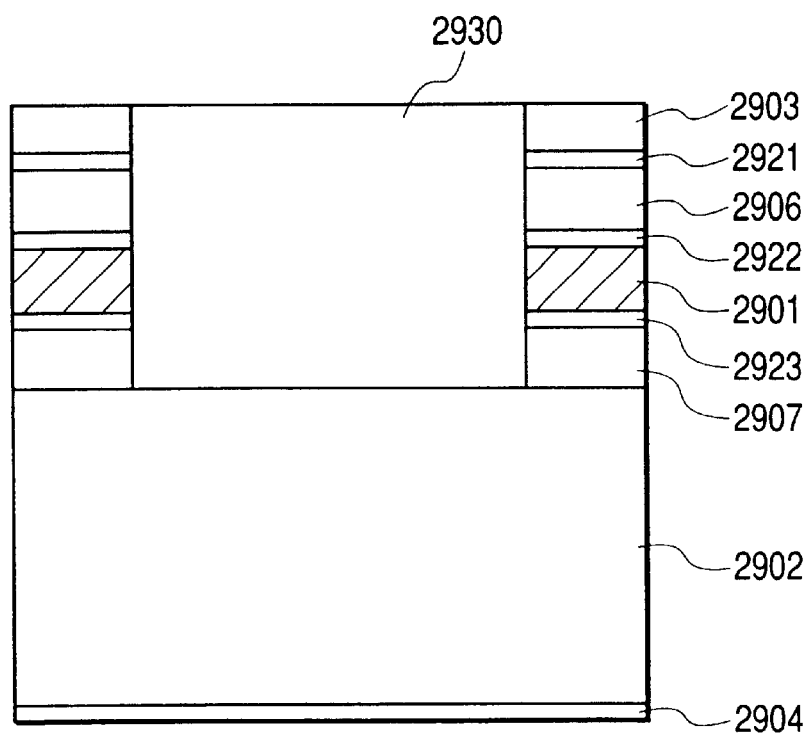
FIG. 25 is a schematic cross-sectional view of still another embodiment of a ring-shaped laser according to the invention.
Figure 26:
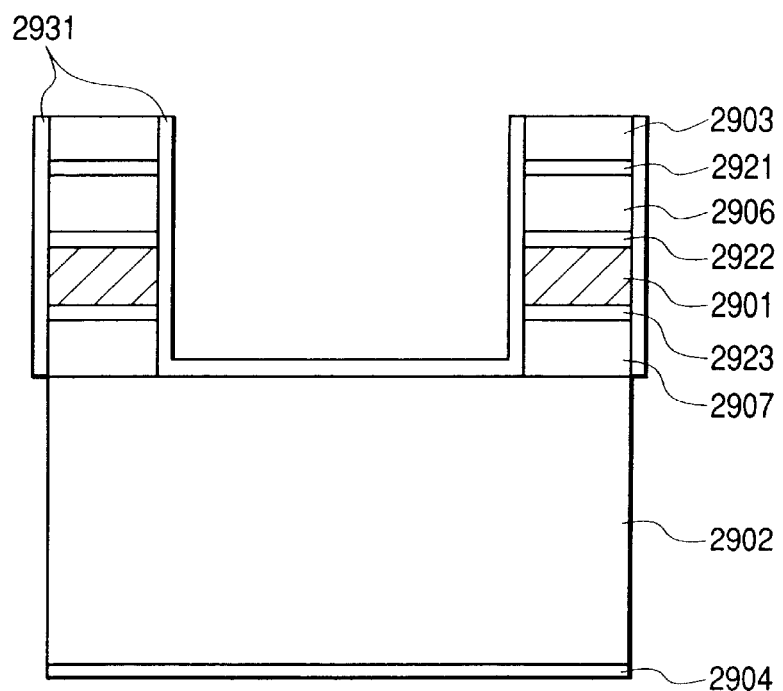
FIG. 26 is a schematic cross-sectional view of still another embodiment of a ring-shaped laser according to the invention.

Any appropriate material may be used for the dielectric thin film if it shows a specific resistance higher than that of the cladding layers, although it is preferably made of amorphous Si, $SiO_2$, MgO or SiN. A total reflection surface may be formed inside the cylindrical section of the laser device by means of the filling material. Additionally, the hollow section of the device may preferably be filled with a single material 2930 as shown in FIG. 25 or with a mixture of two or more than two materials. Still additionally, at least either the inner lateral surface or the outer lateral surface of the active layer may preferably be coated with a thin film 2931 as shown in FIG. 26. If such is the case, the operating characteristics of the device can be prevented from being degraded as a result of exposure to ambient air while saving the material for filling the hollow section of the device. While the coating film has a single layer in FIG. 26, it may alternatively have two or more than two layers.

When the dielectric thin film is made to have a multilayer structure, it may preferably comprise a number of paired layers of $SiO_2$ and Si. The hollow section of the device does not have to be completely filled when the device provides desired operating characteristics without requiring such a filling operation.

Other possible filling arrangements that can be used for the present invention will be discussed briefly below.

Figure 27:
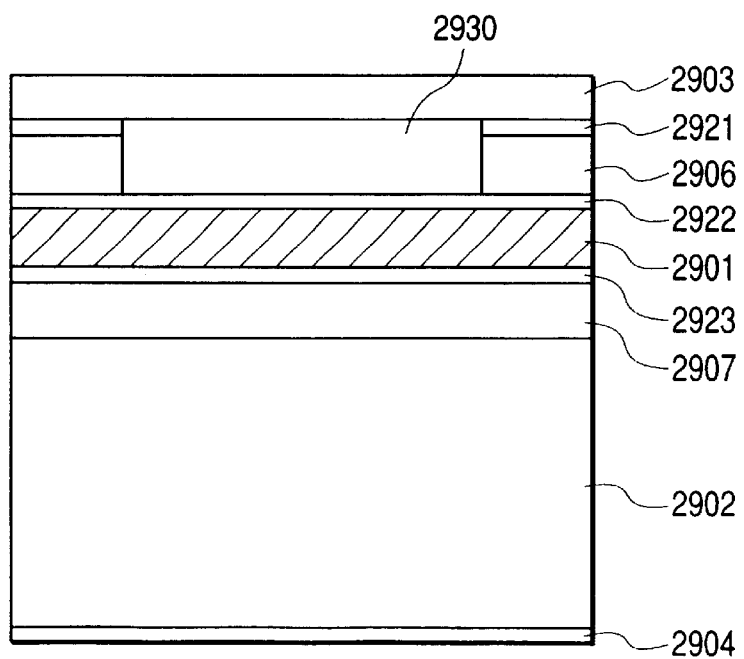
FIG. 27 is a schematic cross-sectional view of still another embodiment of a ring-shaped laser according to the invention.

In FIG. 27, reference numeral 2930 denotes an insulating film. The arrangement of FIG. 27, in which the insulating film 2930 is arranged under the anode 2903 at a central area thereof, may preferably be used for the purpose of the invention because any electric current would hardly flow through the central portion of the semiconductor laser and therefore the reactive current, if any, would be reduced to make a single transversal mode appear with ease. Such an arrangement is particularly effective when it is desired to provide the electrode with a flat profile.

When the upper cladding layer 2906 is of the p-type, the central portion of the laser device will be made to show a PNPN thyristor structure and hardly allow any electric current to flow therethrough by filling the central portion of the laser device with a material showing a PNP type electric conductivity in place of using an insulating film 2930.

Figure 28:
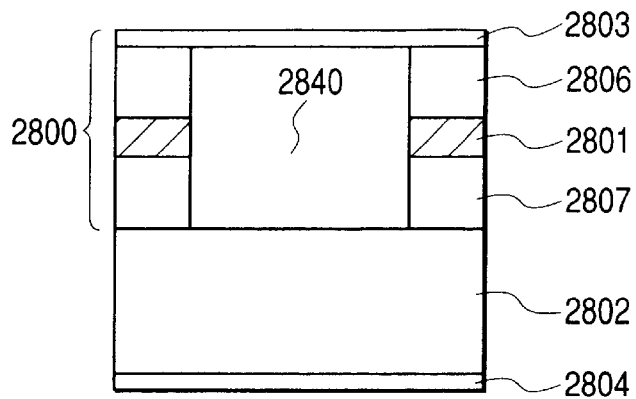
FIG. 28 is a schematic cross-sectional view of still another embodiment of a ring-shaped laser according to the invention.

Referring to FIG. 28, reference numeral 2840 here denotes an Fe-doped high resistance layer. With the arrangement of utilizing a high resistance layer, it is also possible to make the central portion of the semiconductor laser device hardly allow an electric current to flow therethrough.

It may be sufficient for a semiconductor laser according to the invention that the hollow section 2809 of the active layer is located substantially at the center (as shown in FIG. 23 for instance). A state where no guided mode exists is referred to as cut-off state and it is desirable that the device is so configured as to meet the requirements of cut-off state for higher modes in order to stabilize the transversal mode. Additionally, it is desirable that the diameter d (FIG. 19) of the hollow section of is so defined as to meet the requirements of cut-off state for higher modes. The same may be said of FIG. 29.

Then, there exists only a basic mode for the transversal mode to stabilize the latter when the requirements of cut-off state are satisfied for higher modes.

It is also desirable that the profile of the hollow section is so defined as to meet the requirements of cut-off state for higher modes so that there may exist only a single guided mode (single transversal mode).

A laser device having a hollow section may be prepared by laying ring-shaped semiconductor layers for the active layer, the optical guiding layer and the cladding layers, typically using masks for them. Alternatively, a laser device having a hollow section may be prepared by laying an active layer, an optical guiding layer and cladding layers and etching off a central portion thereof to make them show a ring-shaped profile.

Etching techniques that may be used for the purpose of the invention for forming the hollow section include wet etching, gas etching, plasma etching, sputter etching, reactive ion etching (RIE) and reactive ion beam etching (RIBE).

Materials that can be used for the active layer of a laser device according to the invention include among others GaAs, InP, ZnSe, AlGaAs, InGaAlP, InGaAsP, GaAsP, InGaAsSb, AlGaAsSb, InAsSbP, PbSnTe, GaN, GaAlN, InGaN, InAlGaN, GaInP, GaInAs and SiGe.

Any material that can be used for the active layer may also be used for the cladding layers.

Combinations of materials that can be used for the active layer and the cladding layers for the purpose of the invention include, among others, PbSnTe (active layer)/PbSeTe (cladding layers), PbSnSeTe (active layer)/PbSeTe (cladding layers), PbEuSeTe (active layer)/PbEuSeTe (cladding layers), PbEuSeTe (active layer)/PbTe (cladding layers), InGaAsSb (active layer)/GaSb (cladding layers), AlInAsSb (active layer)/GaSb (cladding layers), InGaAsP (active layer)/IrnP (cladding layers), AlGaAs (active layer)/AlGaAs (cladding layers) and AlGaInP (active layer)/AlGaInP (cladding layers).

As for the structure of the semiconductor laser, the active layer thereof is not limited to the bulk structure and may alternatively be of the single quantum well (SQW) structure or of the multiple quantum well (MQW) structure.

When using a laser device of the quantum well structure, it is preferable that the structure is of the strained quantum well structure. For instance, the active layer may be formed by using eight InGaAsP quantum well layers with compression strain of about 1% and an InGaAsP barrier layer. It is also possible to make the active layer show an MIS structure.

As for the substrate, a substrate adapted to make desired materials grow thereon may be used for it. Substrates that can be used for the purpose of the invention include compound substrates such as a GaAs substrate, an InP substrate, a GaSb substrate, an InAs substrate, a PbTe substrate, a GaN substrate, a ZnSe substrate and a ZnS substrate along with an SiC substrate, a 4H—SiC substrate, a 6H—SiC substrate, a sapphire substrate, a silicon substrate and an SOI substrate.

Techniques that can be used for forming the active layer of a semiconductor laser according to the invention include liquid phase epitaxy (LPE technique), molecular beam epitaxy (MBE technique), metal organic vapor phase growth (MOCVD technique, MOVPE technique), atomic layer epitaxial growth (ALE technique), metal organic molecular beam epitaxy (MOMBE technique) and chemical beam epitaxy (CBE technique).

Materials that can be used for the anode of a laser device according to the invention include Cr/Au, Ti/Pt/Au and AuZn/Ti/Pt/Au. Materials that can be used for the cathode of a laser device according to the invention include AuGe/Ni/Au and AuSn/Mo/Au. However, the present invention is by no means limited thereto.

Note that the arrangement of the electrodes may be reversed from the illustrated arrangement depending on the conductivity of the substrate and that of the active layer.

It is also preferable that a cap layer (contact layer) is formed on the cladding layers and then the materials of the electrode are arranged on the cap layer in order to reduce the contact resistance of cladding layers and the electrodes.

A typical combination of materials may be InGaAsP (active layer)/p-type InP (cladding layers)/p-type InGaAsP (cap layer)/electrodes.

Note again that, while the cathode is arranged under the substrate in the drawings, the cathode may alternatively be arranged above the substrate depending on the type of the substrate.

In order to protect the semiconductor laser against heat, it is preferable to arrange the semiconductor laser chip on a heat emitting member (heat sink). Materials that can be used for the heat sink for the purpose of the invention non-limitatively include Cu, Si, SiC, AlN and diamond. If necessary, a Peltier device may be used for controlling the temperature of the semiconductor laser.

It is also preferable to form an insulating film (coating film) on each of the lateral surfaces of the semiconductor laser (where light is found) in order to make it a total reflection surface and prevent it from degrading. Materials that can be used for the coating film include insulators such as $SiO_2$, SiN, $Al_2O_3$ and $Si_3N_4$ and amorphous silicon ($\alpha$-Si).

Figure 29:
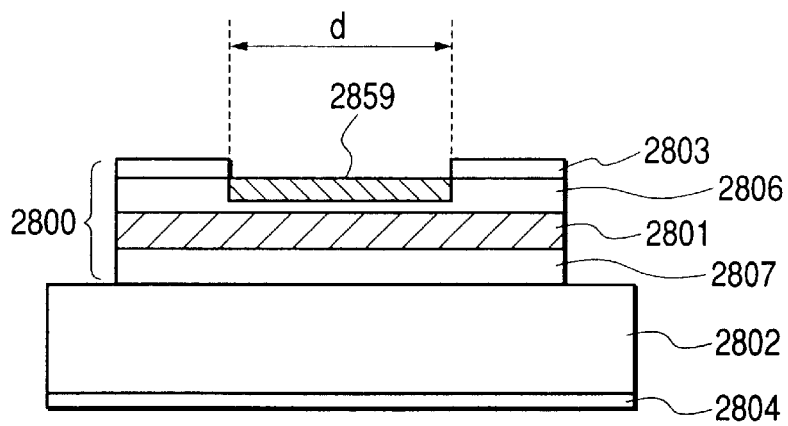
FIG. 29 is a schematic cross-sectional view of still another embodiment of a ring-shaped laser according to the invention.

It is also preferable to replace the hollow section of the ring-shaped laser device with an electrically highly resistive material as shown in FIG. 29 in order to obtain a practically ring-shaped optical waveguide.

FIG. 29 shows a schematic cross-sectional view of a laser device having such an arrangement.

Referring to FIG. 29, the laser device comprises an active layer 2801, a substrate 2802, an anode 2803, a cathode 2804, an upper cladding layer 2806, a lower cladding layer 2807 and a high resistance region 2859 produced by ion implantation. With this arrangement, any electric current can hardly flow through the central portion of the device so that only the beams that are propagating circuitally can mainly obtain a gain.

Figure 30:
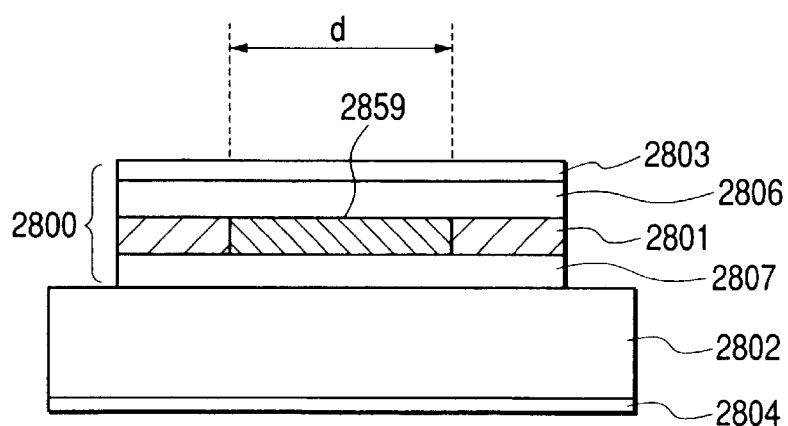
FIG. 30 is a schematic cross-sectional view of still another embodiment of a ring-shaped laser according to the invention.

While the high resistance region 2859 in FIG. 29 has clear boundary lines, in reality they have a certain width. The operation of ion implantation is desirably conducted in such a way that the trajectories of projected ions are mainly found in the active layer as shown in FIG. 30.

While at least a part of the upper cladding layer is made to be electrically highly resistive in the description made above by referring to FIG. 29, the active layer 2801 and/or the lower cladding layer 2807 may also be made to be electrically highly resistive if the central region can hardly allow any electric current to flow therethrough. Thus, all the central region of the semiconductor laser may be made to be electrically highly resistive.

Therefore, it will be appreciated that if the central region of the active layer 2801 is made to be electrically highly resistive, the volume of the active layer is substantially reduced to by turn decrease the drive current necessary for driving the device.

It is possible to implant ions in such a way that their projection trajectories are mainly found at and around the depth of the active layer so that the device may be made to be electrically highly resistive mainly at such depth.

While the anode 2803 is arranged around the semiconductor laser in FIG. 29, it may alternatively be arranged on the entire upper surface of the laser device. Still alternatively, it may be arranged in part of the upper surface of the laser device.

Whenever appropriate, an optical guiding layer and/or a cap layer may be provided.

The expression "of electrically highly resistive" as used herein refers to a region implanted with ions and made to show a specific resistance between 100 $\Omega$.cm and $10^5$ $\Omega$.cm, preferably between $5 \times 10^3$ $\Omega$.cm and $1 \times 10^5$ $\Omega$.cm, although the values may vary depending on the type of the active layer.

Ions to be implanted may be protons or boron ions.

It is also desirable that the operation of ion implantation is conducted in such a way that the projection trajectories Rp of implanted ions are mainly found at the center of the active layer. The voltage to be applied to accelerate ions is preferably between 10 kV and 1 MV, although the materials and the thicknesses of the cladding layers and the optical guiding layer on the active layer have to be taken into consideration.

Ions may be implanted at a rate between $1\times10^{13}$ cm$^{-2}$ and $1\times10^{15}$ cm$^{-2}$.

The substrate may be held at room temperature during the operation of ion implantation.

It is not necessary to limit the area of ion implantation strictly to the central region of the semiconductor laser and it is sufficient for the area where ions are implanted to be found roughly at the center of the device if the requirements of cut-off state for higher modes are met.

The diameter d of the region to be implanted with ions may also be defined so as to meet the requirements of cut-off state for higher modes.

The region to be implanted with ions may not necessarily be circular and it may show a contour adapted to meet the requirements of cut-off state for higher modes and allow only a single waveguide mode (single transversal mode) to exist.

It is also desirable to anneal the laser device to cure, if partly, the damage produced by the ion implanting operation. Such an annealing operation is conducted at temperatures between 200° C. and 500° C., preferably between 300° C. and 400° C. The annealing operation may be conducted in a hydrogen-containing atmosphere.

While an ion implanting operation is described above to make the device have an electrically highly resistive region in it, an electrically highly resistive region may alternatively be produced by selectively oxidizing the region.

Preferred embodiments of the present invention are described above. It should be noted that a gyro according to the present invention may be an instrument with which the angular velocity and the sense of rotation of an object can be detected or an instrument with which only the angular velocity or the sense of rotation of an object can be detected.

EXAMPLE 1

Figure 31:
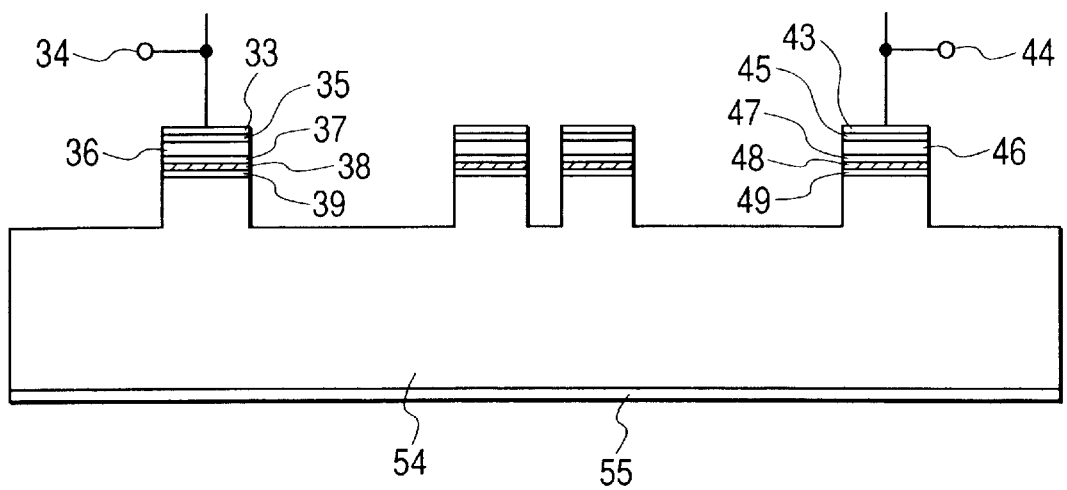
FIG. 31 is a schematic cross-sectional view of still another embodiment of a ring-shaped laser according to the invention.

FIG. 2A is a schematic illustration of the first example of the invention, most clearly lo showing its characteristic aspects, and FIG. 31 is a schematic cross-sectional view taken along line 31—31 in FIG. 2A. Referring to both FIG. 2A and FIG. 31, the laser device of this example comprises a ring resonator type semiconductor laser 1200 having a tapered region 1204 of the optical waveguide thereof, an anode 33, an electric terminal 34, a cap layer 35, a cladding layer 36, an optical guiding layer 37, an active layer 38 and another optical guiding layer 39 as well as another ring resonator type semiconductor laser 1201 having a tapered region 1205 of the optical waveguide thereof, an anode 43, an electric terminal 44, a cap layer 45, a cladding layer 46, an optical guiding layer 47, an active layer 48 and another optical guiding layer 49 along with a semiconductor substrate 54 and a cathode 55. Reference numeral 1206 denotes a laser beam propagating counterclockwise, whereas reference numeral 1207 denotes a laser beam propagating clockwise.

Firstly, the method for preparing the ring resonator type semiconductor laser having the above described configuration will be described. An undoped InGaAsP optical guiding layer 39 having a 1.3 μm composition (0.15 μm thick), an undoped InGaAsP active layer 38 having a 1.55 μm composition (0.1 μm thick), another undoped InGaAsP optical guiding layer 37 having a 1.3 μm composition (0.15 μm thick), a p-InP cladding layer 36 (2 μm thick) and a p-InGaAsP cap layer 35 having a 1.4 μm composition (0.3 μm thick) were made to grow for the ring resonator type semiconductor laser 1200 on an n-InP substrate 54 (350 μm thick) by means of a metal organic vapor phase growth technique. Similarly, an undoped InGaAsP optical guiding layer 49 having a 1.3 μm composition (0.15 μm thick), an undoped InGaAsP active layer 48 having a 1.55 μm composition (0.1 μm thick), another undoped InGaAsP optical guiding layer 47 having a 1.3 μm composition (0.15 μm thick), a p-InP cladding layer 46 (2 μm thick) and a p-InGaAsP cap layer 45 having a 1.4 μm composition (0.3 μm thick) were made to grow for the ring resonator type semiconductor laser 1201 on an n-InP substrate 54 (350 μm thick) by means of a metal organic vapor phase growth technique.

While the semiconductor layers that were commonly used for the ring resonator type semiconductor laser 1200 and the ring resonator type semiconductor laser 1201 were formed in the example, the layers formed for the two ring resonator type semiconductor lasers may alternatively be formed in separate and independent processes.

After the crystal growth process, photoresist AZ-1350 (tradename, available from Hoechst) was coated onto the p-InP cap layer by means of a spin coater to get a film thickness of 1 μm. After pre-baking the wafer at 80° C. for 30 minutes, it was exposed to light with a mask covering it. The optical waveguides showed a width of 5 μm whereas they showed a maximum width of 8 μm and a minimum width of 5 μm in the tapered regions 1204 and 1205 after the development and rinse process. The tapered regions are made to show an angle of 90° (as defined by α and β in FIG. 6). The circuital optical waveguides had a length of 600 μm.

Subsequently, the wafer was introduced into a reactive ion etching system and etched to show hollow sections with a depth of 3 μm by means of chlorine gas. Finally, Cr/Au was deposited on the p-InGaAsP cap layers 35 and 45 by evaporation in order to produce respective anodes 33 and 43 there, while AuGe/Ni/Au was made to deposit on the n-InP substrate also by evaporation in order to produce a cathode 55 there. Thereafter, the wafer was annealed in a hydrogen-containing atmosphere to give rise to an ohmic contact.

Light generated in the ring resonator type semiconductor lasers having the above described configuration is reflected by the surface thereof, or the interfaces of the lasers and air, because of the difference in the refractive index of the semiconductor and that of air. If the refractive index of the semiconductor is 3.5, a total reflection occurs when the angle between the normal to the interface and the laser beam is equal to or greater than 16.6°. Since the mode of oscillation for receiving the total reflection shows an oscillation threshold value smaller than any other modes because of a reduced mirror loss, the laser device starts oscillating with a low injected current level. Additionally, since gain concentrates in this oscillation mode, oscillations in any other modes will be suppressed. In FIG. 2A, the angle between the normal to the interface of the semiconductor and air is 45° at any corner of the semiconductor lasers and hence satisfies the angular requirement for total reflection. The oscillation threshold current value was 2 mA at room temperature, whereas the drive current of the ring resonator type laser 1200 was 3 mA and the drive current of the ring resonator type laser 1201 was 3.5 mA. Thus, when the lasers are held stationary, the laser beam 1206 and the laser beam 1207 would show the same oscillation wavelength λ, which is equal to 1.55 μm. However, since the drive current of the ring resonator type laser 1200 and that of the ring resonator type laser 1201 are different from each other, their optical waveguides show respective effective refractive indexes that are slightly different from each other. As a result, the oscillation frequency $f_3$ of the laser beam 1206 is greater than the oscillation frequency $f_4$ of the laser beam 1207 by 1 kHz. When a total reflection occurs, there is generated evanescent light creeping along the interface. If the oscillation wavelength is 1.55 μm the penetrating depth of evanescent light is 0.0735 μm. While the intensity of evanescent light attenuates exponentially (the penetrating depth being the distance at which the electric field amplitude attenuates to 1/e), the ring resonator type lasers 1200 and 1201 are separated by 0.07 μm which is smaller than the penetrating depth, the laser beam 1206 and the laser beam 1207 are coupled efficiently. As a result, the laser beam 1206 and the laser beam 1207 interfere with each other in the ring resonator type semiconductor lasers. If a constant current source is used, signals having respective amplitudes of 80 mV and 100 mV and a frequency of 1 kHz can be obtained by monitoring the voltage between the electric terminal 34 and the cathode 55 and the voltage between the electric terminal 44 and the cathode 55. In other words, a beat frequency can be detected even when the ring resonator type semiconductor lasers 1200 and 1201 are held stationary.

If the ring resonator type semiconductor lasers 1200 and 1201 are driven to rotate clockwise at a rate of 30° per second which roughly corresponds to the rate of vibration of a camera being shaken or that of a moving automobile, the oscillation frequency $f_3$ of the laser beam 1206 propagating counterclockwise is raised by 88.7 Hz, while, on the other hand, the oscillation frequency $f_4$ of the laser beam 1207 propagating clockwise is reduced by 88.7 Hz. Then, the beat frequency can be obtained by formula (16) below:

$$f_3 - f_4 = 1 \text{ kHz} + 177.4 \text{ Hz} \tag{16}$$

In the case where, on the other hand, the ring resonator type semiconductor lasers 1200 and 1201 are driven to rotate counterclockwise at a rate of 30° per second, the beat frequency can be obtained by formula (17) below:

$$f_3 - f_4 = 1 \text{ kHz} + 177.4 \text{ Hz} \tag{17}$$

Since the absolute value of the increase or the decrease of the beat frequency is proportional to the rotary speed, it is now possible to detect not only the rotary speed of the semiconductor laser but also the sense of rotation because the increase or the decrease in the beat frequency shows a one-to-one correspondence relative to the sense of rotation. Then, a gyro comprising such a laser device may be arranged in a camera, a lens unit, an automobile, an aircraft or a ship.

While the change in the terminal voltage is observed by driving the laser device with a constant current in this example, the change in the electric current flowing to the terminal can be observed if the gyro is driven with a constant voltage. Alternatively, the change in the discharge impedance can be directly detected by means of an impedance meter.

Then, the use of a photodetector for detecting the beat light can be omitted so that consequently the optical feedback noise caused by the light coming back from the photodetector can be eliminated.

While the semiconductor lasers were realized by using InGaAsP type materials in the above example, they may be replaced by GaAs type, ZnSe type, In GaN type or AlGaN type materials. Additionally, the profile of the optical waveguides may be hexangular, triangular or circular instead of being rectangular as shown in FIG. 2A.

The drive currents of the ring resonator type lasers 1200 and 1201 were differentiated in the above example in order to differentiate the oscillation frequencies. However, the oscillation frequencies of the two lasers can alternatively be changed by altering the optical lengths of the two lasers such as the lengths or the widths of the optical waveguides or the thicknesses, the compositions or the materials of the semiconductor layers of the lasers.

Now, another method of preparing a laser device will be described by referring to FIGS. 43 through 49.

An active layer 4401 having a multiple quantum well structure of three layers of $Al_{0.3}Ga_{0.7}As/GaAs$ is formed on an n-GaAs substrate 4402 with a pair of optical guiding layers 4422 of $Al_{0.3}Ga_{0.7}As$ sandwiching the active layer, which are then further sandwiched by a cladding layer 4406 (p-$Al_{0.5}Ga_{0.5}As$) and another cladding layer 4407 (n-$Al_{0.5}Ga_{0.5}As$). Reference numeral 4415 in FIG. 43 denotes a buffer layer made of n-GaAs and reference numeral 4440 denotes a cap layer made of p-GaAs.

Figure 44:
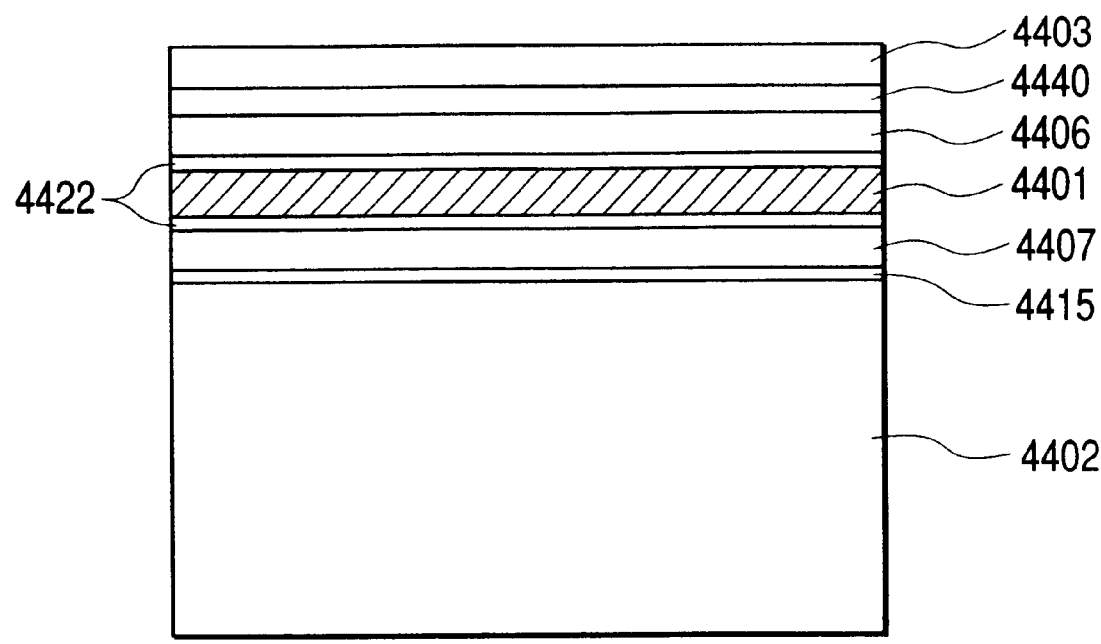
FIG. 44 is another schematic cross-sectional view of the example.

Then, Cr/Au (or Ti/Pt/Au) is formed on the cap layer 4440 for the anode 4403 (FIG. 44).

Figure 45:
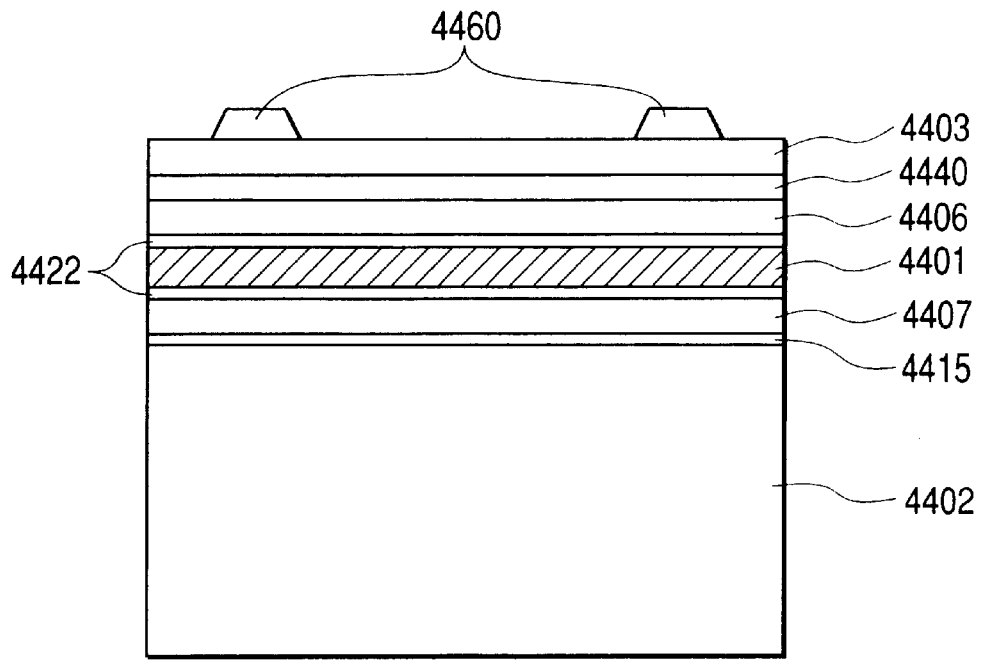
FIG. 45 is still another schematic cross-sectional view of the example.

Thereafter, photoresist 4460 is coated thereon and subjected to a patterning operation as shown in FIG. 45.

Figure 46:
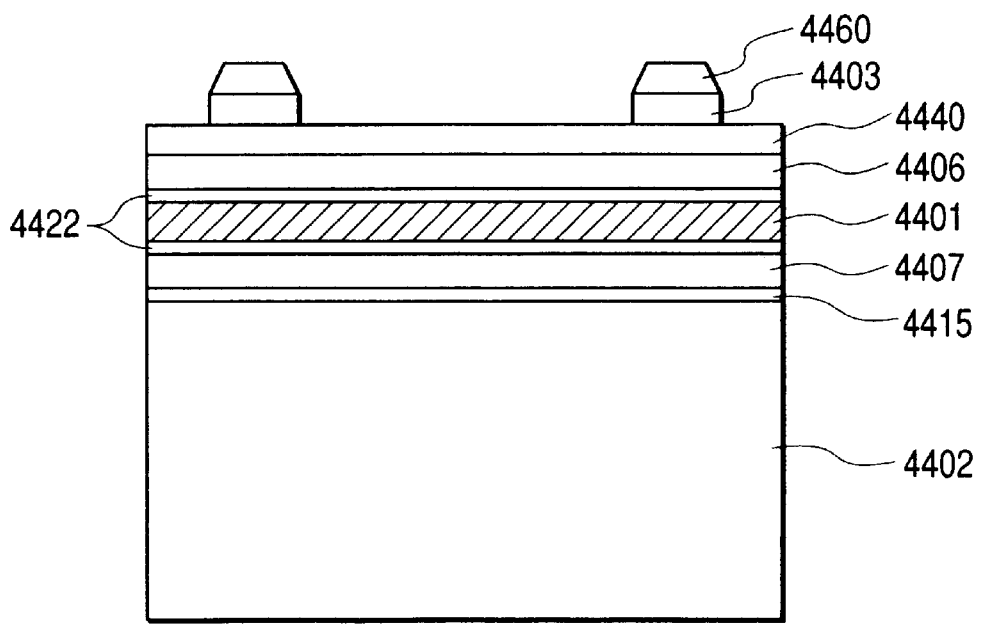
FIG. 46 is still another schematic cross-sectional view of the example.
Figure 47:
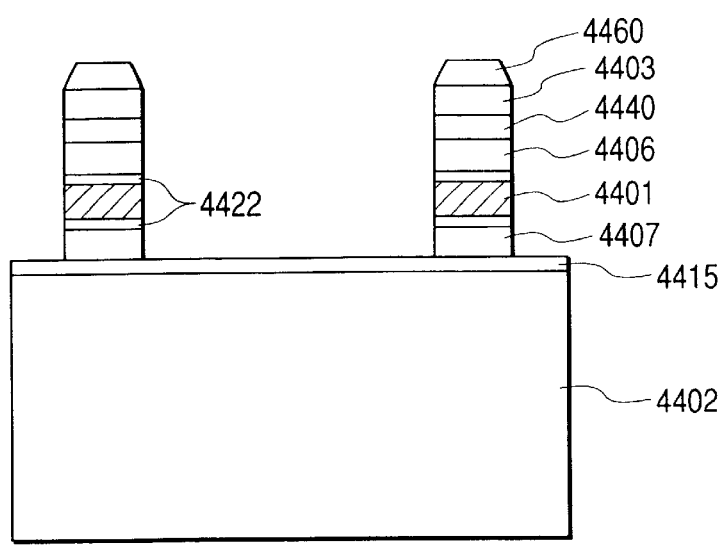
FIG. 47 is still another schematic cross-sectional view of the example.

Then, the anode 4403 is subjected to a dry etching operation by using the patterned photoresist 4460 as mask (FIG. 46).

Figure 48:
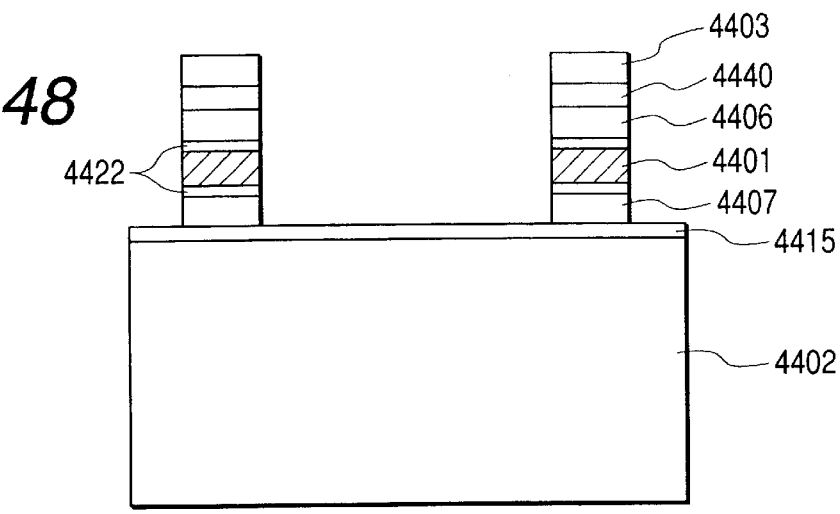
FIG. 48 is still another schematic cross-sectional view of the example.

Subsequently, the semiconductor layer is removed by dry-etching (FIG. 47) and the photoresist is removed (FIG. 48).

Then, the anode is annealed in a hydrogen-containing atmosphere to turn it into an alloy.

Figure 49:
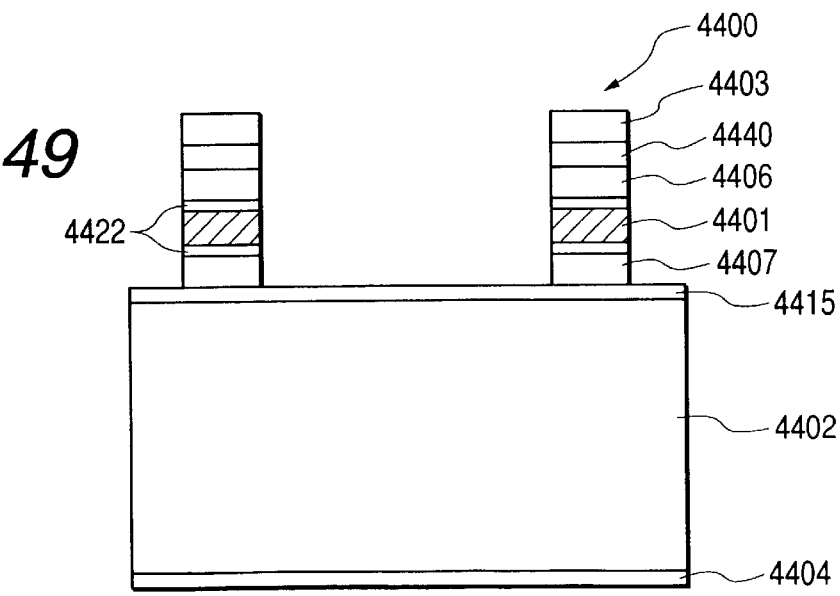
FIG. 49 is still another schematic cross-sectional view of the example.

After polishing the substrate (if necessary), the cathode 4404 is formed by evaporating AuGeNi/Au (FIG. 49).

Figure 50:
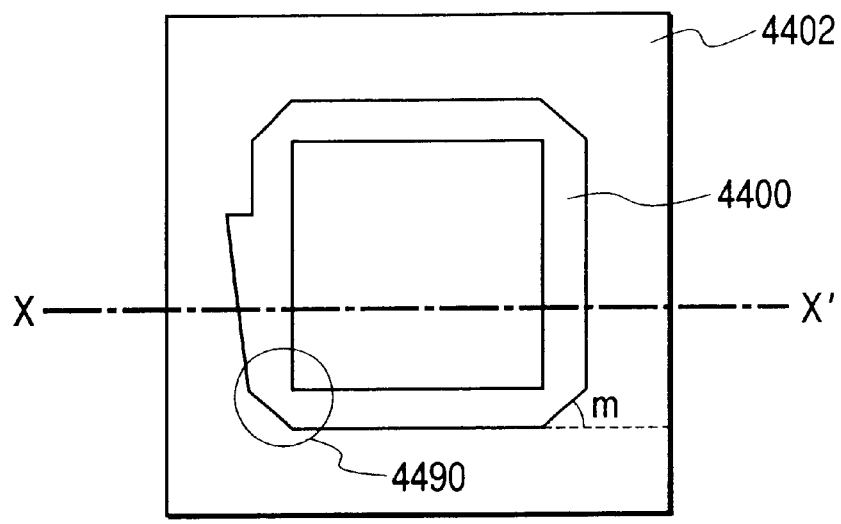
FIG. 50 is a schematic illustration of still another embodiment of a ring-shaped laser according to the invention.

As a result the ring resonator type semiconductor laser 4400 is formed. FIG. 50 is a schematic plan view of the prepared laser device.

It is advantageous that angle m in FIG. 50 is 45±0.01°, preferably 45±0.001°. This statement holds true for the other corners. This is the requirement that should be met in order for the laser beams to return to the respective originating points after making a full turn in the optical resonator.

It may be needless to say that the angular requirement of m should be met if the semiconductor ring laser is formed by some other method.

Figure 51:
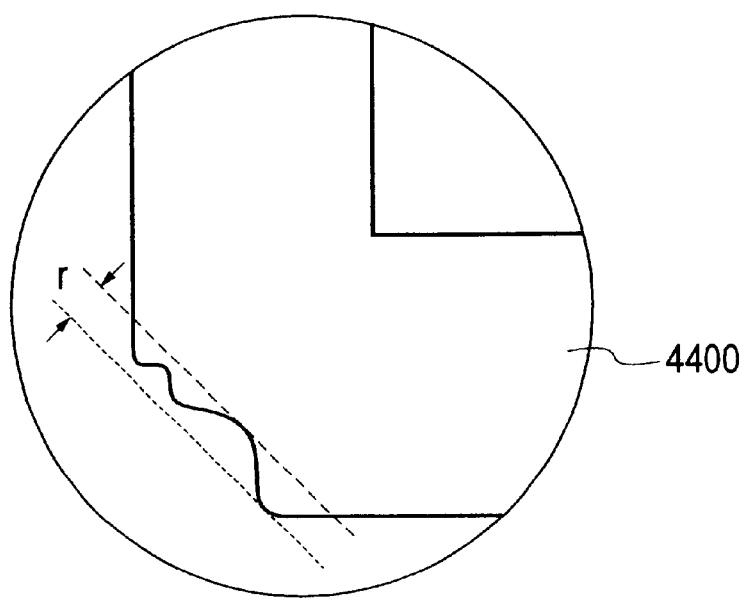
FIG. 51 is a schematic illustration of still another embodiment of a ring-shaped laser according to the invention.

FIG. 51 is an enlarged schematic illustration of corner 4490 of the device of FIG. 50. The surface coarseness as expressed by r in FIG. 51 is less than 500 Å, preferably less than 200 Å. Then, the backward scattering can be minimized to prevent the locking-in phenomenon from taking place.

Figure 32:
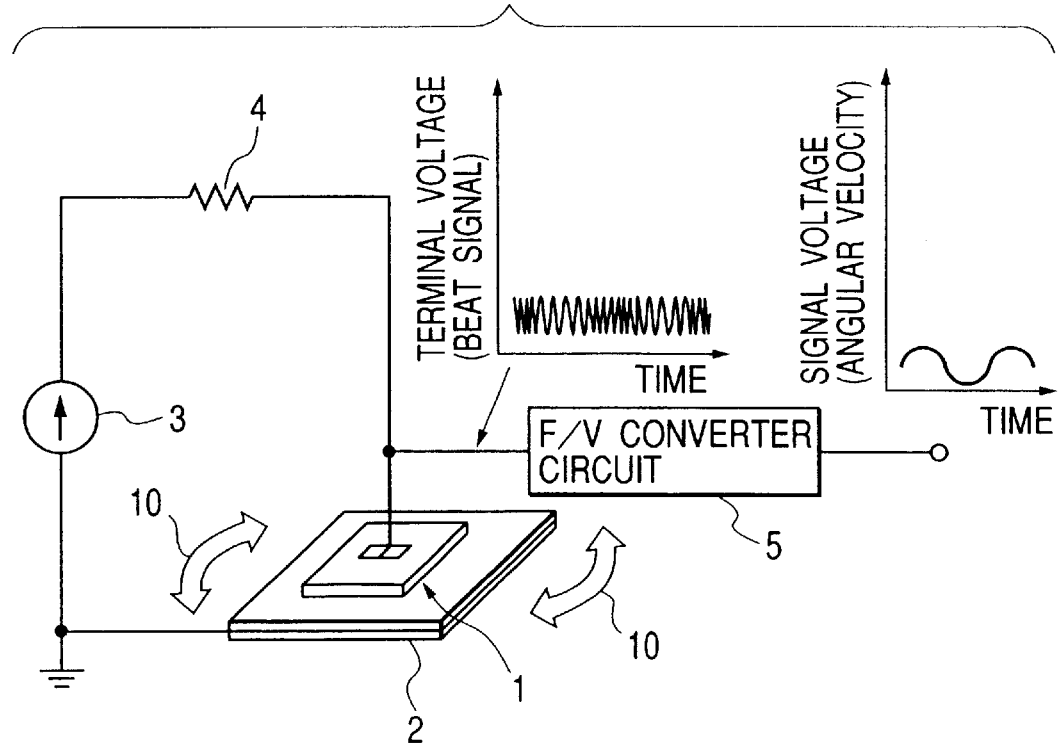
FIG. 32 is a schematic block diagram of a circuit for taking out an electric signal that can be used for the purpose of the invention.

FIG. 32 is a schematic illustration of an arrangement for detecting a beat signal by means of the above laser device. Referring to FIG. 32, there are shown an optical gyro 1, a rotary table 2, a current source 3, a resistor 4 and a frequency/voltage converter circuit (F/V converter circuit) 5. Reference numeral 10 denotes arrows indicating the directions of rotation of the gyro.

With the above arrangement, an electric current is injected into the optical gyro 1 from the current source 3 by way of the resistor 4 that is connected in series. If the optical gyro 1 is held stationary, a beat signal representing the difference between the oscillation frequencies (oscillation wavelengths) of the two laser beams can be obtained as a change in the terminal voltage. If the optical gyro 1 that is mounted on the rotary table 2 is driven to rotate, the obtained beat signal represents the angular velocity of the rotary motion of the optical gyro.

The beat frequency can be converted into a voltage value by causing the beat signal to pass through the F/V converter circuit 5. If the voltage output of the frequency/voltage converter F/V converter circuit 5 is made equal to zero when the optical gyro 1 is held stationary by regulating the offset, the sense of rotation of the optical gyro can be detected by seeing if the output of the F/V converter circuit 5 is positive or negative.

EXAMPLE 2

Referring to FIG. 2B illustrating Example 2, reference numeral 1202 denotes an optical waveguide having a tapered region 1204, whereas reference numeral 1203 denotes another optical waveguide having a tapered region 1205. In FIG. 2B, reference numerals 1207 and 1208 denote respective laser beams.

With the above arrangement, both of laser beams 1207 and 1208 propagate circuitally in the same direction. While the sense of rotation can be detected in a manner as described earlier, it is advantageous for improving the efficiency of coupling the laser beams 1207 and 1208 that the laser beams propagating through parts of the optical waveguides that are located close to each other proceed in the same direction when the two laser beams are moving in the same sense. The optical waveguide 1203 is formed within the optical waveguide 1202 for this purpose.

EXAMPLE 3

FIG. 2C is a schematic illustration of the third example of the invention. Referring to FIG. 2C, the laser device of this example comprises an optical wave guide such as, for example, a quartz tube 1202 including a tapered region 1204 of the optical waveguide, a mirror 1214, an anode 1210, an electric terminal 1216 and a cathode 1212 as well as a quartz tube 1203 including a tapered region 1205 of the optical waveguide, a mirror 1215, an anode 1211, an electric terminal 1217 and a cathode 1213. Reference numerals 1206 and 1207 denote respective laser beams.

With the above arrangement, since each of the optical waveguides are located within the penetrating depth of the corresponding laser beam, the second laser beam could be optically efficiently coupled to the optical waveguide of the first laser. Similarly, the first laser beam could be optically efficiently coupled to the optical waveguide of the second laser. As a result, a large interference component could be obtained in each of the lasers to raise the intensity of the electric signal at each of the electric terminals. Penetrating light as in a case of this example is referred to as evanescent light.

Of the above laser device, the quartz tubes 1202 and 1203 were formed by hollowing a quartz block by means of a drill. Thereafter, the mirrors 1214 and 1215 were fitted to the respective quartz tubes 1202 and 1203. Additionally, the anode 1210, the electric terminal 1216 and the cathode 1212 were fitted to the quartz tube 1202, while the anode 1211, the electric terminal 1217 and the cathode 1213 were fitted to the quartz tube 1203. Subsequently, helium gas and neon gas were introduced into the quartz tubes 1202 and 1203 and a voltage was applied between the anode and the cathode of each of the quartz tubes to give rise to an electric discharge and cause an electric current to flow. As a result, only the counterclockwise laser beam 1206 oscillated in quartz tube 1202 by the tapered region of the optical waveguide whereas only the clockwise laser beam 1207 oscillated in the quartz tube 1203. The tapered regions are made to show an angle of 90° (as defined by β in FIG. 6).

If the quartz tubes 1202 and 1203 were held stationary, the laser beam 1206 and the laser beam 1207 would shown an identical oscillation frequency of $4.73 \times 10^{14}$ Hz and an identical wavelength λ of 632.8 nm. However, since the electric current flowing through the quartz tube 1202 and the electric current flowing through the quartz tube 1203 are differentiated, the Q values of the medium are changed to slightly differentiate the oscillation frequencies of the two laser beams. The oscillation frequency $f_1$ of the laser beam 1206 is greater than the oscillation frequency $f_2$ of the laser beam 1207 by 20 MHz. Additionally, since the quartz tube 1202 and the quartz tube 1203 are arranged in proximity, the laser beam 1206 is coupled to the laser beam 1207 in the quartz tube 1203. At the same time, the laser beam 1207 is coupled to the laser beam 1206 in the quartz tube 1202. As a result, the laser beam 1206 and the laser beam 1207 interfere with each other in the quartz tubes. If a constant source current is used, a signal having an amplitude of 100 mV and a frequency of 20 MHz can be obtained by monitoring the voltage between the electric terminal 1216 and the cathode 1212. At the same time, a signal having an amplitude of 80 mV and the same frequency of 20 MHz can be obtained by monitoring the voltage between the electric terminal 1217 and the cathode 1213. In other words, a beat voltage can be detected even when the quartz tube is held stationary.

If the quartz tubes 1202 and 1203 are driven to rotate clockwise at a rate of 180° per second and each side of the resonators is 10 cm long, the oscillation frequency $f_1$ of the laser beam 1206 propagating counterclockwise is raised by 248.3 kHz, while, on the other hand, the oscillation frequency $f_2$ of the laser beam 1207 propagating clockwise is reduced by 248.3 kHz. Then, the beat frequency can be obtained by formula (18) below:

$$f_1 - f_2 = 20 \text{ MHz} + 496.6 \text{ kHz} \tag{18}$$

In the case where, on the other hand, the quartz tubes 1202 and 1203 are driven to rotate counterclockwise at a rate of 180° per second, the beat frequency can be obtained by formula (19) below:

$$f_1 - f_2 = 20 \text{ MHz} - 496.6 \text{ kHz} \tag{19}$$

Since the absolute value of the increase or the decrease of the beat frequency is proportional to the rotary speed, it is now possible to detect not only the rotary speed of the semiconductor laser but also the sense of rotation because the increase or the decrease in the beat frequency shows a one-to-one correspondence relative to the sense of rotation.

While the change in the terminal voltage is observed by driving the gyro with a constant current in this example, the change in the electric current flowing to the terminal can be observed if the gyro is driven with a constant voltage. Alternatively, the change in the discharge impedance of the electric discharge can be directly detected by means of an impedance meter.

Then, the use of a photodetector for detecting the beat light can be omitted so that consequently the optical feedback noise caused by the light coming back from the photodetector can be eliminated.

While helium gas and neon gas were introduced into the quartz tube in this example, they may be replaced by any gas that can give rise to a laser oscillation. Additionally, the profile of the optical waveguide may be hexangular, triangular or circular instead of being rectangular as shown in FIG. 2C.

EXAMPLE 4

FIG. 2D is a schematic illustration of the fourth example of the invention. Referring to FIG. 2D, the laser device of this example has optical isolators 1218 and 1219.

With the illustrated arrangement, the sense of rotation can be detected on the principle as described above in Example 3. This example differs from Example 3 only in terms of the means for selecting the mode of operation in which only a single laser beam propagates in the related ring laser. More specifically, while tapered optical waveguides were used in Example 3, the tapered regions of the optical waveguides were replaced by respective optical isolators in this example.

When equally polarized beams are made to enter an optical isolator, the latter allows only the beam propagating in a given direction and blocks the other beam propagating in the opposite direction. While the beams propagating in opposite directions are equally polarized in an ordinary ring laser, the ring laser can be made to allow only the beam propagating in a given direction to exist by inserting an optical isolator. It may be needless to say that the optical isolator may be replaced with an optical circulator or some other optical device so long as the latter allows a beam to pass in only one direction.

EXAMPLE 5

FIG. 3A is a schematic illustration of the fifth example of the invention, most clearly showing its characteristic aspects and FIGS. 33A and 33B are schematic cross-sectional views taken along line 33A—33A and line 33B—33B in FIG. 3A, respectively. Referring to FIG. 3A and FIGS. 33A and 33B, the laser device of this example comprises a ring resonator type semiconductor laser 1300 having a tapered region 1304 of the optical waveguide thereof, an anode 33, a cap layer 35, a cladding layer 36, an optical guiding layer 37, an active layer 38 and another optical guiding layer 39 as well as another ring resonator type semiconductor laser 1301 having a tapered region 1305 of the optical waveguide thereof, an anode 43, an electric terminal 44, a cap layer 45, a cladding layer 46, an optical guiding layer 47, an active layer 48 and another optical guiding layer 49 along with a semiconductor substrate 54 and a cathode 55. Reference numeral 1306 denotes a laser beam propagating counterclockwise, whereas reference numeral 1307 denotes a laser beam propagating clockwise. The tapered regions are made to show an angle of 90° (as defined by α and β in FIG. 6).

Firstly, the method for preparing the ring resonator type semiconductor laser having the above described configuration will be described. An undoped InGaAsP optical guiding layer 39 having a 1.3 $\mu$m composition (0.15 $\mu$m thick), an undoped InGaAsP active layer 38 having a 1.55 $\mu$m composition (0.1 $\mu$m thick), another undoped InGaAsP optical guiding layer 37 having a 1.3 $\mu$m composition (0.15 $\mu$m thick), a p-InP cladding layer 36 (2 $\mu$m thick) and a p-InGaAsP cap layer 35 having a 1.4 $\mu$m composition (0.3 $\mu$m thick) were made to grow for the ring resonator type semiconductor laser 1300 on an n-hiP substrate 54 (350 $\mu$m thick) by means of a metal organic vapor phase growth technique. Similarly, an undoped InGaAsP optical guiding layer 49 having a 1.3 $\mu$m composition (0.15 $\mu$m thick), an undoped InGaAsP active layer 48 having a 1.55 $\mu$m composition (0.1 $\mu$m thick), another undoped InGaAsP optical guiding layer 47 having a 1.3 $\mu$m composition (0.15 $\mu$m thick), a p-InP cladding layer 46 (2 $\mu$m thick) and a p-InGaAsP cap layer 45 having a 1.4 $\mu$m composition (0.3 $\mu$m thick) were made to grow for the ring resonator type semiconductor laser 1301 on an n-InP substrate 54 (350 $\mu$m thick) by means of a metal organic vapor phase growth technique.

While the semiconductor layers that were commonly used for the ring resonator type semiconductor laser 1300 and the ring resonator type semiconductor laser 1301 were formed in the example, the layers formed for the two ring resonator type semiconductor lasers may alternatively be formed in separate and independent processes.

After the crystal growth process, photoresist AZ-1350 (tradename, available from Hoechst) was coated onto the p-InGaAsP cap layer by means of a spin coater to get a film thickness of 1 $\mu$m. After pre-baking the wafer at 80° C. for 30 minutes, it was exposed to light with a mask covering it. The optical waveguides showed a width of 5 $\mu$m, whereas they showed a maximum with of 8 $\mu$m and a minimum width of 5 $\mu$m in the tapered regions 1304 and 1305 after the development and rinse process. The circuital optical waveguides had a length of 600 $\mu$m.

Subsequently, the wafer was introduced into a reactive ion etching system and etched to show hollow sections with a depth of 3 $\mu$m by means of chlorine gas. Finally, Cr/Au was made to deposit on the p-InGaAsP cap layers 35 and 45 by evaporation in order to produce respective anodes 33 and 43 there, while AuGe/Ni/Au was made to deposit on the n-InP substrate also by evaporation in order to produce a cathode 55 there. Thereafter, the wafer was annealed in a hydrogen-containing atmosphere to give rise to an ohmic contact.

The third optical waveguide 1320 was formed in a manner as described below.

The third optical waveguide 1320 was made to have the same layers as those of the semiconductor laser 1300. Then, an electric current was injected to make the active layer transparent so that the third optical waveguide was used as a passive type optical waveguide. Alternatively, an electric current may additionally be injected into the third optical waveguide to make it operate as an amplifier type optical waveguide.

For realizing only the function of an optical waveguide, the third optical waveguide may be made to have the same configuration as that of the semiconductor laser 1300 from which only the active layer 38 is removed. If such is the case, no electric current has to be injected into the third optical waveguide 1320 because it is already a passage type optical waveguide.

In FIG. 3A, the angle between the normal to the interface of the semiconductor and air is 45° at any corner of the semiconductor lasers and hence satisfies the angular requirement for total reflection. The oscillation threshold current value was 2 mA at room temperature, whereas the drive current of the ring resonator type laser 1300 was 3 mA and the drive current of the ring resonator type laser 1301 was 3.5 mA. Thus, when the lasers are held stationary, the laser beam 1306 and the laser beam 1307 would show an identical oscillation wavelength λ, which is equal to 1.55 $\mu$m. However, since the drive current of the ring resonator type laser 1302 and that of the ring resonator type laser 1303 are different from each other, their optical waveguides show respective effective refractive indexes that are slightly different from each other. As a result, the oscillation frequency $f_3$ of the laser beam 1306 is greater than the oscillation frequency $f_4$ of the laser beam 1307 by 1 kHz.

When a total reflection occurs, there is generated an evanescent light creeping along the interface. If the oscillation wavelength is 1.55 $\mu$m, the penetrating depth of the evanescent light is 0.0735 $\mu$m. While the intensity of the evanescent light attenuates exponentially (the penetrating depth being the distance at which the electric field amplitude attenuates to 1/e), a ring resonator type laser 1300 and an optical waveguide 1320 are separated by 0.07 $\mu$m which is smaller than the penetrating depth, the laser beam 1306 having passed through an optical waveguide 1320 is coupled to a ring resonator type laser 1301 efficiently. As a result, the laser beam 1306 and the laser beam 1307 interfere with each other in the ring resonator type semiconductor lasers. If a constant current source is used, signals having an amplitude of 100 mV and a frequency of 1 kHz can be obtained by monitoring the voltage between the electric terminal 44 and the cathode 55. In other words, a beat voltage can be detected even when the ring resonator type semiconductor lasers 1300 and 1301 are held stationary. If the ring resonator type semiconductor lasers 1300 and 1301 are driven to rotate clockwise at a rate of 30° per second which roughly corresponds to the rate of vibration of a camera being shaken or that of a moving automobile, the oscillation frequency $f_3$ of the laser beam 1306 propagating counterclockwise is raised by 88.7 Hz, while, on the other hand, the oscillation frequency $f_4$ of the laser beam 1307 propagating clockwise is reduced by 88.7 Hz. Then, the beat frequency can be obtained by formula (16).

In the case where, on the other hand, the ring resonator type semiconductor lasers 1300 and 1301 are driven to rotate counterclockwise at a rate of 30° per second, the beat frequency can be obtained by formula (17).

Since the absolute value of the increase or the decrease in the beat frequency is proportional to the rotary speed, it is now possible to detect not only the rotary speed of the semiconductor laser but also the sense of rotation because the increase or the decrease in the beat frequency shows a one-to-one correspondence relative to the sense of rotation.

In this example, the oscillation wavelength of the ring resonator type laser 1300 and that of the ring resonator type laser 1301 were differentiated from each other by differentiating the drive currents of the two lasers. However, the oscillation frequencies of the two lasers can alternatively be differentiated by differentiating the optical lengths of the two lasers such as the lengths or the widths of the optical waveguides, or thicknesses, the compositions or the materials of the semiconductor layers of the lasers.

FIG. 34 is a schematic illustration of an arrangement for detecting a beat signal by means of the above laser device. Referring to FIG. 34, there are shown an optical gyro 1, a rotary table 2, a current source 3, a resistor 4 and a frequency/voltage converter circuit (F/V converter circuit) 5.

With the above arrangement, an electric current is injected into the optical gyro 1 from the current source 3 by way of the resistor 4 that is connected in series. If the optical gyro 1 is held stationary, a beat signal representing the difference between the oscillation frequencies (oscillation wavelengths) of the two laser beams can be obtained as a change in the terminal voltage. If the optical gyro 1 that is mounted on the rotary table 2 is driven to rotate, the obtained beat signal represents the angular velocity of the rotary motion of the optical gyro.

The beat frequency can be converted into a voltage value by causing the beat signal to pass through the F/V converter circuit 5. If the voltage output of the F/V converter circuit 5 is made equal to zero when the optical gyro 1 is held stationary by regulating the offset, the sense of rotation of the gyro can be detected by seeing if the output of the F/V converter circuit 5 is positive or negative.

EXAMPLE 6

Referring to FIG. 3B illustrating Example 6, reference numeral 1302 denotes an optical waveguide having a tapered region 1304, whereas reference numeral 1303 denotes another optical waveguide having a tapered region 1305 and reference numeral 1320 denotes still another optical waveguide. In FIG. 3B, reference numerals 1306 and 1309 denote respective laser beams.

With the above arrangement, both of laser beams 1306 and 1309 propagate circuitally in the same direction. While the sense of rotation can be detected in a manner as described earlier, it is advantageous for improving the efficiency of coupling the laser beams 1306 and 1309 that the optical waveguides 1302, 1303 and 1320 are arranged in a manner as illustrated in FIG. 3B.

EXAMPLE 7

FIG. 3C illustrates the seventh example of the invention. Referring to FIG. 3C, the laser device of this example comprises a quartz tube 1302 including a tapered region 1304 of the optical waveguide, a mirror 1314, an anode 1310 and a cathode 1312 as well as a quartz tube 1303 including a tapered region 1305 of the optical waveguide, a mirror 1315, an anode 1311, an electric terminal 1317 and a cathode 1313. Reference numerals 1306 and 1307 denote respective laser beams, while reference numeral 1320 denotes still another optical waveguide. The tapered regions are made to show an angle of 90° (as defined by α and β in FIG. 6) as in other examples, although the angle is not limited to 90° if a beat signal is appropriately obtained when the gyro is held stationary.

Of the above laser device, the quartz tubes 1302 and 1303 and the optical waveguide 1320 were formed by hollowing a quartz block by means of a drill. Thereafter, the mirrors 1314 and 1315 were fitted to the respective quartz tubes 1302 and 1303. Additionally, the anode 1310 and the cathode 1312 were fitted to the quartz tube 1302, whereas the anode 1311, the electric terminal 1317 and the cathode 1313 were fitted to the quartz tube 1303. Subsequently, helium gas and neon gas were introduced into the quartz tube 1302 and a voltage was applied between the anode and the cathode of each of the quartz tubes to give rise to an electric discharge and cause an electric current to flow. As a result, only the counterclockwise laser beam 1306 oscillated in quartz tube 1302 whereas only the clockwise laser beam 1307 oscillated in the quartz tube 1303.

If the quartz tubes 1302 and 1303 were held stationary, the laser beam 1306 and the laser beam 1307 would show an identical oscillation frequency of $4.73 \times 10^{14}$ Hz and an identical wavelength λ of 632.8 nm. However, since the electric current flowing through the quartz tube 1302 and the electric current flowing through the quartz tube 1303 are differentiated, the Q values of the medium are changed to slightly differentiate the oscillation frequencies of the two laser beams. The oscillation frequency $f_1$ of the laser beam 1306 is greater than the oscillation frequency $f_2$ of the laser beam 1307 by 20 MHz.

Additionally, since the quartz tube 1302 and optical waveguide 1320 are arranged in proximity, the laser beam 1306 is coupled with optical waveguide 1320. At the same time, since the quartz tube 1303 and the optical waveguide 1320 are arranged in proximity, the laser beam propagating through the optical waveguide 1320 is coupled with the quartz tube 1303. As a result, the laser beam 1306 and the laser beam 1307 interfere with each other in the quartz tube 1303. If a constant current source is used, a signal having an amplitude of 80 mV and a frequency of 20 MHz can be obtained by monitoring the voltage between the electric terminal 1317 and the cathode 1313. In other words, a beat voltage can be detected even when the quartz tubes 1302 and 1303 are held stationary.

If the quartz tubes 1302 and 1303 are driven to rotate clockwise at a rate of 180° per second and each side of the resonators is 10 cm long, the oscillation frequency $f_1$ of the laser beam 1306 propagating counterclockwise is raised by 248.3 kHz, while, on the other hand, the oscillation frequency $f_2$ of the laser beam 1307 propagating clockwise is reduced by 248.3 kHz. Then, the beat frequency can be obtained by formula (18).

In the case where, on the other hand, the quartz tubes 1302 and 1303 are driven to rotate counterclockwise at a rate of 180° per second, the beat frequency can be obtained by formula (19).

Since the absolute value of the increase or the decrease in the beat frequency is proportional to the rotary speed, it is now possible to detect not only the rotary speed of the semiconductor laser but also the sense of rotation because the increase or the decrease in the beat frequency shows a one-to-one correspondence relative to the sense of rotation.

EXAMPLE 8

FIG. 3D schematically illustrates this example. In FIG. 3D, reference numerals 1318 and 1319 denote respective optical isolators.

This arrangement can be used to detect the sense of rotation on the principle as described in Example 7. This example differs from Example 7 in terms of the means for selecting the mode of propagating a laser beam in only one direction in a ring laser. More specifically, while tapered optical waveguides were used in Example 7, optical isolators were used in this example.

When equally polarized beams are made to enter an optical isolator, the latter allows only the beam propagating in a given direction and blocks the other beam propagating in the opposite direction. While the beams propagating in opposite directions are equally polarized in an ordinary ring laser, the ring laser can be made to allow only the beam propagating in a given direction to exist by inserting an optical isolator. It may be needless to say that the optical isolator may be replaced with an optical circulator or some other optical device so long as the latter allows a beam to pass in only one direction.

EXAMPLE 9

Figure 35A:
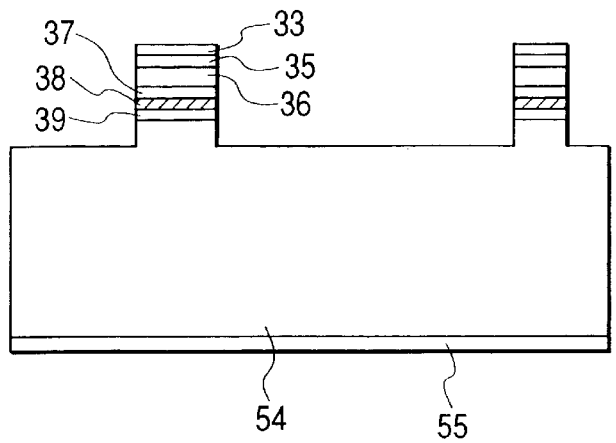
FIGS. 35A and 35B are schematic cross-sectional views of still another embodiment of a ring-shaped laser according to the invention.
Figure 35B:
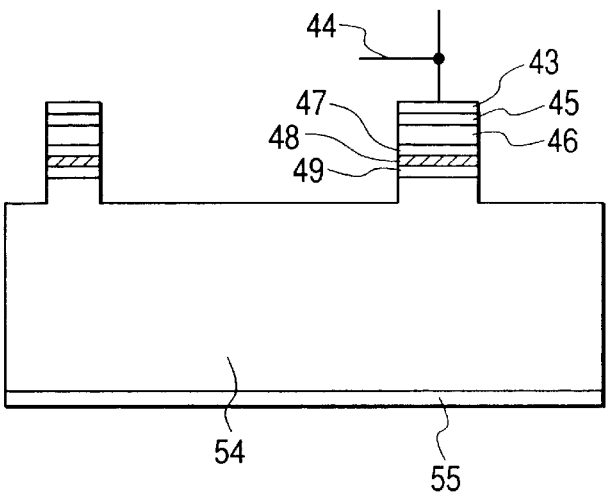

FIG. 4A is a schematic illustration of the ninth example of the invention, and FIGS. 35A and 35B are schematic cross-sectional views respectively taken along line 35A—35A and line 35B—35B in FIG. 4A. Referring to both FIG. 4A and FIGS. 35A and 35B, the laser device of this example comprises a ring resonator type semiconductor laser 1400 having a tapered region 1404 of the optical waveguide thereof, an anode 33, a cap layer 35, a cladding layer 36, an optical guiding layer 37, an active layer 38 and another optical guiding layer 39 as well as another ring resonator type semiconductor laser 1401 having a tapered region 1405 of the optical waveguide thereof, an anode 43, an electric terminal 44, a cap layer 45, a cladding layer 46, an optical guiding layer 47, an active layer 48 and another optical guiding layer 49 along with a semiconductor substrate 54, a cathode 55 and still another optical waveguide 1420. Reference numeral 1406 denotes a laser beam propagating counterclockwise, whereas reference numeral 1407 denotes a laser beam propagating clockwise.

Firstly, the method for preparing the ring resonator type semiconductor laser having the above describe configuration will be described. An undoped InGaAsP optical guiding layer 39 having a 1.3 μm composition (0.15 μm thick), an undoped InGaAsP active layer 38 having a 1.55 μm composition (0.1 μm thick), another undoped InGaAsP optical guiding layer 37 having a 1.3 μm composition (0.15 μm thick), a p-inp cladding layer 36 (2 μm thick) and a p-InGasP cap layer 35 having a 1.4 μm composition (0.3 μm thick) were made to grow for the ring resonator type semiconductor laser 1400 on an n-InP substrate 54 (350 μm thick) by means of a metal organic vapor phase growth technique. Similarly, an undoped InGaAsP optical guiding layer 49 having a 1.3 μm composition (0.15 μm thick), an undoped InGaAsP active layer 48 having a 1.55 μm composition (0.1 μm thick), another undoped InGaAsP optical guiding layer 47 having a 1.3 μm composition (0.15 μm thick), a p-InP cladding layer 46 (2 μm thick) and a p-InGaAsP cap layer 45 having a 1.4 μm composition (0.3 μm thick) were made to grow for the ring resonator type semiconductor laser 1401 on an n-fnP substrate 54 (350 μm thick) by means of a metal organic vapor phase growth technique.

While the semiconductor layers that were commonly used for the ring resonator type semiconductor laser 1400 and the ring resonator type semiconductor laser 1401 were formed in the example, the layers formed for the two ring resonator type semiconductor lasers may alternatively be formed in separate and independent processes. After the crystal growth process, photoresist AZ-1350 (tradename, available from Hoechst) was coated onto the p-InGaAsP cap layer by means of a spin coater to get a film thickness of 1 μm. After prebaking the wafer at 80° C. for 30 minutes, it was exposed to light with a mask covering it. The optical waveguides showed a width of 5 μm whereas they showed a maximum width of 8 μm and a minimum width of 5 μm in the tapered regions 1404 and 1405 after the development and rinse process. The circuital optical waveguides had a length of 600 μm. Subsequently, the wafer was introduced into a reactive ion etching system and etched to show hollow sections with a depth of 3 μm by means of chlorine gas. Finally, Cr/Au was made to deposit on the p-InGaAsP cap layers 35 and 45 by evaporation in order to produce respective anodes 33 and 43 there, while AuGe/Ni/Au was made to deposit on the n-InP substrate also by evaporation in order to produce a cathode 55 there. Thereafter, the wafer was annealed in a hydrogen-containing atmosphere to give rise to an ohmic contact.

Light generated in the ring resonator type semiconductor lasers having the above described configuration is reflected by the surface thereof, or the interfaces of the lasers and air, because of the difference of the refractive index of the semiconductor and that of air. If the refractive index of the semiconductor is 3.5, a total reflection occurs when the angle between the normal to the interface and the laser beam is equal to or greater than 16.6°. Since the mode of oscillation for receiving the total reflection shows an oscillation threshold value smaller than any other modes because of a reduced mirror loss, the laser device starts oscillating with a low injected current level. Additionally, since gain concentrates in this oscillation mode, oscillations in any other mode will be suppressed. In FIG. 4A, the angle between the normal to the interface of the semiconductor and air is 45° and hence satisfies the angular requirement for total reflection. The oscillation threshold current value was 2 mA at room temperature, whereas the drive current of the ring resonator type laser 1400 was 3 mA and the drive current of the ring resonator type laser 1401 was 3.5 mA. Thus, when the lasers are held stationary, the laser beam 1406 and the laser beam 1407 would show a same oscillation wavelength λ, which is equal to 1.55 μm. However, since the drive current of the ring resonator type laser 1402 and that of the ring resonator type laser 1403 are different from each other, their optical waveguides show respective effective refractive indexes that are slightly different from each other. As a result, the oscillation frequency $f_3$ of the laser beam 1406 is greater than the oscillation frequency $f_4$ of the laser beam 1407 by 1 kHz.

Since the ring resonator type laser 1400 and the ring resonator type laser 1401 are connected by means of the optical waveguide 1430, the laser beam 1406 and the laser beam 1407 are coupled efficiently. As a result, the laser beam 1406 and the laser beam 1407 interfere with each other in the ring resonator type semiconductor lasers. If a constant current source is used, a signal having an amplitude of 100 mV and a frequency of 1 kHz can be obtained by monitoring the voltage between the electric terminal 44 and the cathode 55. In other words, a beat voltage can be detected even when the ring resonator type semiconductor lasers 1400 and 1401 are held stationary.

If the ring resonator type semiconductor lasers 1400 and 1401 are driven to rotate clockwise at a rate of 30° per second which roughly corresponds to the rate of vibration of a camera being shaken or that of a moving automobile, the oscillation frequency $f_3$ of the laser beam 1406 propagating counterclockwise is raised by 88.7 Hz, while, on the other hand, the oscillation frequency $f_4$ of the laser beam 1407 propagating clockwise is reduced by 88.7 Hz. Then, the beat frequency can be obtained by formula (16).

In the case where, on the other hand, the ring resonator type semiconductor lasers 1400 and 1401 are driven to rotate counterclockwise at a rate of 30° per second, the beat frequency can be obtained by formula (17).

Since the absolute value of the increase or the decrease in the beat frequency is proportional to the rotary speed, it is now possible to detect not only the rotary speed of the semiconductor laser but also the sense of rotation because the increase or the decrease in the beat frequency shows a one-to-one correspondence relative to the sense of rotation.

In this example, the oscillation wavelength of the ring resonator type laser 1400 and that of the ring resonator type laser 1401 were differentiated from each other by differentiating the drive currents of the two lasers. However, the oscillation frequencies of the two lasers can alternatively be changed by altering the optical lengths of the two lasers such as the lengths or widths of the optical waveguides, or the thicknesses, the compositions or the materials of the semiconductor layers of the lasers.

Figure 36:
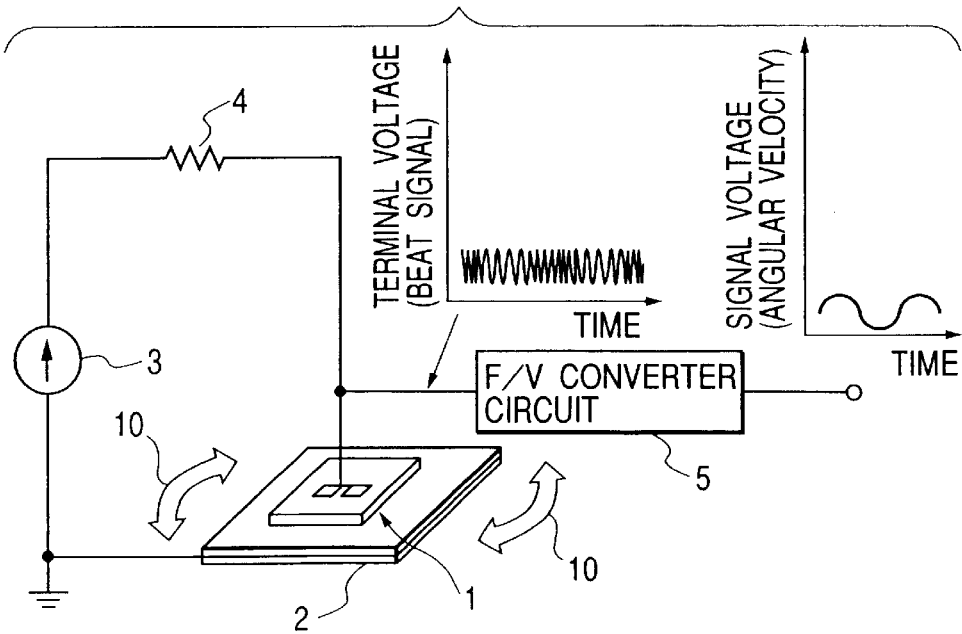
FIG. 36 is a schematic block diagram of a circuit for taking out an electric signal that can be used for the purpose of the invention.

FIG. 36 is a schematic illustration of an arrangement for detecting a beat signal by means of the above laser device. Referring to FIG. 36, there are shown an optical gyro 1, a rotary table 2, a current source 3, a resistor 4 and a frequency/voltage converter circuit (F/V converter circuit) 5.

With the above arrangement, an electric current is injected into the optical gyro 1 from the current source 3 by way of the resistor 4 that is connected in series. If the optical gyro 1 is held stationary, a beat signal representing the difference between the oscillation frequencies (oscillation wavelengths) of the two laser beams can be obtained as a change in the terminal voltage. If the optical gyro 1 that is mounted on the rotary table 2 is driven to rotate, the obtained beat signal represents the angular velocity of the rotary motion of the optical gyro.

The beat frequency can be converted into a voltage value by causing the beat signal to pass through the F/V converter circuit 5. If the voltage output of the F/V converter circuit 5 is made equal to zero when the optical gyro 1 is held stationary by regulating the offset, the sense of rotation of the gyro can be detected by seeing if the output of the F/V converter circuit 5 is positive or negative.

EXAMPLE 10

Referring to FIG. 4B illustrating Example 10, reference numeral 1402 denotes an optical waveguide having a tapered region 1404, whereas reference numeral 1403 denotes another optical waveguide having a tapered region 1405 and reference numeral 1420 denotes still another optical waveguide. In FIG. 4B, reference numerals 1406 and 1409 denote respective laser beams.

With the above arrangement, both laser beams 1406 and 1409 propagate circuitally in the same direction. While the sense of rotation can be detected in a manner as described earlier, it is advantageous for improving the efficiency of coupling the laser beams 1406 and 1409 that the optical waveguides 1402, 1403 and 1420 are arranged in a manner as illustrated in FIG. 4B.

EXAMPLE 11

FIG. 4C is a schematic illustration of the eleventh example of the invention. Referring to FIG. 4C, the laser device of this example comprises an optical waveguide, such as, for example, a quartz tube 1402 including a tapered region 1404 of the optical waveguide, a mirror 1414, an anode 1410 and a cathode 1412 as well as a quartz tube 1403 including a tapered region 1405 of the optical waveguide, a mirror 1415, an anode 1411, an electric terminal 1417, a cathode 1413 and still another optical waveguide 1420. Reference numerals 1406 and 1407 denote respective laser beams.

Of the above laser device, the quartz tubes 1402 and 1403 and the optical waveguide 1420 were formed by hollowing a quartz block by means of a drill. Thereafter, the mirrors 1414 and 1415 were fitted to the respective quartz tubes 1402 and 1403. Additionally, anode 1410, cathode 1412, anode 1411, electric terminal 1417 and cathode 1413 were fitted to the quartz tubes 1402 and 1403. Subsequently, helium gas and neon gas were introduced into the quartz tube 1402 and a voltage was applied between the anode and the cathode of each of the quartz tubes to give rise to an electric discharge and cause an electric current to flow. As a result, only the counterclockwise laser beam 1406 oscillated in quartz tube 1402 whereas only the clockwise laser beam 1407 oscillated in the quartz tube 1403.

If the quartz tubes 1402 and 1403 were held stationary, the laser beam 1406 and the laser beam 1407 would show an identical oscillation frequency of $4.73 \times 10^{14}$ Hz and an identical wavelength $\lambda$ of 632.8 nm. However, since the electric current flowing through the quartz tube 1402 and the electric current flowing through the quartz tube 1403 are differentiated, the Q values of the medium are changed to slightly differentiate the oscillation frequencies of the two laser beams. The oscillation frequency $f_1$ of the laser beam 1406 is greater than the oscillation frequency $f_2$ of the laser beam 1407 by 20 MHz. Additionally, since the quartz tube 1402 and the quartz tube 1403 are connected by way of the optical waveguide 1420, the laser beam 1406 is coupled to the laser beam 1407 in the quartz tube 1403. At the same time, the laser beam 1407 is coupled with the laser beam 1406 in the quartz tube 1402. As a result, the laser beam 1406 and the laser beam 1407 interfere with each other in each of the quartz tubes. If a constant current source is used, a signal having an amplitude of 80 mv and a frequency of 20

MHz can be obtained by monitoring the voltage between the electric terminal 1417 and the cathode 1413. In other words, a beat voltage can be detected even when the quartz tube is held stationary.

If the quartz tubes 1402 and 1403 are driven to rotate clockwise at a rate of 180° per second and each side of the resonators is 10 cm long, the oscillation frequency $f_1$ of the laser beam 1406 propagating counterclockwise is raised by 248.3 kHz, while, on the other hand, the oscillation frequency $f_2$ of the laser beam 1407 propagating clockwise is reduced by 248.3 kHz. Then, the beat frequency can be obtained by formula (18).

In the case where, on the other hand, the quartz tubes 1402 and 1403 are driven to rotate counterclockwise at a rate of 180° per second, the beat frequency can be obtained by formula (19).

Since the absolute value of the increase or the decrease of the beat frequency is proportional to the rotary speed, it is now possible to detect not only the rotary speed of the semiconductor laser but also the sense of rotation because the increase or the decrease in the beat frequency shows a one-to-one correspondence relative to the sense of rotation.

While the change in the terminal voltage is observed by driving the gyro with a constant current in this example, the change in the electric current flowing to the terminal can be observed if the gyro is driven with a constant voltage. Alternatively, the change in the discharge impedance of the electric discharge can be directly detected by means of an impedance meter.

EXAMPLE 12

FIG. 4D schematically illustrates this example. In FIG. 4D, reference numerals 1418 and 1419 denote respective optical isolators.

This arrangement can be used to detect the sense of rotation on the principle as described in Example 11. This example differs from Example 11 in terms of the means for selecting the mode of propagating a laser beam in only one direction in a ring laser. More specifically, while tapered optical waveguides were used in Example 11, optical isolators were used in this example.

When equally polarized beams are made to enter an optical isolator, the latter allows only the beam propagating in a given direction and blocks the other beam propagating in the opposite direction. While the beams propagating in opposite directions are equally polarized in an ordinary ring laser, the ring laser can be made to allow only the beam propagating in a given direction to exist by inserting an optical isolator. It may be needless to say that the optical isolator may be replaced with an optical circulator or some other optical device so long as the latter allows a beam to pass in only one direction.

EXAMPLE 13

Figure 37:
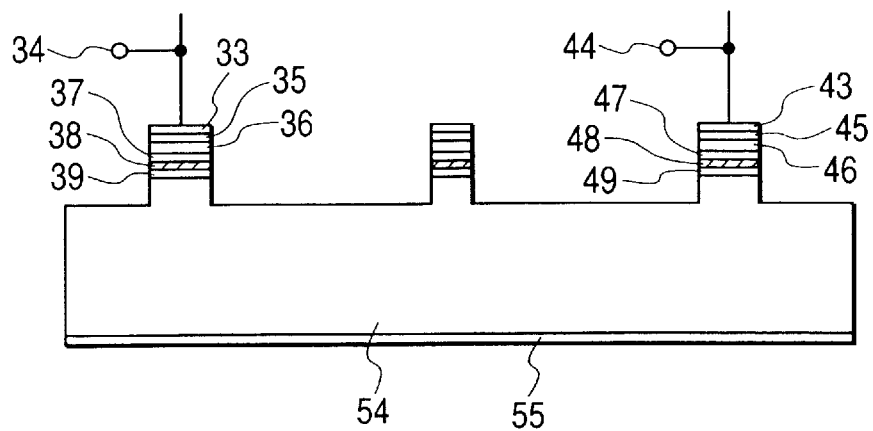
FIG. 37 is a schematic cross-sectional view of still another embodiment of a ring-shaped laser according to the invention.

FIG. 5A is a schematic illustration of the thirteenth example of the invention, and FIG. 37 is a schematic cross-sectional view taken along line 37—37 in FIG. 5A. Referring to both FIG. 5A and FIG. 37, the laser device of this example comprises a ring resonator type semiconductor laser 1500 having a tapered region 1504 of the optical waveguide thereof, an anode 33, an electric terminal 34, a cap layer 35, a cladding layer 36, an optical guiding layer 37, an active layer 38 and another optical guiding layer 39 as well as another ring resonator type semiconductor laser 1501 having a tapered region 1505 of the optical waveguide thereof, an anode 43, an electric terminal 44, a cap layer 45, a cladding layer 46, an optical guiding layer 47, an active layer 48 and another optical guiding layer 49 along with a semiconductor substrate 54 and a cathode 55. Reference numeral 1506 denotes a laser beam propagating counterclockwise, whereas reference numeral 1507 denotes a laser beam propagating clockwise.

Firstly, the method for preparing the ring resonator type semiconductor laser having the above described configuration will be described. An undoped InGaAsP optical guiding layer 39 having a 1.3 µm composition (0.15 µm thick), an undoped InGaAsP active layer 38 having a 1.55 µm composition (0.1 µm thick), another undoped InGaAsP optical guiding layer 37 having a 1.3 µm composition (0.15 µm thick), a p-InP cladding layer 36 (2 µm thick) and a p-InGaAsP cap layer 35 having a 1.4 µm composition (0.3 µm thick) were grown for the ring resonator type semiconductor laser 1500 on an n-InP substrate 54 (350 µm thick) by means of a metal organic vapor phase growth technique. Similarly, an undoped InGaAsP optical guiding layer 49 having a 1.3 µm composition (0.15 µm thick), an undoped InGaAsP active layer 48 having a 1.55 µm composition (0.1 µm thick), another undoped InGaAsP optical guiding layer 47 having a 1.3 µm composition (0.15 µm thick), a p-InP cladding layer 46 (2 µm thick) and a p-InGaAsP cap layer 45 having a 1.4 µm composition (0.3 µm thick) were grown for the ring resonator type semiconductor laser 1501 on an n-InP substrate 54 (350 µm thick) by means of a metal organic vapor phase growth technique.

While the semiconductor layers that were commonly used for the ring resonator type semiconductor laser 1500 and the ring resonator type semiconductor laser 1501 were formed in the example, the layers formed for the two ring resonator type semiconductor lasers may alternatively be formed in separate and independent processes. After the crystal growth process, photoresist AZ-1350 (tradename, available from Hoechst) was applied onto the p-InGaAsP cap layer by means of a spin coater to get a film thickness of 1 µm. After prebaking the wafer at 80° C. for 30 minutes, it was exposed to light with a mask covering it. The optical waveguides showed a width of 5 µm, whereas they showed a maximum width of 8 µm and a minimum width of 5 µm in the tapered regions 1504 and 1505 after the development and rinse process. The circuital optical waveguides had a length of 600 µm. Subsequently, the wafer was introduced into a reactive ion etching system and etched to show hollow sections with a depth of 3 µm by means of chlorine gas. Finally, Cr/Au was deposited on the p-InGaAsP cap layers 35 and 45 by evaporation in order to produce respective anodes 33 and 43 there, while AuGe/Ni/Au was deposited on the n-InP substrate also by evaporation in order to produce a cathode 55 there. Thereafter, the wafer was annealed in a hydrogen-containing atmosphere to give rise to an ohmic contact.

Light generated in the ring resonator type semiconductor lasers having the above described configuration is reflected by the surface thereof, or the interfaces of the lasers and air, because of the difference of the refractive index of the semiconductor and that of air. If the refractive index of the semiconductor is 3.5, a total reflection occurs when the angle between the normal to the interface and the laser beam is equal to or greater than 16.6°. Since the mode of oscillation for receiving the total reflection shows an oscillation threshold value smaller than any other modes because of a reduced mirror loss, the laser device starts oscillating with a low injected current level. Additionally, since gain concentratively appears in this oscillation mode, oscillations in any other modes will be suppressed. In FIG. 5A, the angle between the normal to the interface of the semiconductor and air is 45° at any corner of the semiconductor lasers and hence satisfies the angular requirement for total reflection. The oscillation threshold current value was 2 mA at room temperature, whereas the drive current of the ring resonator type laser 1500 was 3 mA and the drive current of the ring resonator type laser 1501 was 3.5 mA. Thus, when the lasers are held stationary, the laser beam 1506 and the laser beam 1507 would show the same oscillation wavelength λ, which is equal to 1.55 μm. However, since the drive current of the ring resonator type laser 1500 and that of the ring resonator type laser 1501 are different from each other, their optical waveguides show respective effective refractive indexes that are slightly different from each other. As a result, the oscillation frequency $f_3$ of the laser beam 1506 is greater than the oscillation frequency $f_4$ of the laser beam 1507 by 1 kHz.

Since the ring resonator type laser 1500 and the ring resonator type laser 1501 share part of their optical waveguides, the laser beam 1506 and the laser beam 1507 are coupled efficiently. As a result, the laser beam 1506 and the laser beam 1507 interfere with each other in the ring resonator type semiconductor lasers. If a constant current source is used, a signal having an amplitude of 80 mV and a frequency of 1 kHz can be obtained by monitoring the voltage between the electric terminal 34 and the cathode 55, whereas a signal having an amplitude of 100 mV and a frequency of 1 kHz can be obtained by monitoring the voltage between the electric terminal 44 and the cathode 55. In other words, a beat voltage can be detected even when the ring resonator type semiconductor lasers 1502 and 1503 are held stationary.

If the ring resonator type semiconductor lasers 1500 and 1501 are driven to rotate clockwise at a rate of 30° per second which roughly corresponds to the rate of vibration of a camera being shaken or that of a moving automobile, the oscillation frequency $f_3$ of the laser beam 1506 propagating counterclockwise is raised by 88.7 Hz, while, on the other hand, the oscillation frequency $f_4$ of the laser beam 1507 propagating clockwise is reduced by 88.7 Hz. Then, the beat frequency can be obtained by formula (16).

In the case where, on the other hand, the ring resonator type semiconductor lasers 1500 and 1501 are driven to rotate counterclockwise at a rate of 30° per second, the beat frequency can be obtained by formula (17).

Since the absolute value of the increase or the decrease in the beat frequency is proportional to the rotary speed, it is now possible to detect not only the rotary speed of the semiconductor laser but also the sense of rotation because the increase or the decrease in the beat frequency shows a one-to-one correspondence relative to the sense of rotation.

In this example, the oscillation wavelength of the ring resonator type laser 1500 and that of the ring resonator type laser 1501 were differentiated from each other by differentiating the drive currents of the two lasers. However, the oscillation frequencies of the two lasers can alternatively be changed by altering the optical lengths of the two lasers such as the lengths or the widths of the optical waveguides, or the thicknesses, the compositions or the materials of the semiconductor layers of the lasers.

Figure 38:
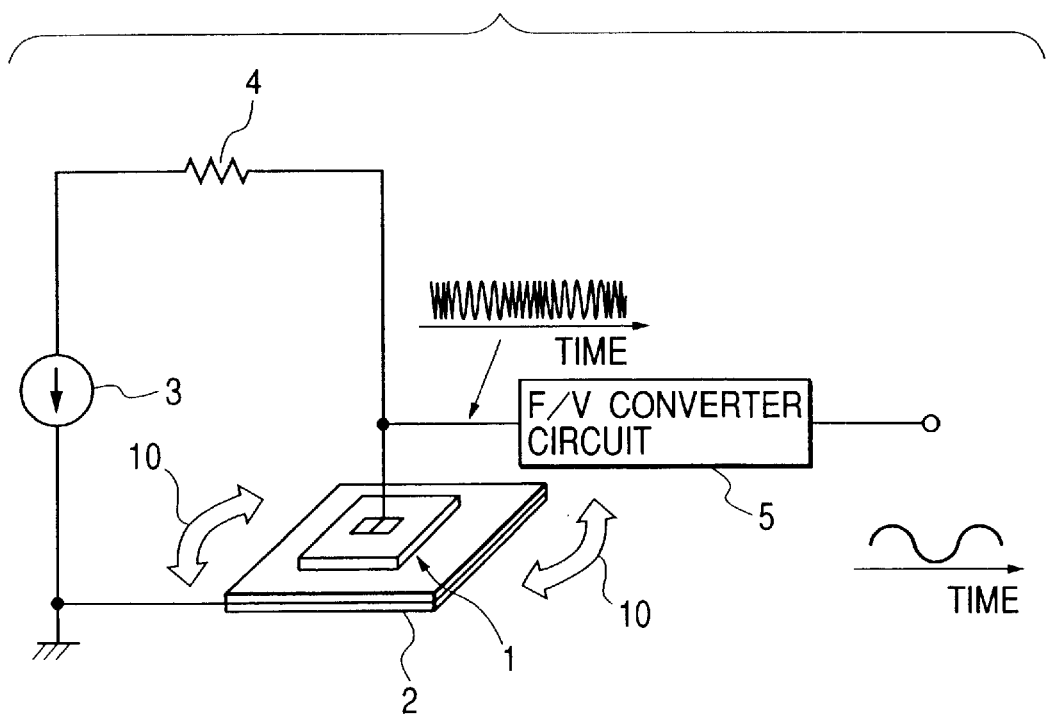
FIG. 38 is a schematic block diagram of a circuit for taking out an electric signal that can be used for the purpose of the invention.

FIG. 38 is a schematic illustration of an arrangement for detecting a beat signal by means of the above laser device. Referring to FIG. 38, there are shown an optical gyro 1, a rotary table 2, a current source 3, a resistor 4 and a frequency/voltage converter circuit (F/V converter circuit) 5.

With the above arrangement, an electric current is injected into the optical gyro 1 from the current source 3 by way of the resistor 4 that is connected in series. If the optical gyro 1 is held stationary, a beat signal representing the difference between the oscillation frequencies (oscillation wavelengths) of the two laser beams can be obtained as a change in the terminal voltage. If the optical gyro 1 that is mounted on the rotary table 2 is driven to rotate, the obtained beat signal represents the angular velocity of the rotary motion of the optical gyro.

The beat frequency can be converted into a voltage value by causing the beat signal to pass through the F/V converter circuit 5. If the voltage output of the converter circuit 5 is made equal to zero when the optical gyro 1 is held stationary by regulating the offset, the sense of rotation of the gyro can be detected by seeing if the output of the F/V converter circuit 5 is positive or negative.

EXAMPLE 14

Referring to FIG. 5B illustrating Example 14, reference numeral 1502 denotes an optical waveguide having a tapered region 1504, whereas reference numeral 1503 denotes another optical waveguide having a tapered region 1505. In FIG. 4B, reference numerals 1506 and 1509 denote respective laser beams.

With the above arrangement, both of laser beams 1506 and 1509 propagate circuitally in the same direction. With this arrangement, the sense of rotation can be detected in a manner as described in Example 13.

EXAMPLE 15

FIG. 5C is a schematic illustration of the eleventh example of the invention. Referring to FIG. 5C, the laser device of this example comprises an optical waveguide, such as, for example, a quartz tube 1502 including a tapered region 1504 of the optical waveguide, a mirror 1514, an anode 1510, an electric terminal 1516 and a cathode 1512 as well as a quartz tube 1503 including a tapered region 1505 of the optical waveguide, a mirror 1515, an anode 1511, an electric terminal 1517 and a cathode 1513. Reference numerals 1506 and 1508 denote respective laser beams.

Of the above laser device, the quartz tubes 1502 and 1503 were formed by hollowing a quartz block by means of a drill. Thereafter, the mirrors 1514 and 1515 were fitted to the respective quartz tubes 1502 and 1503. Additionally, the anode 1510, the electric terminal 1516 and the cathode 1512 were fitted to the quartz tube 1502, while the anode 1511, the electric terminal 1517 and the cathode 1513 were fitted to the quartz tube 1503. Subsequently, helium gas and neon gas were introduced into the quartz tubes 1502 and 1503 and a voltage was applied between the anode and the cathode of each of the quartz tubes to give rise to an electric discharge and cause an electric current to flow. Due to the existence of the tapered regions 1504 and 1505 of the optical waveguides, only the counterclockwise laser beam 1506 oscillated in quartz tube 1502 whereas only the clockwise laser beam 1508 oscillated in the quartz tube 1503.

If the quartz tubes 1502 and 1503 were held stationary, the laser beam 1506 and the laser beam 1508 would show an identical oscillation frequency of $4.73 \times 10^{14}$ Hz and an identical wavelength λ of 632.8 nm. However, since the electric current flowing through the quartz tube 1502 and the electric current flowing through the quartz tube 1503 are differentiated, the Q values of the medium are changed to slightly differentiate the oscillation frequencies of the two laser beams. The oscillation frequency $f_1$ of the laser beam 1506 is greater than the oscillation frequency $f_2$ of the laser beam 1508 by 20 MHz. Additionally, since the quartz tube 1502 and the quartz tube 1503 shared part of their optical waveguides, the laser beam 1506 is coupled with the laser beam 1508 in the quartz tube 1503. At the same time, the laser beam 1508 is coupled with the laser beam 1506 in the quartz tube 1502. As a result, the laser beam 1506 and the laser beam 1508 interfere with each other in the quartz tubes. If a constant current source is used, a signal having an amplitude of 80 mV and a frequency of 20 MHz can be obtained by monitoring the voltage between the electric terminal 1516 and the cathode 1512, while a signal having an amplitude of 100 mV and a frequency of 20 MHz can be obtained by monitoring the voltage between the electric terminal 1517 and the cathode 1513. In other words, a beat voltage can be detected even when the quartz tube is held stationary. If the quartz tubes 1502 and 1503 are driven to rotate clockwise at a rate of 180° per second and each side of the resonators is 10 cm long, the oscillation frequency $f_1$ of the laser beam 1506 propagating counterclockwise is raised by 248.3 kHz, while, on the other hand, the oscillation frequency $f_2$ of the laser beam 1508 propagating clockwise is reduced by 248.3 kHz. Then, the beat frequency can be obtained by formula (18).

In the case where, on the other hand, the quartz tubes 1502 and 1503 are driven to rotate counterclockwise at a rate of 180° per second, the beat frequency can be obtained by formula (19).

Since the absolute value of the increase or the decrease in the beat frequency is proportional to the rotary speed, it is now possible to detect not only the rotary speed of the semiconductor laser but also the sense of rotation because the increase or the decrease in the beat frequency shows a one-to-one correspondence relative to the sense of rotation.

While helium gas and neon gas were introduced into the quartz tube in this example, they may be replaced by any gas that can give rise to a laser oscillation. Additionally, the profile of the optical waveguide may be hexangular, triangular or circular instead of being rectangular as shown in FIG. 5C.

EXAMPLE 16

FIG. 5D schematically illustrates this example. In FIG. 5D, reference numerals 1518 and 1519 denote respective optical isolators.

This arrangement can be used to detect the sense of rotation on the principle as described in Example 15. This example differs from Example 15 in terms of the means for selecting the mode of propagating a laser beam in only one direction in a ring laser. More specifically, while tapered optical waveguides were used in Example 15, optical isolators were used in this example.

When equally polarized beams are made to enter an optical isolator, the latter allows only the beam propagating in a given direction and blocks the other beam propagating in the opposite direction. While the beams propagating in opposite directions are equally polarized in an ordinary ring laser, the ring laser can be made to allow only the beam propagating in a given direction to exist by inserting an optical isolator. It may be needless to say that the optical isolator may be replaced with an optical circulator or some other optical device so long as the latter allows a beam to pass in only one direction.

EXAMPLE 17

FIG. 7A is a schematic illustration of the seventeenth example of the invention, and FIG. 7G is a schematic cross-sectional view taken along line 7G—7G in FIG. 7A. Referring to both FIG. 7A and FIG. 7G, the laser device of this example comprises a ring resonator type semiconductor laser 1200 having a tapered region 1204 of the optical waveguide thereof, an anode 33, a cap layer 35, a cladding layer 36, an optical guiding layer 37, an active layer 38 and another optical guiding layer 39 as well as another ring resonator type semiconductor laser 1201 having a tapered region 1205 of the optical waveguide thereof, an anode 43, a cap layer 45, a cladding layer 46, an optical guiding layer 47, an active layer 48 and another optical guiding layer 49 along with a photodetector 1230, a semiconductor substrate 54 and a cathode 55. Reference numeral 1206 denotes a laser beam propagating counterclockwise and reference numeral 1256 denotes the laser beam emitted from the ring resonator type semiconductor laser 1200, whereas reference numeral 1207 denotes a laser beam propagating clockwise and reference numeral 1257 denotes the laser beam emitted from the ring resonator type semiconductor laser 1201.

The semiconductor lasers 1200 and 1201 were prepared as in Example 1.

The oscillation threshold current value was 2 mA at room temperature, whereas the drive current of the ring resonator type laser 1200 was 3 mA and the drive current of the ring resonator type laser 1201 was 3.5 mA. Thus, when the lasers are held stationary, the laser beam 1206 and the laser beam 1207 would show the same oscillation wavelength $\lambda$, which is equal to 1.55 $\mu$m. However, since the drive current of the ring resonator type laser 1200 and that of the ring resonator type laser 1201 are different from each other, their optical waveguides show respective effective refractive indexes that are slightly different from each other. As a result, the oscillation frequency $f_3$ of the laser beam 1206 is greater than the oscillation frequency $f_1$ of the laser beam 1207 by 1 kHz. As the laser beam 1256 and the laser beam 1257 are received simultaneously by the photodetector 1230, the laser beam 1206 and the laser beam 1207 interfere with each other in the photodetector 1230. As a result, a signal having an amplitude of 80 mv and a frequency of 1 kHz can be obtained at the electric 74. terminal of the photodetector 1230. In other words, a beat voltage can be detected even when the ring resonator type semiconductor lasers 1200 and 1201 are held stationary.

Note that the two ring resonator type semiconductor lasers do not have to be arranged in proximity.

If the ring resonator type semiconductor lasers 1200 and 1201 are driven to rotate clockwise at a rate of 30° per second which roughly corresponds to the rate of vibration of a camera being shaken or that of a moving automobile, the oscillation frequency $f_3$ of the laser beam 1206 propagating counterclockwise is raised by 88.7 Hz, while, on the other hand, the oscillation frequency $f_4$ of the laser beam 1207 propagating clockwise is reduced by 88.7 Hz. Then, the beat frequency can be obtained by formula (20) below:

$$f_3-f_4=1 \text{ kHz}+177.4 \text{ Hz} \quad (20)$$

In the case where, on the other hand, the ring resonator type semiconductor lasers 1200 and 1201 are driven to rotate counterclockwise at a rate of 30° per second, the beat frequency can be obtained by formula (21) below:

$$f_3-f_4=1 \text{ kHz}-177.4 \text{ Hz} \quad (21)$$

Since the absolute value of the increase or the decrease of the beat frequency is proportional to the rotary speed, it is now possible to detect not only the rotary speed of the semiconductor laser but also the sense of rotation because the increase or the decrease in the beat frequency shows a one-to-one correspondence relative to the sense of rotation.

While the semiconductor lasers were realized by using InGaAsP type materials in the above example, they may be replaced by GaAs type, ZnSe type, InGaN type or AlGaN type materials. Additionally, the profile of the optical waveguides may be hexangular, triangular or circular instead of being rectangular as shown in FIG. 7A. The drive currents of the ring resonator type lasers 1200 and 1201 were differentiated in the above example in order to differentiate the oscillation frequencies. However, the oscillation frequencies of the two lasers can alternatively be differentiated by differentiating the optical lengths of the two lasers such as the lengths or the widths of the optical waveguides or the thicknesses, the compositions or the materials of the semiconductor layers of the lasers.

Figure 39:
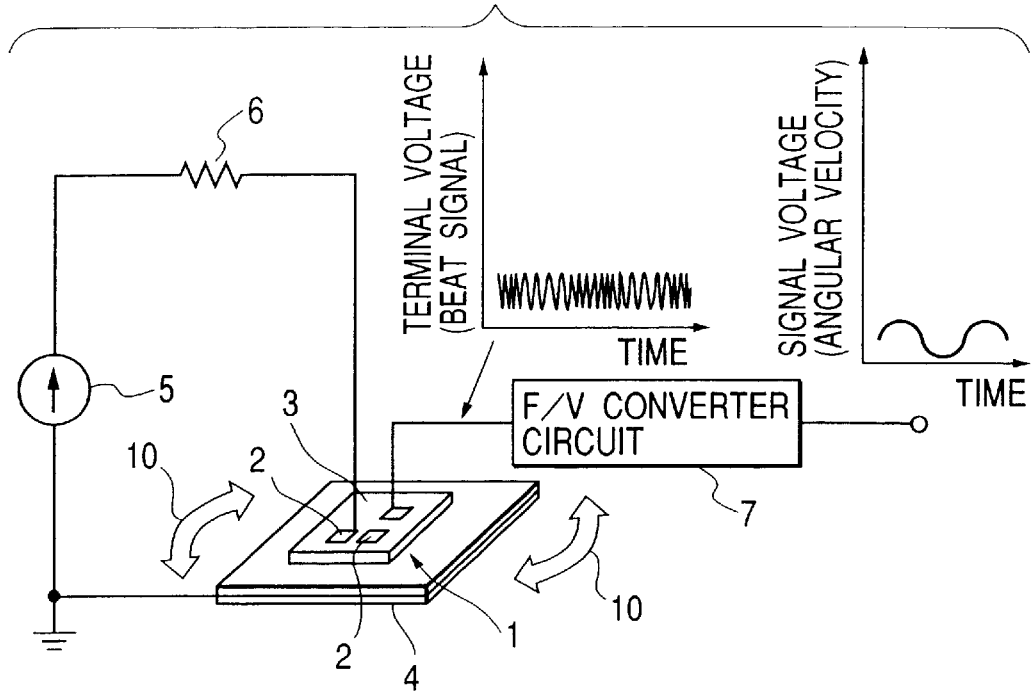
FIG. 39 is a schematic block diagram of a circuit for taking out an electric signal that can be used for the purpose of the invention.

FIG. 39 is a schematic illustration of an arrangement for detecting a beat signal by means of the above laser device. Referring to FIG. 39, there are shown an optical gyro 1, a ring resonator type laser 2, a photodetector 3, a rotary table 4, a current source 5, a resistor 6 and a frequency/voltage converter circuit (F/V converter circuit) 7.

With the above arrangement, an electric current is injected into the optical gyro 1 from the current source 5 by way of the resistor 6 that is connected in series. If the optical gyro 1 is held stationary, a beat signal representing the difference between the oscillation frequencies (oscillation wavelengths) of the two laser beams can be obtained as a change in the terminal voltage of the photodetector 3. If the optical gyro 1 that is mounted on the rotary table 4 is driven to rotate, the obtained beat signal represents the angular velocity of the rotary motion of the optical gyro.

The beat frequency can be converted into a voltage value by causing the beat signal to pass through the F/V converter circuit 7. If the voltage output of the F/V converter circuit 7 is made equal to zero when the optical gyro 1 is held stationary by regulating the offset, the sense of rotation of the optical gyro can be detected by seeing if the output of the F/V converter circuit 7 is positive or negative.

EXAMPLE 18

Referring to FIGS. 7B and 7H illustrating Example 18, reference numeral 1240 denotes a mirror and reference numeral 1209 denotes a laser beam propagating counterclockwise whereas reference numeral 1257 denotes a laser beam reflected by the mirror 1240. FIG. 7H is a schematic cross-sectional view taken along line 7H—7H in FIG. 7B. The above arrangement differs from that of Example 17 in that the tapered region 1205 of the optical waveguide of the ring resonator type laser 1201 is directed oppositely relative to that of FIG. 7A so that consequently the laser beam 1209 is propagating counterclockwise in the ring resonator type laser 1201. With this arrangement, a beat signal can be obtained as in Example 17 by causing the laser beam 1257 emitted from the ring resonator type laser 1201 to be reflected by the mirror 1240 and received by the photodetector 1230 with the laser beam 1256.

EXAMPLE 19

FIG. 7C is a schematic illustration of the nineteenth example of the invention. Referring to FIG. 7C, the laser device of this example comprises photodetector 1230 along with an optical waveguide, such as, for example, a quartz tube 1202 including a tapered region 1204 of the optical waveguide, a mirror 1214, an anode 1210 and a cathode 1212 as well as a quartz tube 1203 including a tapered region 1205 of the optical waveguide, a mirror 1215, an anode 1211 and a cathode 1213. Reference numeral 1206 denotes the laser beam propagating through the quartz tube 1202 and reference numeral 1256 denotes the laser beam emitted to the outside, whereas reference numeral 1207 denotes the laser beam propagating through the quartz tube 1203 and reference numeral 1257 denotes the laser beam emitted to the outside.

The lasers were prepared in a manner as described in Example 3.

If the quartz tubes 1202 and 1203 were held stationary, the laser beam 1206 and the laser beam 1207 would show a substantially identical oscillation frequency of $4.73 \times 10^{14}$ Hz and an identical wavelength $\lambda$ of 632.8 nm. However, since the electric current flowing through the quartz tube 1202 and the electric current flowing through the quartz tube 1203 are differentiated, the Q values of the medium are changed to slightly differentiate the oscillation frequencies of the two laser beams. The oscillation frequency $f_1$ of the laser beam 1206 is greater than the oscillation frequency $f_2$ of the laser beam 1207 by 20 MHz. When one of the mirrors of the resonators of the lasers is made to show a lower reflectivity than the other mirror, a laser beam can be taken out from the mirror having the lower reflectivity. As the laser beam 1256 and the laser beam 1257 are received simultaneously by the photodetector 1230, the laser beam 1206 and the laser beam 1207 interfere with each other in the photodetector 1230. As a result, a signal having an amplitude of 50 mV and a frequency of 20 MHz can be obtained at the electric terminal of the photodetector 1230. In other words, a beat voltage can be detected even when the quartz tubes 1202 and 1203 are held stationary.

If the quartz tubes 1202 and 1203 are driven to rotate clockwise at a rate of 180° per second and each side of the resonators is 10 cm long, the oscillation frequency $f_1$ of the laser beam 1206 propagating counterclockwise is raised by 248.3 kHz, while, on the other hand, the oscillation frequency $f_2$ of the laser beam 1207 propagating clockwise is reduced by 248.3 kHz. Then, the beat frequency can be obtained by formula (22) below:

$$f_1 - f_2 = 20 \text{ MHz} + 496.6 \text{ kHz} \tag{22}$$

In the case where, on the other hand, the quartz tubes 1202 and 1203 are driven to rotate counterclockwise at a rate of 180° per second, the beat frequency can be obtained by formula (23) below:

$$f_1 - f_2 = 20 \text{ MHz} - 496.6 \text{ kHz} \tag{23}$$

Since the absolute value of the increase or the decrease in the beat frequency is proportional to the rotary speed, it is now possible to detect not only the rotary speed of the semiconductor laser but also the sense of rotation because the increase or the decrease in the beat frequency shows a one-to-one correspondence relative to the sense of rotation.

While helium gas and neon gas were introduced into the quartz tube in this example, they may be replaced by any gas that can rise to a laser oscillation. Additionally, the profile of the optical waveguide may be hexangular, triangular or circular instead of being rectangular as shown in FIG. 7C.

EXAMPLE 20

Referring to FIG. 7D illustrating Example 20, reference numeral 1240 denotes a mirror and reference numeral 1209 denotes a laser beam propagating counterclockwise whereas reference numeral 1257 denotes a laser beam reflected by the mirror 1240.

The above arrangement differs from that of Example 19 in that the tapered region 1205 of the optical waveguide of the quartz tube is directed oppositely relative to that of FIG. 7C so that consequently the laser beam 1209 is propagating counterclockwise in the quartz tube 1203. With this arrangement, a bit signal can be obtained as in Example 19 by causing the laser beam 1257 emitted from the quartz tube 1203 to be reflected by the mirror 1240 and received by the photodetector 1230 with the laser beam 1256.

EXAMPLE 21

FIG. 7E schematically illustrates this example. In FIG. 7E, reference numerals 1218 and 1219 denote respective optical isolators.

This arrangement can be used to detect the sense of rotation on the principle described in Example 19. This example differs from Example 19 in terms of the means for selecting the mode of propagating a laser beam in a single direction in a ring laser. More specifically, while tapered optical waveguides were used in Example 19, optical isolators were used in this example.

When equally polarized beams are made to enter an optical isolator, the latter allows only the beam propagating in a given direction and blocks the other beam propagating in the opposite direction. While the beams propagating in opposite directions are equally polarized in an ordinary ring laser, the ring laser can be made to allow only the beam propagating in a given direction to exist by inserting an optical isolator. It may be needless to say that the optical isolator may be replaced with an optical circulator or some other optical device so long as the latter allows a beam to pass in only one direction.

EXAMPLE 22

Referring to FIG. 7F illustrating Example 22, the arrangement of this example differs from that of Example 21 in that the optical isolator 1219 is directed oppositely relative to that of FIG. 7E so that consequently the laser beam 1209 is propagating counterclockwise in the quartz tube 1203. With this arrangement, a bit signal can be obtained as in Example 21 by causing the laser beam 1257 emitted from the quartz tube 1203 to be reflected by the mirror 1240 and received by the photodetector 1230 with the laser beam 1256.

EXAMPLE 23

Figure 8E:
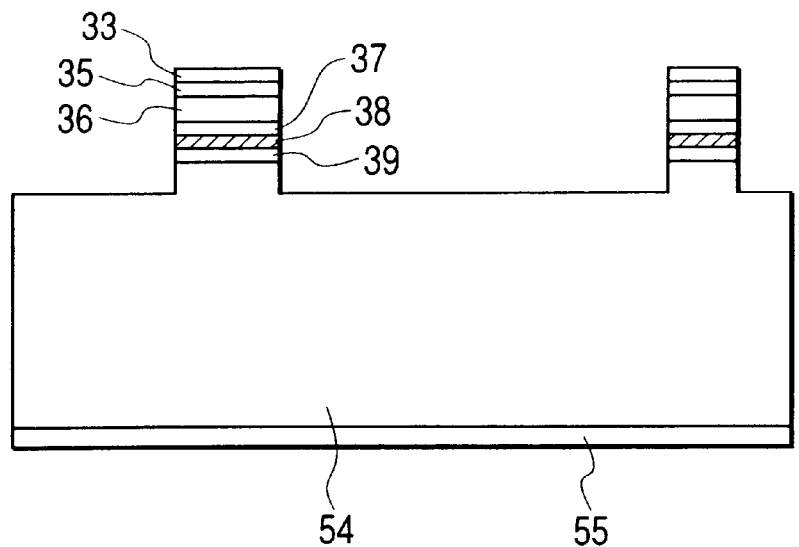
Figure 8F:
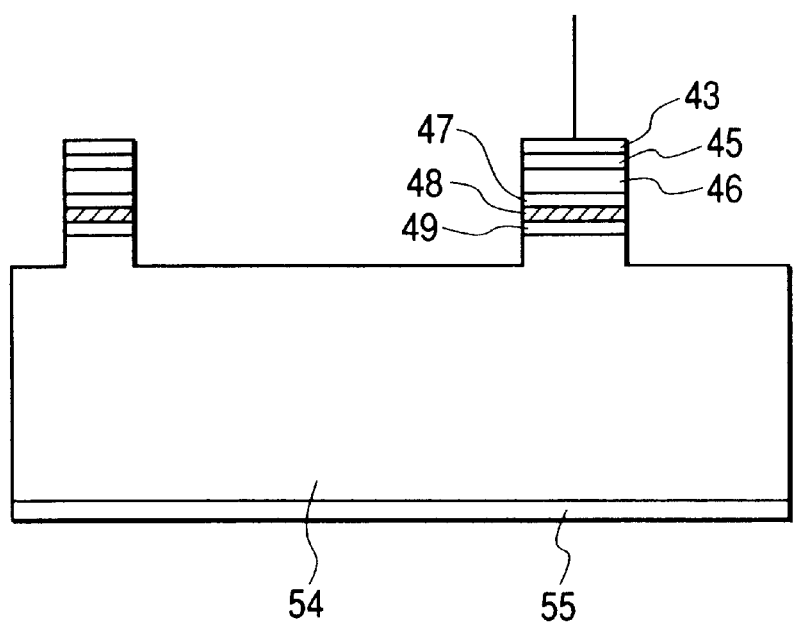

FIG. 8A is a schematic illustration of the twenty-third example of the invention, and FIGS. 8E and 8F are schematic cross-sectional views respectively taken along lines 8E—8E and 8F—8F, the laser device of this example comprises a ring resonator type semiconductor laser 1300 having a tapered region 1304 of the optical waveguide thereof, an anode 33, a cap layer 35, a cladding layer 36, an optical guiding layer 37, an active layer 38 and another optical guiding layer 39 as well as another ring resonator type semiconductor laser 1301 having a tapered region 1305 of the optical waveguide thereof, an anode 43, a cap layer 45, a cladding layer 46, an optical guiding layer 47, an active layer 48 and another optical guiding layer 49 along with a photodetector 1330, a semiconductor substrate 54, a cathode 55 and still another optical waveguide 1320. Reference numeral 1306 denotes a laser beam propagating counterclockwise and reference numeral 1356 denotes the laser beam emitted from the ring resonator type semiconductor laser 1300, whereas reference numeral 1307 denotes a laser beam propagating clockwise and reference numeral 1357 denotes the laser beam emitted from the ring resonator type semiconductor laser 1301.

The semiconductor lasers 1300 and 1301 were prepared as in Example 5.

The oscillation threshold current value was 2 mA at room temperature, whereas the drive current of the ring resonator type laser 1300 was 3 mA and the drive current of the ring resonator type laser 1301 was 3.5 mA. Thus, when the lasers are held stationary, the laser beam 1306 and the laser beam 1307 would show the same oscillation wavelength λ, which is equal to 1.55 μm. However, since the drive current of the ring resonator type laser 1300 and that of the ring resonator type laser 1301 are different from each other, their optical waveguides show respective effective refractive indexes that are different from each other. As a result, the oscillation frequency $f_3$ of the laser beam 1306 is greater than the oscillation frequency $f_4$ of the laser beam 1307 by 1 kHz.

When a total reflection occurs, there is generated evanescent light creeping along the interface. If the oscillation wavelength is 1.55 μm the penetrating depth of evanescent light is 0.0735 μm. The intensity of evanescent light attenuates exponentially (the penetrating depth being the distance at which the electric field amplitude attenuates to 1/e). The ring resonator type laser 1300 and the optical waveguide 1320 are separated by 0.07 μm which is smaller than the penetrating depth so that the laser beam 1306 is coupled to the optical waveguide 1320 efficiently. Similarly, the ring resonator type laser 1303 and the optical waveguide 1320 are separated by 0.07 μm which is smaller than the penetrating depth so that the laser beam 1307 is coupled with the optical waveguide 1320 efficiently. Thus, the laser beam 1356 and the laser beam 1357 emitted from the optical waveguide 1320 interfere with each other as they are received by the photodetector 1330 simultaneously. As a result, a signal having an amplitude of 50 mV and a frequency of 1 kHz can be obtained at the electric terminal of the photodetector 1330. In other words, a beat voltage can be detected even when the ring resonator type semiconductor lasers 1300 and 1301 are held stationary.

If the ring resonator type semiconductor lasers 1300 and 1301 are driven to rotate clockwise at a rate of 30° per second which roughly corresponds to the rate of vibration of a camera being shaken or that of a moving automobile, the oscillation frequency $f_3$ of the laser beam 1306 propagating counterclockwise is raised by 88.7 Hz, while, on the other hand, the oscillation frequency $f_4$ of the laser beam 1307 propagating clockwise is reduced by 88.7 Hz. Then, the beat frequency can be obtained by formula (20).

In the case where, on the other hand, the ring resonator type semiconductor lasers 1300 and 1301 are driven to rotate counterclockwise at a rate of 30° per second, the beat frequency can be obtained by formula (21).

Since the absolute value of the increase or the decrease in the beat frequency is proportional to the rotary speed, it is now possible to detect not only the rotary speed of the semiconductor laser but also the sense of rotation because the increase or the decrease in the beat frequency shows a one-to-one correspondence relative to the sense of rotation.

The drive currents of the ring resonator type lasers 1300 and 1301 were differentiated in the above example in order to differentiate the oscillation frequencies. However, the oscillation frequencies of the two lasers can alternatively be changed by altering the optical lengths of the two lasers such as the lengths or the widths of the optical waveguides, or the thicknesses, the compositions or the materials of the semiconductor layers of the lasers.

Figure 40:
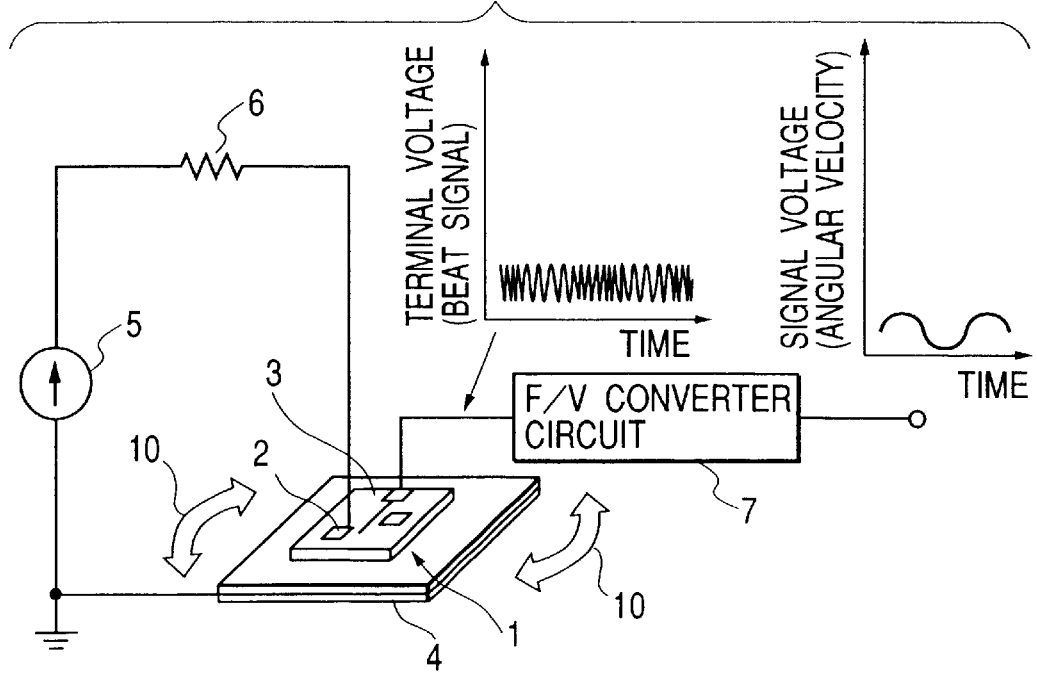
FIG. 40 is a schematic block diagram of a circuit for taking out an electric signal that can be used for the purpose of the invention.

FIG. 40 is a schematic illustration of an arrangement for detecting a beat signal by means of the above laser device. Referring to FIG. 40, there are shown an optical gyro 1, a ring resonator type laser 2, a photodetector 3, a rotary table 4, a current source 5, a resistor 6 and a frequency/voltage converter circuit (F/V converter circuit) 7.

With the above arrangement, an electric current is injected into the optical gyro 1 from the current source 5 by way of the resistor 6 that is connected in series. If the optical gyro 1 is held stationary, a beat signal representing the difference between the oscillation frequencies (oscillation wavelengths) of the two laser beams can be obtained as a change in the terminal voltage of the photodetector 3. If the optical gyro 1 that is mounted on the rotary table 4 is driven to rotate, the obtained beat signal represents the angular velocity of the rotary motion of the optical gyro.

The beat frequency can be converted into a voltage value by causing the beat signal to pass through the F/V converter circuit 7. If the voltage output of the F/V converter circuit 7 is made equal to zero when the optical gyro 1 is held stationary by regulating the offset, the sense of rotation of the optical gyro can be detected by seeing if the output of the F/V converter circuit 7 is positive or negative.

EXAMPLE 24

Referring to FIG. 8B illustrating Example 24, reference numeral 1302 denotes an optical waveguide having a tapered region 1304, whereas reference numeral 1303 denotes another optical waveguide having a tapered region 1305. In FIG. 8B, reference numerals 1306, 1356, 1309 and 1357 denote respective laser beams.

With the above arrangement, both of the laser beams 1306 and 1309 propagate circuitally in the same direction. While the sense of rotation can be detected in a manner as described earlier, it is advantageous for improving the efficiency of coupling the laser beams 1306 and 1309 that the optical waveguides 1302, 1303 and 1320 are arranged in a manner as illustrated in FIG. 8B.

EXAMPLE 25

FIG. 8C illustrates the twenty-fifth example of the invention. Referring to FIG. 8C, the laser device of this example comprises a photodetector 1330 and an optical waveguide such as, for example, a quartz tube 1302 including a tapered region 1304 of the optical waveguide, a mirror 1314, an anode 1310 and a cathode 1312 as well as a quartz tube 1303 including a tapered region 1305 of the optical waveguide, a mirror 1315, an anode 1311 and a cathode 1313. Reference numeral 1306 denotes the laser beam propagating through the quartz tube 1302 and reference numeral 1356 denotes the laser beam emitted outside the quartz tube 1302 whereas reference numeral 1307 denotes the laser beam propagating through the quartz tube 1303 and reference numeral 1357 denotes the laser beam emitted outside the quartz tube 1303.

The lasers were prepared in a manner as described in Example 7.

If the quartz tubes 1302 and 1303 were held stationary, the laser beam 1306 and the laser beam 1307 would show an identical oscillation frequency of $4.73 \times 10^{14}$ Hz and an identical wavelength $\lambda$ of 632.8 nm. However, since the electric current flowing through the quartz tube 1302 and the electric current flowing through the quartz tube 1303 are differentiated, the Q values of the medium are changed to slightly differentiate the oscillation frequencies of the two laser beams. The oscillation frequency $f_1$ of the laser beam 1306 is greater than the oscillation frequency $f_2$ of the laser beam 1307 by 20 MHz.

Additionally, since the quartz tube 1302 and optical waveguide 1320 are arranged in proximity, the laser beams 1306 and 1307 are coupled to an optical waveguide 1320. Thus, the laser beam 1356 and the laser beam 1357 emitted to the outside from the optical waveguide 1320 interfere with each other as they are received by the photodetector 1330 simultaneously. As a result, a signal having an amplitude of 50 mV and a frequency of 20 MHz can be obtained at the electric terminal of the photodetector 1330. In other words, a beat voltage can be detected even when the quartz tubes 1302 and 1303 are held stationary.

If the quartz tubes 1302 and 1303 are driven to rotate clockwise at a rate of 180° per second and each side of the resonators is 10 cm long, the oscillation frequency $f_1$ of the laser beam 1306 propagating counterclockwise is raised by 248.3 kHz, while, on the other hand, the oscillation frequency $f_2$ of the laser beam 1307 propagating clockwise is reduced by 248.3 kHz. Then, the beat frequency can be obtained by formula (22).

In the case where, on the other hand, the quartz tubes 1302 and 1303 are driven to rotate counterclockwise at a rate of 180° per second, the beat frequency can be obtained by formula (23).

Since the absolute value of the increase or the decrease in the beat frequency is proportional to the rotary speed, it is now possible to detect not only the rotary speed of the semiconductor laser but also the sense of rotation because the increase or the decrease in the beat frequency shows a one-to-one correspondence relative to the sense of rotation.

EXAMPLE 26

FIG. 8D schematically illustrates this example. In FIG. 8D, reference numerals 1318 and 1319 denote respective optical isolators.

This arrangement can be used to detect the sense of rotation on the principle as described in Example 25. This example differs from Example 25 in terms of the means for selecting the mode of propagating a laser beam in a single direction in a ring laser. More specifically, while tapered optical waveguides were used in Example 25, optical isolators were used in this example.

When equally polarized beams are made to enter an optical isolator, the latter allows only the beam propagating in a given direction and blocks the other beam propagating in the opposite direction. While the beams propagating in opposite direction are equally polarized in an ordinary ring laser, the ring laser can be made to allow only the beam propagating in a given direction to exist by inserting an optical isolator. It may be needless to say that the optical isolator may be replaced with an optical circulator or some other optical device so long as the latter allows a beam to pass in only one direction.

EXAMPLE 27

Figure 9E:
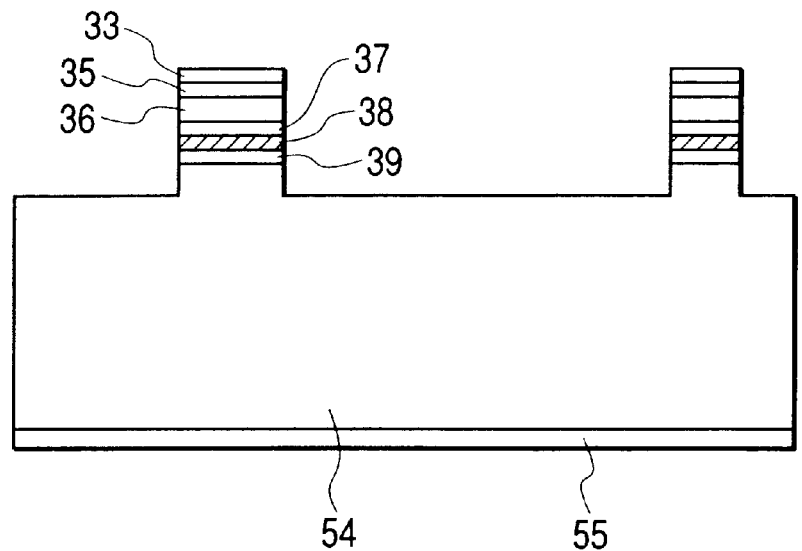
Figure 9F:
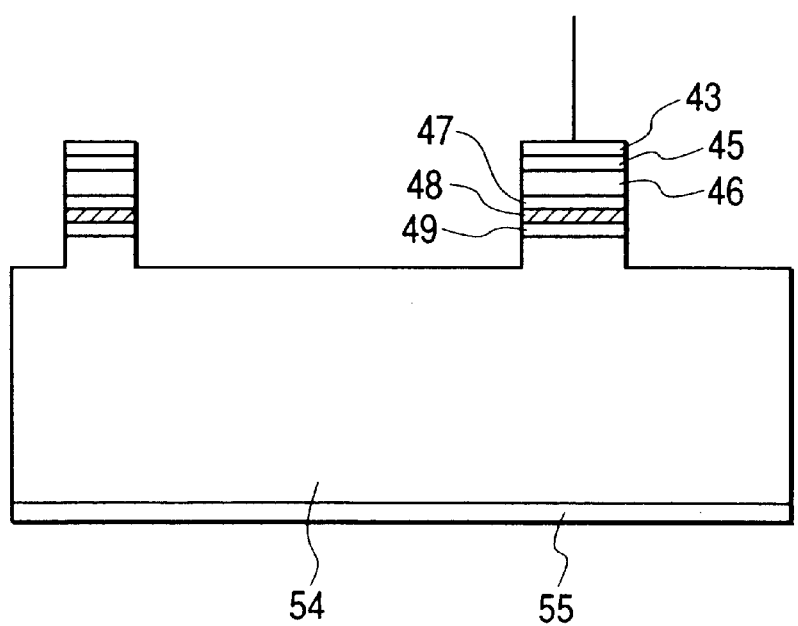

FIG. 9A is a schematic illustration of the twenty-seventh example of the invention, most clearly showing its characteristic aspects and FIGS. 9E and 9F are schematic cross-sectional views respectively taken along lines 9E—9E and 9F—9F in FIG. 9A. Referring to FIGS. 9A, 9E and 9F, the laser device of this example comprises a ring resonator type semiconductor laser 1400 having a tapered region 1404 of the optical waveguide thereof, an anode 33, a cap layer 35, a cladding layer 36, an optical guiding layer 37, an active layer 38 and another optical guiding layer 39 as well as another ring resonator type semiconductor laser 1401 having a tapered region 1405 of the optical waveguide thereof, an anode 43, a cap layer 45, a cladding layer 46, an optical guiding layer 47, an active layer 48 and another optical guiding layer 49 along with a photodetector 1430, a semiconductor substrate 54, a cathode 55 and still another optical waveguide 1420. Reference numeral 1406 denotes a laser beam propagating counterclockwise and reference numeral 1456 denotes the laser beam emitted from the ring resonator type semiconductor laser 1400, whereas reference numeral 1407 denotes a laser beam propagating clockwise and reference numeral 1457 denotes the laser beam emitted from the ring resonator type semiconductor laser 1403.

The semiconductor lasers 1400 and 1401 were prepared as in Example 9.

The oscillation threshold current value was 2 mA at room temperature, whereas the drive current of the ring resonator type laser 1400 was 3 mA and the drive current of the ring resonator type laser 1401 was 3.5 mA. Thus, when the lasers are held stationary, the laser beam 1406 and the laser beam 1407 would show the same oscillation wavelength λ, which is equal to 1.55 μm. However, since the drive current of the ring resonator type laser 1400 and that of the ring resonator type laser 1401 are different from each other, their optical waveguides show respective effective refractive indexes that are different slightly from each other. As a result, the oscillation frequency $f_3$ of the laser beam 1406 is greater than the oscillation frequency $f_4$ of the laser beam 1407 by 1 kHz. Since the ring resonator type laser 1400 and the ring resonator type laser 1401 are connected by the optical waveguide 1420, the laser beam 1406 and the laser beam 1407 are coupled to each other efficiently. Then, the laser beam 1456 and the laser beam 1457 emitted from the optical waveguide 1420 interfere with each other as they are received by the photodetector 1430 simultaneously. As a result, a signal having an amplitude of 50 mV and a frequency of 1 kHz can be obtained at the electric terminal of the photodetector 1430. In other words, a beat voltage can be detected even when the ring resonator type semiconductor lasers 1402 and 1403 are held stationary.

If the ring resonator type semiconductor lasers 1400 and 1401 are driven to rotate clockwise at a rate of 30° per second which roughly corresponds to the rate of vibration of a camera being shaken or that of a moving automobile, the oscillation frequency $f_3$ of the laser beam 1406 propagating counterclockwise is raised by 88.7 Hz, while, on the other hand, the oscillation frequency $f_4$ of the laser beam 1407 propagating clockwise is reduced by 88.7 Hz. Then, the beat frequency can be obtained by formula (20).

In the case where, on the other hand, the ring resonator type semiconductor lasers 1400 and 1401 are driven to rotate counterclockwise at a rate of 30° per second, the beat frequency can be obtained by formula (21).

Since the absolute value of the increase or the decrease of the beat frequency is proportional to the rotary speed, it is now possible to detect not only the rotary speed of the semiconductor laser but also the sense of rotation because the increase or the decrease in the beat frequency shows a one-to-one correspondence relative to the sense of rotation.

The drive currents of the ring resonator type lasers 1400 and 1401 were differentiated in the above example in order to differentiate the oscillation frequencies. However, the oscillation frequencies of the two lasers can alternatively be changed by altering the optical lengths of the two lasers such as the lengths or the widths of the optical waveguides, or the thicknesses, the compositions or the materials of the semiconductor layers of the lasers.

Figure 41:
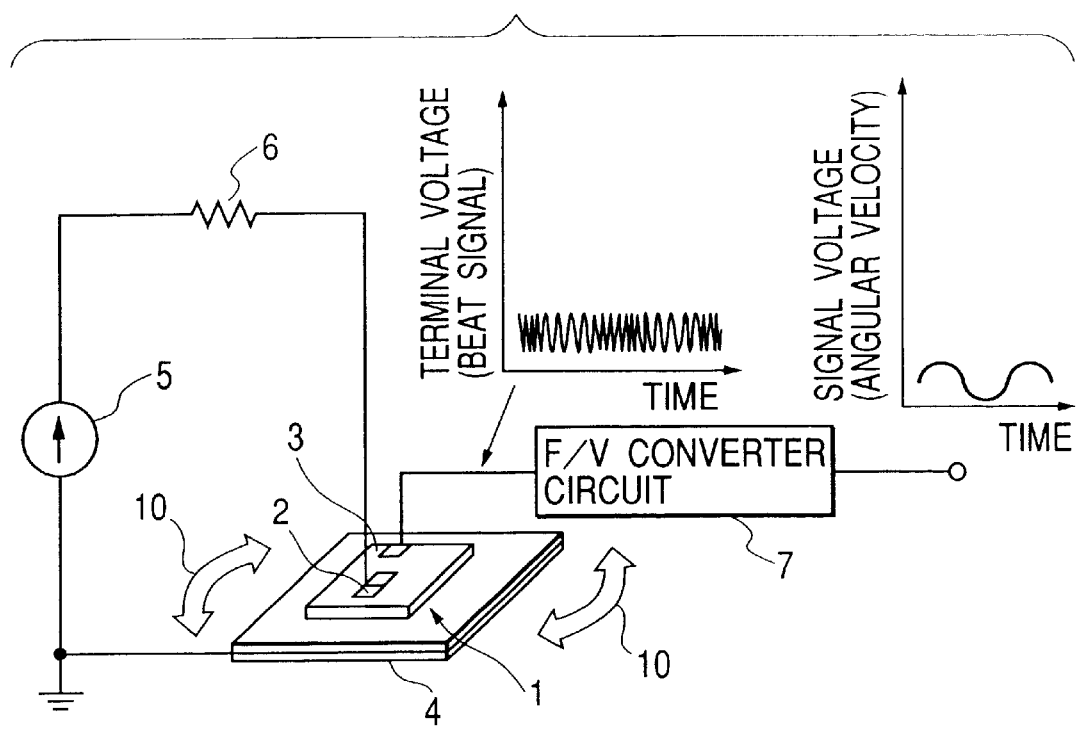
FIG. 41 is a schematic block diagram of a circuit for taking out an electric signal that can be used for the purpose of the invention.

FIG. 41 is a schematic illustration of an arrangement for detecting a beat signal by means of the above laser device. Referring to FIG. 41, there are shown an optical gyro 1, a ring resonator type laser 2, a photodetector 3, a rotary table 4, a current source 5, a resistor 6 and a frequency/voltage converter circuit (F/V converter circuit) 7.

With the above arrangement, an electric current is injected into the optical gyro 1 from the current source 5 by way of the resistor 6 that is connected in series. If the optical gyro 1 is held stationary, a beat signal representing the difference between the oscillation frequencies (oscillation wavelengths) of the two laser beams can be obtained as a change in the terminal voltage of the photodetector 3. If the optical gyro 1 that is mounted on the rotary table 4 is driven to rotate, the obtained beat signal represents the angular velocity of the rotary motion of the optical gyro.

The beat frequency can be converted into a voltage value by causing the beat signal to pass through the F/V converter circuit 7. If the voltage output of the F/V converter circuit 7 is made equal to zero when the optical gyro 1 is held stationary by regulating the offset, the sense of rotation of the optical gyro can be detected by seeing if the output of the F/V converter circuit 7 is positive or negative.

EXAMPLE 28

Referring to FIG. 9B illustrating Example 28, reference numeral 1402 denotes an optical waveguide having a tapered region 1404, whereas reference numeral 1403 denotes another optical waveguide having a tapered region 1405 and reference numeral 1420 denotes still another optical waveguide. In FIG. 9B, reference numerals 1406, 1456, 1409 and 1457 denote respective laser beams.

With the above arrangements, both of laser beams 1406 and 1409 propagate circuitally in the same direction. While the sense of rotation can be detected in a manner as described earlier, it is advantageous for improving the efficiency of coupling the laser beams 1406 and 1409 that the optical waveguides 1402, 1403 and 1420 are arranged in a manner as illustrated in FIG. 9B.

EXAMPLE 29

FIG. 9C illustrates the twenty-ninth example of the invention. Referring to FIG. 9C, the laser device of this example comprises a photodetector 1430 and an optical waveguide, such as, for example, a quartz tube 1402 including a tapered region 1404 of the optical waveguide, a mirror 1414, an anode 1413 and a cathode 1415 as well as a quartz tube 1403 including a tapered region 1405 of the optical waveguide, a mirror 1415, an anode 1423 and a cathode 1425 along with an optical waveguide 1420. Reference numeral 1406 denotes the laser beam propagating through the quartz tube 1402 and reference numeral 1456 denotes the laser beam emitted outside the quartz tube 1402 whereas reference numeral 1407 denotes the laser beam propagating through the quartz tube 1403 and reference numeral 1457 denotes the laser beam emitted outside the quartz tube 1403.

The lasers were prepared in a manner as described in Example 11.

If the quartz tubes 1402 and 1403 were held stationary, the laser beam 1406 and the laser beam 1407 would show an identical oscillation frequency of $4.73 \times 10^{14}$ Hz and an identical wavelength λ of 632.8 nm. However, since the electric current flowing through the quartz tube 1402 and the electric current flowing through the quartz tube 1403 are differentiated, the Q values of the medium are changed to slightly differentiate the oscillation frequencies of the two laser beams. The oscillation frequency $f_1$ of the laser beam 1406 is greater than the oscillation frequency $f_2$ of the laser beam 1407 by 20 MHz. Additionally, since the quartz tubes 1402 and 1403 are connected to the optical waveguide 1420, the laser beams 1406 and 1407 are coupled to optical waveguide 1420. Then, the laser beam 1457 emitted to the outside from the optical waveguide 1420 interfere with each other as they are received by the photodetector 1430 simultaneously. As a result, a signal having an amplitude of 50 mV and a frequency of 1 kHz can be obtained at the electric terminal of the photodetector 1430. In other words, a beat voltage can be detected even when the quartz tubes 1402 and 1403 are held stationary.

If the quartz tubes 1402 and 1403 are driven to rotate clockwise at a rate of 180° per second and each side of the resonators is 10 cm long, the oscillation frequency $f_1$ of the laser beam 1406 propagating counterclockwise is raised by 248.3 kHz, while, on the other hand, the oscillation frequency $f_2$ of the laser beam 1407 propagating clockwise is reduced by 248.3 kHz. Then, the beat frequency can be obtained by formula (22).

In the case where, on the other hand, the quartz tubes 1402 and 1403 are driven to rotate counterclockwise at a rate of 180° per second, the beat frequency can be obtained by formula (23).

Since the absolute value of the increase or the decrease of the beat frequency is proportional to the rotary speed, it is now possible to detect not only the rotary speed of the semiconductor laser but also the sense of rotation because the increase or the decrease in the beat frequency shows a one-to-one correspondence relative to the sense of rotation.

EXAMPLE 30

FIG. 9D schematically illustrates this example. In FIG. 9D, reference numerals 1418 and 1419 denote respective optical isolators.

This arrangement can be used to detect the sense of rotation on the principle as described in Example 29. This example differs from Example 29 in terms of the means for selecting the mode of propagating a laser beam in a single direction in a ring laser. More specifically, while tapered optical waveguides were used in Example 29, optical isolators were used in this example.

When equally polarized beams are made to enter an optical isolator, the latter allows only the beam propagating in a given direction and blocks the other beam propagating in the opposite direction. While the beams propagating in opposite directions are equally polarized in an ordinary ring laser, the ring laser can be made to allow only the beam propagating in a given direction to exist by inserting an optical isolator. It may be needless to say that the optical isolator may be replaced with an optical circulator or some other optical device so long as the latter allows a beam to pass in only one direction.

EXAMPLE 31

Figure 10E:
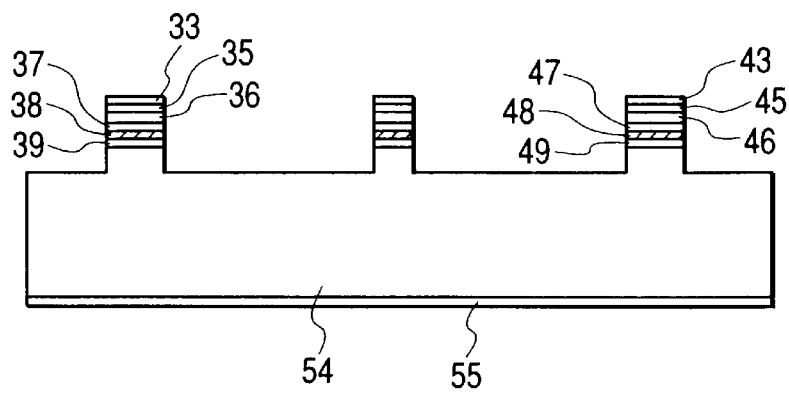

FIG. 10A is a schematic illustration of the thirty-first example of the invention, and FIG. 10E is a schematic cross-sectional view taken along line 10E—10E in FIG. 10A. Referring to FIGS. 10A and 10E, the laser device of this example comprises a ring resonator type semiconductor laser 1500 having a tapered region 1504 of the optical waveguide thereof, an anode 33, a cap layer 35, a cladding layer 36, an optical guiding layer 37, an active layer 38 and another optical guiding layer 39 as well as another ring resonator type semiconductor laser 1501 having a tapered region 1505 of the optical waveguide thereof, an anode 43, a cap layer 45, a cladding layer 46, an optical guiding layer 47, an active layer 48 and another optical guiding layer 49 along with a photodetector 1530, a semiconductor substrate 54 and a cathode 55. Reference numeral 1506 denotes a laser beam propagating counterclockwise and reference numeral 1556 denotes the laser beam emitted from the ring resonator type semiconductor laser 1500, whereas reference numeral 1507 denotes a laser beam propagating clockwise and reference numeral 1557 denotes the laser beam emitted from the ring resonator type semiconductor laser 1501.

The semiconductor lasers were prepared as in Example 13.

The oscillation threshold current value was 2 mA at room temperature, whereas the drive current of the ring resonator type laser 1500 was 3 mA and the drive current of the ring resonator type laser 1501 was 3.5 mA. Thus, when the lasers are held stationary, the laser beam 1506 and the laser beam 1507 would show the same oscillation wavelength λ, which is equal to 1.55 μm. However, since the drive current of the ring resonator type laser 1500 and that of the ring resonator type laser 1501 are different from each other, their optical waveguides show respective effective refractive indexes that are different from each other. As a result, the oscillation frequency $f_3$ of the laser beam 1506 is greater than the oscillation frequency $f_4$ of the laser beam 1507 by 1 kHz. Since the ring resonator type laser 1500 and the ring resonator type laser 1501 share part of their optical waveguides, the laser beam 1506 and the laser beam 1507 are coupled to each other efficiently. Then, the laser beam 1556 and the laser beam 1557 emitted from the shared optical waveguides interfere with each other as they are received by the photodetector 1530 simultaneously. As a result, a signal having an amplitude of 50 mV and a frequency of 1 kHz can be obtained at the electric terminal of the photodetector 1530. In other words, a beat voltage can be detected even when the ring resonator type semiconductor lasers 1500 and 1501 are held stationary.

Note that the two ring resonator type semiconductor lasers do not have to be arranged in proximity.

If the ring resonator type semiconductor lasers 1500 and 1501 are driven to rotate clockwise at a rate of 30° per second which roughly corresponds to the rate of vibration of a camera being shaken or that of a moving automobile, the oscillation frequency $f_3$ of the laser beam 1506 propagating counterclockwise is raised by 88.7 Hz, while, on the other hand, the oscillation frequency $f_4$ of the laser beam 1507 propagating clockwise is reduced by 88.7 Hz. Then, the beat frequency can be obtained by formula (20).

In the case where, on the other hand, the ring resonator type semiconductor lasers 1500 and 1501 are driven to rotate counterclockwise at a rate of 30° per second, the beat frequency can be obtained by formula (21).

Since the absolute value of the increase or the decrease of the beat frequency is proportional to the rotary speed, it is now possible to detect not only the rotary speed of the semiconductor laser but also the sense of rotation because the increase or the decrease in the beat frequency shows a one-to-one correspondence relative to the sense of rotation.

The drive currents of the ring resonator type lasers 1500 and 1501 were differentiated in the above example in order to differentiate the oscillation frequencies. However, the oscillation frequencies of the two lasers can alternatively be changed by altering the optical lengths of the two lasers such as the lengths or the widths of the optical waveguides, or the thicknesses, the compositions or the materials of the semiconductor layers of the lasers.

Figure 42:
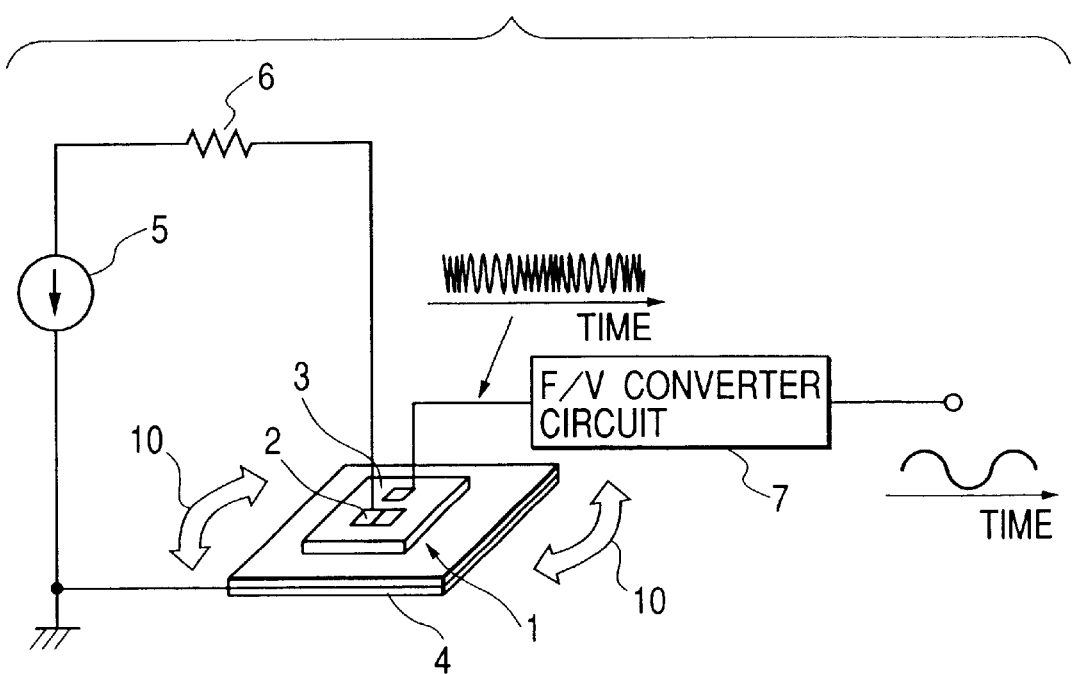
FIG. 42 is a schematic block diagram of a circuit for taking out an electric signal that can be used for the purpose of the invention.
Figure 43:
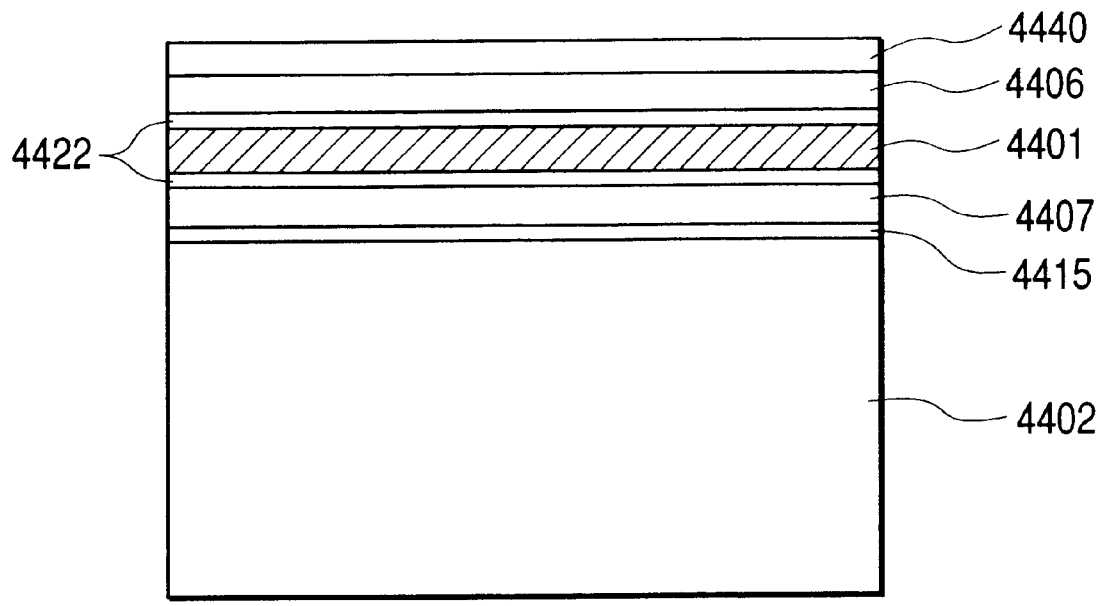
FIG. 43 is a schematic cross-sectional view of an example as described hereinafter for the purpose of the invention.

FIG. 42 is a schematic illustration of an arrangement for detecting a beat signal by means of the above laser device. Referring to FIG. 42, there are shown an optical gyro 1, a ring resonator type laser 2, a photodetector 3, a rotary table 4, a current source 5, a resistor 6 and a frequency/voltage converter circuit (F/V converter circuit) 7.

With the above arrangement, an electric current is injected into the ring laser 2 of the optical gyro 1 from the current source 5 by way of the resistor 6 that is connected in series. If the optical gyro 1 is held stationary, a beat signal representing the difference between the oscillation frequencies (oscillation wavelengths) of the two laser beams can be obtained as a change in the terminal voltage of the photodetector 3. If the optical gyro 1 that is mounted on the rotary table 4 is driven to rotate, the obtained beat signal represents the angular velocity of the rotary motion of the optical gyro.

The beat frequency can be converted into a voltage value by causing the beat signal to pass through the F/V converter circuit 7. If the voltage output of the F/V converter circuit 7 is made equal to zero when the optical gyro 1 is held stationary by regulating the offset, the sense of rotation of the optical gyro can be detected by seeing if the output of the F/V converter circuit 7 is positive or negative.

EXAMPLE 32

Referring to FIG. 10B illustrating Example 32, reference numeral 1502 denotes an optical waveguide having a tapered region 1504, whereas reference numeral 1503 denotes another optical waveguide having a tapered region 1505 and reference numeral 1520 denotes still another optical waveguide. In FIG. 9B, reference numerals 1506, 1556, 1509 and 1557 denote respective laser beams.

With the above arrangement, both of laser beams 1506 and 1509 propagate circuitally in the same direction. Thus, the sense of rotation can be detected.

EXAMPLE 33

FIG. 10C illustrates the thirty-third example of the invention. Referring to FIG. 10C, the laser device of this example comprises a photodetector 1530 and an optical waveguide, such as, for example, a quartz tube 1502 including a tapered region 1504 of the optical waveguide, a mirror 1514, an anode 1510 and a cathode 1512 as well as a quartz tube 1503 including a tapered region 1505 of the optical waveguide, a mirror 1515, an anode 1511 and a cathode 1513. Reference numeral 1506 denotes the laser beam propagating through the quartz tube 1502 and reference numeral 1556 denotes the laser beam emitted outside the quartz tube 1502 whereas reference numeral 1508 denotes the laser beam propagating through the quartz tube 1503 and reference numeral 1557 denotes the laser beam emitted outside the quartz tube 1503.

The ring resonator lasers were prepared in a manner as described in Example 15.

If the quartz tubes 1502 and 1503 were held stationary, the laser beam 1506 and the laser beam 1508 would show a substantially identical oscillation frequency of $4.73 \times 11^{14}$ Hz and an identical wavelength $\lambda$ of 632.8 nm. However, since the electric current flowing through the quartz tube 1502 and the electric current flowing through the quartz tube 1503 are slightly differentiated, the Q values of the medium are changed to slightly differentiate the oscillation frequencies of the two laser beams. The oscillation frequency $f_1$ of the laser beam 1506 is greater than the oscillation frequency $f_2$ of the laser beam 1508 by 20 MHz. Additionally, since the quartz tubes 1502 and 1503 share part of their optical waveguides, the laser beams 1556 and 1557 emitted to the outside from the partly shared optical waveguides interfere with each other as they are received by the photodetector 1530 simultaneously. As a result, a signal having an amplitude of 50 mV and a frequency of 1 kHz can be obtained at the electric terminal of the photodetector 1530. In other words, a beat voltage can be detected even when the quartz tubes 1502 and 1503 are held stationary.

If the quartz tubes 1502 and 1503 are driven to rotate clockwise at a rate of 180° per second and each side of the resonators is 10 cm long, the oscillation frequency $f_1$ of the laser beam 1506 propagating counterclockwise is raised by 248.3 kHz, while, on the other hand, the oscillation frequency $f_2$ of the laser beam 1508 propagating clockwise is reduced by 248.3 kHz. Then, the beat frequency can be obtained by formula (22).

In the case where, on the other hand, the quartz tubes 1502 and 1503 are driven to rotate counterclockwise at a rate of 180° per second, the beat frequency can be obtained by formula (23).

Since the absolute value of the increase or the decrease of the beat frequency is proportional to the rotary speed, it is now possible to detect not only the rotary speed of the semiconductor laser but also the sense of rotation because the increase or the decrease in the beat frequency shows a one-to-one correspondence relative to the sense of rotation.

EXAMPLE 34

FIG. 10D schematically illustrates this example. In FIG. 10D, reference numerals 1518 and 1519 denote respective optical isolators.

This arrangement can be used to detect the sense of rotation on the principle as described in Example 33. This example differs from Example 33 in terms of the means for selecting the mode of propagating a laser beam in a single direction in a ring laser. More specifically, while tapered optical waveguides were used in Example 33, optical isolators were used in this example.

When equally polarized beams are made to enter an optical isolator, the latter allows only the beam propagating in a given direction and blocks the other beam propagating in the opposite direction. While the beams propagating in opposite directions are equally polarized in an ordinary ring laser, the ring laser can be made to allow only the beam propagating in a given direction to exist by inserting an optical isolator. It may be needless to the electric terminal of the photodetector 1530. In other words, a beat voltage can be detected even when the quartz tubes 1502 and 1503 are held stationary.

If the quartz tubes 1502 and 1503 are driven to rotate clockwise at a rate of 180° per second and each side of the resonators is 10 cm long, the oscillation frequency $f_1$ of the laser beam 1506 propagating counterclockwise is raised by 248.3 kHz, while, on the other hand, the oscillation frequency $f_2$ of the laser beam 1508 propagating clockwise is reduced by 248.3 kHz. Then, the beat frequency can be obtained by formula (22).

In the case where, on the other hand, the quartz tubes 1502 and 1503 are driven to rotate counterclockwise at a rate of 180° per second, the beat frequency can be obtained by formula (23).

Since the absolute value of the increase or the decrease of the beat frequency is proportional to the rotary speed, it is now possible to detect not only the rotary speed of the semiconductor laser but also the sense of rotation because the increase or the decrease in the beat frequency shows a one-to-one correspondence relative to the sense of rotation.

EXAMPLE 34

FIG. 10D schematically illustrates this example. In FIG. 10D, reference numerals 1518 and 1519 denote respective optical isolators.

This arrangement can be used to detect the sense of rotation on the principle as described in Example 33. This example differs from Example 33 in terms of the means for selecting the mode of propagating a laser beam in a single direction in a ring laser. More specifically, while tapered optical waveguides were used in Example 33, optical isolators were used in this example.

When equally polarized beams are made to enter an optical isolator, the latter allows only the beam propagating in a given direction and blocks the other beam propagating in the opposite direction. While the beams propagating in opposite directions are equally polarized in an ordinary ring laser, the ring laser can be made to allow only the beam propagating in a given direction to exist by inserting an optical isolator. It may be needless to say that the optical isolator may be replaced with an optical circulator or some other optical device so long as the latter allows a beam to pass in only one direction.

As described above, while helium gas and neon gas were introduced into the quartz tube in this example, they may be replaced by any gas that can give rise to a laser oscillation and hence the angular velocity of the quartz tube can be detected. For example, an argon ion laser, a carbon dioxide gas laser and an excimer laser may alternatively be used for the purpose of the invention.

While the use of a quartz tube is described above for preparing a gas laser, the quartz tube may be relaced by a polymer tube. The use of a polymer tube provides an advantage of using a low temperature manufacturing process. Polymer materials that can be used for the purpose of the invention include polyimide fluoride, polysiloxane, PMMA (polymethylmethacrylate), epoxy and polycarbonate.

Materials that can be used for the discharge electrode for the purpose of the invention include aluminum, zirconium and tungsten.

As described above in detail, according to the invention, it is now possible to detect not only the angular velocity but also the sense of rotation of an object by detecting the beat frequency of a laser device and determining the increase or the decrease thereof from the time when the object is not rotating.

What is claimed is:

1. A gyro comprising:
a first laser for generating a first laser beam having an oscillation frequency and propagating in a single direction as a main mode of operation; and
a second laser for generating a second laser beam having an oscillation frequency different from the first laser beam and propagating in a single direction as a main mode of operation,
wherein the laser beams coexist in at least one of said first laser and said second laser and interfere with each other, the interference changing the impedance of the laser in which the laser beams coexist so as to affect an electrical signal flowing therethrough, and wherein the electrical signal is detected from at least one of the first laser and the second laser.

2. A gyro according to claim 1, wherein said first laser has a first optical waveguide and said second laser has a second optical waveguide, at least a part of said first optical waveguide and at least a part of said second optical waveguide being arranged in proximity.

3. A gyro according to claim 1, wherein said first laser has a first optical waveguide and said second laser has a second optical waveguide, a third optical waveguide being provided and optically coupled to at least a part of said first and second optical waveguides.

4. A gyro according to claim 1, wherein said first laser has a first optical waveguide and said second laser has a second optical waveguide, said gyro further comprising a third optical waveguide connected to at least a part of said first and second optical waveguides.

5. A gyro according to claim 1, wherein said first laser has a first optical waveguide and said second laser has a second optical waveguide, said first optical waveguide and said second optical waveguide being at least partly shared.

6. A gyro according to claim 1, wherein said first laser beam and said second laser beam show an oscillation frequency difference of 100 Hz or more.

7. A gyro according to claim 1, wherein said first laser beam and said second laser beam show an oscillation frequency difference of 1 kHz or more.

8. A gyro according to claim 1, wherein said first laser beam and said second laser beam show an oscillation frequency difference of 10 kHz or more.

9. A gyro according to any of claims 1 through 5, wherein said first laser beam and said second laser beam propagate in opposite directions.

10. A gyro according to any of claims 1 through 5, wherein said first laser beam and said second laser beam propagate in the same direction.

11. A gyro according to any of claims 1 through 5, wherein electric currents are respectively injected into said first laser and said second laser with different intensities.

12. A gyro according to any of claims 1 through 5, wherein voltages are respectively applied to said first laser and said second laser with different potential levels.

13. A gyro according to any of claims 1 through 5, wherein said first laser and said second laser have respective optical path lengths that are different from each other.

14. A gyro according to any of claims 1 through 5, wherein said first laser and said second laser have respective optical waveguides having lengths that are different from each other.

15. A gyro according to any of claims 1 through 5, wherein said first laser and said second laser are made of respective materials that are different from each other.

16. A gyro according to any of claims 1 through 5, wherein the optical waveguides of said first laser and said second laser are ring-shaped.

17. A gyro according to any of claims 1 through 5, wherein said first laser has a first optical waveguide and said second laser has a second optical waveguide, both said first optical waveguide and said second optical waveguide having an asymmetrically tapered region.

18. A gyro according to claim 17, wherein said tapered region includes a first tapered section and a second tapered section and either the first tapered section or the second tapered section forms an angle of 90° with a portion of the optical waveguide having a constant width.

19. A gyro according to any of claims 1 through 5, wherein said first laser has a first optical waveguide and said second laser has a second optical waveguide, said first and second optical waveguides having respective optical elements for differentiating the transmission loss of the laser beam propagating in one direction from the transmission loss of the laser beam propagating in an opposite direction.

20. A gyro according to any of claims 1 through 5, wherein said first laser and said second laser are semiconductor lasers.

21. A gyro according to claim 20, wherein said semiconductor lasers have a quantum well structure.

22. A gyro according to any of claims 1, 4, or 5, wherein said first laser and said second laser are gas lasers.

23. A gyro according to any of claims 1 through 5, wherein said first laser and said second laser are ring resonator type lasers.

24. A gyro according to claim 1, wherein said first laser and said second laser have a total reflection plane at a lateral surface of the respective waveguides.

25. A gyro according to claim 1, wherein said first laser and said second laser are driven with a constant current.

26. A gyro according to claim 1, wherein said first laser and said second laser are driven with a constant voltage.

27. A gyro according to claim 1, wherein said first laser is driven with a constant voltage while said second laser is driven with a constant current.

28. A gyro according to claim 2, wherein at least a part of said first optical waveguide is arranged in proximity to and within the penetrating depth of said second laser beam.

29. A gyro according to claim 1, wherein said electric signal is a signal that is varied as a function of the rotation of said first laser and said second laser.

30. A gyro according to claim 1, wherein said electric signal is a voltage signal.

31. A gyro according to claim 1, wherein said electric signal is a voltage signal applied at least either to said first laser or said second laser, a current signal flowing at least either through said first laser or through said second laser or an impedance signal of either said first laser or said second laser.

32. A gyro according to claim 1, wherein a beat signal is detected from said electric signal.

33. A gyro according to any of claims 1 through 5, wherein the angular velocity and the sense of rotation of said first laser and said second laser are detected through the change in the frequency of said electric signal.

34. A gyro according to claim 1, wherein at least either said first laser or said second laser is provided with an electric terminal for detecting the electric signal.

35. A gyro according to any of claims 1 through 5, further comprising a frequency/voltage converter circuit.

36. A gyro according to any of claims 1 through 5, further comprising a protective circuit.

37. A camera configured to mount a gyro according to claim 1.

38. A lens configured to mount a gyro according to claim 1.

39. A car configured to mount a gyro according to claim 1.

40. The gyro according to claim 1, wherein the electric signal is detected from both the first laser and the second laser.

* * * * *

UNITED STATES PATENT AND TRADEMARK OFFICE
CERTIFICATE OF CORRECTION

PATENT NO. : 6,559,949 B1
DATED : May 6, 2003
INVENTOR(S) : Takahiro Numai

It is certified that error appears in the above-identified patent and that said Letters Patent is hereby corrected as shown below:

Column 11,
Line 17, "fi" should read -- f; --.

Column 25,
Line 25, "lo" should be deleted.

Column 31,
Line 53, "n-hip" should read -- n-InP --.

Column 36,
Line 18, "n-fnP" should read -- n-InP --.

Signed and Sealed this

Thirteenth Day of April, 2004

JON W. DUDAS
*Acting Director of the United States Patent and Trademark Office*